United States Patent [19]
Kurita et al.

[11] Patent Number: 5,311,336
[45] Date of Patent: May 10, 1994

[54] COLOR-CONVERTING AN OUTLINE OR OTHER PORTION, WITH OR WITHOUT SPREADING OF THE PORTION

[75] Inventors: Mitsuru Kurita; Yoshinori Ikeda; Yasumichi Suzuki, all of Tokyo; Koichi Katoh, Yokohama; Hiroyuki Ichikawa, Kawasaki, all of Japan

[73] Assignee: Canon Kabushiki Kaisha, Tokyo, Japan

[21] Appl. No.: 363,590

[22] Filed: Oct. 20, 1992

[30] Foreign Application Priority Data

Jun. 8, 1988 [JP] Japan ............................ 63-139500
Jun. 8, 1988 [JP] Japan ............................ 63-139502
Nov. 14, 1988 [JP] Japan ............................ 63-287094

[51] Int. Cl.$^5$ ............................................ H04N 1/46
[52] U.S. Cl. ................................ 358/80; 358/453; 389/22
[58] Field of Search ............ 358/75, 78, 80, 453, 358/456, 298, 537, 538; 382/22, 18; H04N 1/46

[56] References Cited

U.S. PATENT DOCUMENTS

| | | | |
|---|---|---|---|
| 4,369,461 | 1/1983 | Tamura | 358/75 |
| 4,415,920 | 11/1983 | Kato et al. | 358/37 |
| 4,868,884 | 9/1989 | Miyazaki et al. | 382/30 |
| 4,901,362 | 2/1990 | Terzian | 382/22 |
| 4,908,872 | 3/1990 | Toriu et al. | 382/22 |
| 4,929,979 | 5/1990 | Kimoto et al. | 358/80 |
| 4,937,662 | 6/1990 | Matsunawa et al. | 358/75 |
| 4,942,461 | 7/1990 | Abe et al. | 358/75 |
| 4,984,075 | 1/1991 | Munaoka | 358/93 |
| 5,029,224 | 7/1991 | Fujisawa | 358/453 |
| 5,093,870 | 3/1992 | Watanabe | 358/451 |

FOREIGN PATENT DOCUMENTS

| | | | |
|---|---|---|---|
| 0205332 | 12/1986 | European Pat. Off. | H04N 1/46 |
| 0349780 | 1/1990 | European Pat. Off. | H04N 1/46 |
| 63-286067 | 11/1988 | Japan | H04N 1/46 |
| 1302964 | 12/1989 | Japan | H04N 1/46 |
| 2153181 | 8/1985 | United Kingdom | H04N 1/38 |

Primary Examiner—Stephen Brinich
Assistant Examiner—Kim Yen Vu
Attorney, Agent, or Firm—Fitzpatrick, Cella, Harper & Scinto

[57] ABSTRACT

This invention provides an image processing apparatus provided with an outline extracting section for extracting an outline of an input image and a color converting section for converting the color of the outline extracted into a predetermined color. This apparatus is therefore capable of extracting the outline of an input image, applying color conversion to the outline extracted, and emphasizing a pattern such as a character, a graphic pattern or the like. The apparatus is further provided with a converting-color designating section for designating a converting color to be applied to the outline, a color detecting section for detecting a portion having a predetermined color in the input image, and a region designating section for designating a predetermined region in the input image. Accordingly, the outline alone can be independently processed so that an outlined character, a shaded character or the like can be formed.

41 Claims, 49 Drawing Sheets

$$\alpha \times \begin{bmatrix} & 2 & \\ & -1 & \\ 3 & 5 & 1 \\ -1 & 4 & -1 \\ & 4 & \\ & -1 & \end{bmatrix} \begin{matrix} \longrightarrow \text{1 PREVIOUS LINE} \\ \\ \longrightarrow \text{OBJECTIVE LINE} \\ \\ \longrightarrow \text{1 SUCCEDING LINE} \end{matrix}$$

Fig.5B

BLUE  YELLOW  GREEN RED      RED

| DATA ON PREVIOUS LINE | $a_{i-1}$ | $a_i$ | $a_{i+1}$ | |
|---|---|---|---|---|
| DATA ON OBJECTIVE LINE | $b_{i-1}$ | $b_i$ | $b_{i+1}$ | |
| DATA ON SUCCEEDING LINE | $c_{i-1}$ | $c_i$ | $c_{i+1}$ | |

$$\begin{pmatrix} -1 & -1 & 1 \\ -1 & 0 & 1 \\ -1 & 1 & 1 \end{pmatrix}$$

Fig. 26A $$\alpha \times \begin{pmatrix} 1 & 1 & 1 & 1 & -1 \\ 1 & 1 & 0 & -1 & -1 \\ 1 & -1 & -1 & -1 & -1 \end{pmatrix}$$

Fig. 26B $$\beta \times \begin{pmatrix} 0 & -1 & 0 \\ -1 & 4 & -1 \\ 0 & -1 & 0 \end{pmatrix}$$

Fig. 26C

SECOND LINE BEFORE

FIRST LINE BEFORE

CENTER LINE

FIRST LINE AFTER

SECOND LINE AFTER

A : CENTER PIXEL $4A - (B+C+D+E)$

Fig. 38

COLOR-CONVERTING AN OUTLINE OR OTHER PORTION, WITH OR WITHOUT SPREADING OF THE PORTION

BACKGROUND OF THE INVENTION

1. Field of the Invention

The present invention relates to an image processing apparatus and, more particularly, to an image processing apparatus arranged to detect the outline of input image data and then to effect color conversion of the detected outline.

2. Description of the Related Art

In recent years, widespread use has been found for digital color copying machines which are arranged first to read a color original by utilizing a digital color separation process, second to apply a desired process to the thus-read digital image signal, and third to produce a color copy on the basis of the digital color image signal obtained. In order to faithfully reproduce the color and sharpness of the original, this kind of apparatus is designed first to read an image signal by means of a CCD, second to convert the image signal into a digital signal by means of an A/D converter, and third to apply various processes, such as color masking, under color removal, tone compensation and the like. Particularly recently, digital color copying machines have been proposed which are provided with a simple form of a color-image processing function such as cutting, moving, synthesizing or the like. In such a situation in which the degree of fineness of recorded images is improved and the number of functions incorporated into a copying machine increases, it has been strongly desired to realize, in addition to the above-described color-image processing function, the color conversion function of replacing image data representing the color of a particular region on an original with data representing a different color.

However, in a case where such color conversion is conducted with a proposed method or apparatus, if the color of a character body on an original is color-converted, the outline of the character body is also converted into the same color. Accordingly, if the outline and the character body of a particular character are to be emphasized independently of each other, it has been necessary to draw the outline portion by hand with a color pen or the like. This problem applies to not only emphasis on characters but emphasis on graphics.

SUMMARY OF THE INVENTION

It is, therefore, an object of the present invention to provide an image processing apparatus which is capable of detecting data representing the outline portion of image data and of independently converting the color of the portion other than the outline and the color of the outline portion.

It is another object of the present invention to provide an image processing apparatus which is capable of emphasizing a portion of an image or of increasing the visual effect of the image by emphasizing the outline thereof.

It is another object of the present invention to provide an image processing apparatus which is capable of increasing the visual effect of an image by shading the image.

It is a further object of the present invention to provide an image processing apparatus which is capable of providing, in realtime, an output image in which at least one portion of an input image and the region which surrounds this portion are painted in an arbitrary color. It is another object of the present invention to provide an image processing apparatus which is capable of forming an outline-image by extracting only outline portion.

To achieve the above objects, an image processing apparatus according to the present invention is provided with means for extracting the outline portion so as to effect color conversion of the outline portion independently. The image processing apparatus is also provided with means for detecting a predetermined color so as to effect color conversion according to a combination of the portion having the predetermined color and the outline portion. The apparatus is also provided with another means for extracting an outline portion so as to effect different color conversion in correspondence with the position of the outline portion. In addition, the apparatus is arranged to apply color conversion to a predetermined region near the outline portion or to apply color conversion to the portion other than the outline portion.

As described above, in accordance with the present invention, there are provided various arrangements which can increase the visual effect of a pattern such as a character or a graphic image by emphasizing its outline. Further objects, features and advantages of the present invention will become apparent from the following detailed description of embodiments of the present invention with reference to the accompanying drawings.

BRIEF DESCRIPTION OF THE DRAWINGS

FIG. 5B is a view showing one example of the filter utilized in the circuit of FIG. 5A;

FIGS. 26A, 26B and 26C show examples of a matrix of a filter;

FIG. 38 is a view showing an example of a filter for extracting an outline in according with the eighth embodiment;

DESCRIPTION OF THE PREFERRED EMBODIMENTS

Embodiments of the present invention will be described below in detail with reference to the accompanying drawings.

Figure 13:
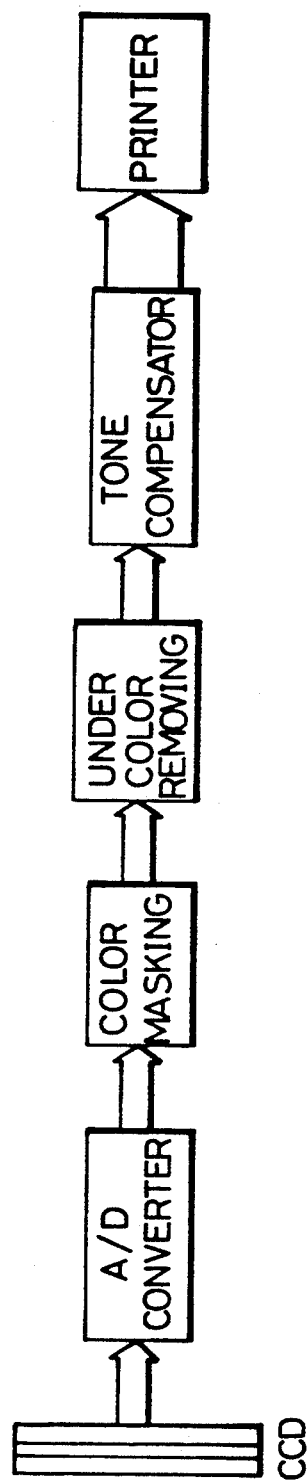
FIG. 13 is a schematic diagram showing an example of the image processing executed in a conventional digital color copying machine.

As shown in FIG. 13, digital color copying machines are in general arranged to read an image signal from a CCD, convert the image signal into a digital signal by means of an A/D converter, and subject the digitized image data to various processes such as color masking, under color removal and tone compensation in order to achieve faithful reproduction of the color and sharpness of an original document. In each embodiment which will be described later, a unique color-conversion function which will be illustrated below is combined with the above arrangement so that desired color conversion, particularly outline emphasis, can be realized.

Figure 1:
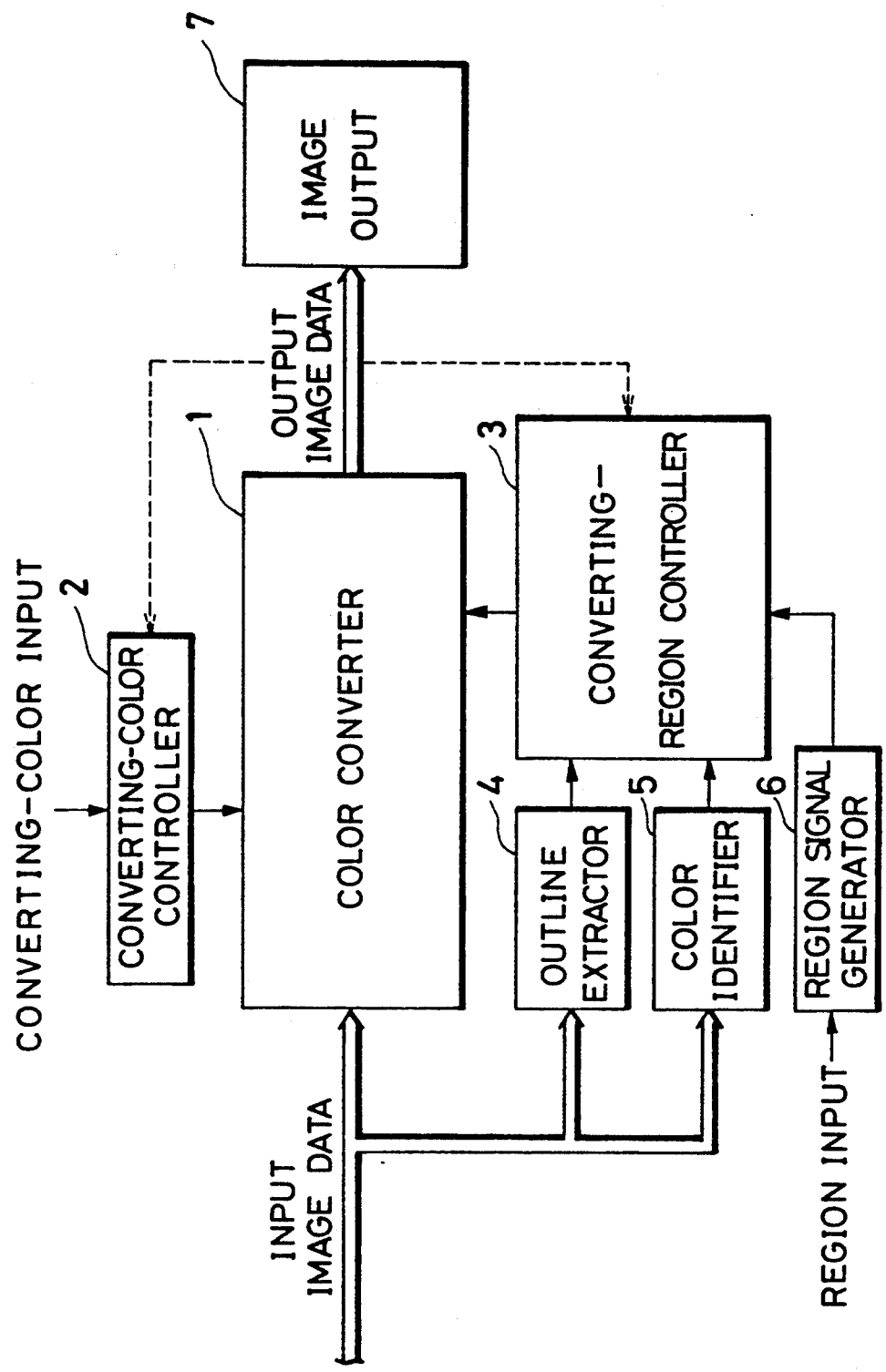
FIG. 1 is a block diagram showing the construction of a first embodiment of an image processing apparatus according to the present invention.

FIG. 1 is a block diagram showing the construction of a portion for performing the color-conversion function in an image processing apparatus according to a first embodiment of the present invention. In the figure, a color converting section 1 is arranged to convert input image data into output image data under the control of a converting-color controlling section 2 or a converting-region controlling section 3 and then to provide the output image data. This output image data is recorded by means of an image output section 7 such as a printer or the like. The input image data is also input to an outline extracting section 4 for extracting an outline and a color identifying section for detecting a predetermined color. The output signals of the outline extracting section 4 and the color identifying section 5 are input to the converting-region controlling section 3 together with the region signal supplied from a region-signal generating section 6 for designating a particular region to which color conversion is to be applied. The converting-region controlling section 3 in turn controls the color converting section 1 so as to execute various kinds of outline emphasis, which will be described in detail below, on the basis of the combination of the conditions conveyed by the above-described designations. The converting-color controlling section 2 for controlling the converting color and the converting-region controlling section 3 cooperate to provide control over the color converting section 1, thereby enabling an increase in the number of kinds of color conversion possible.

Figure 2A:
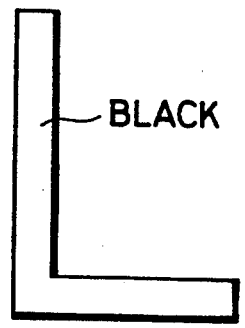
FIGS. 2A to 2F are views which serve to illustrate examples of the results of processes executed by corresponding embodiments of the image processing apparatus according to the present invention.
Figure 2C:
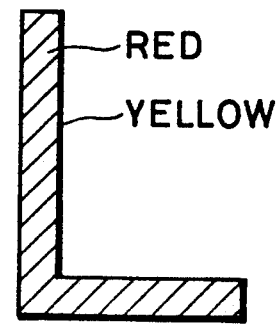
Figure 2B:
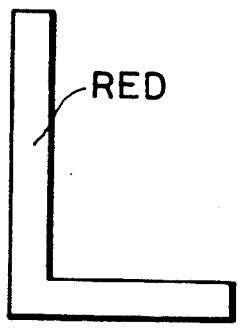

First of all, the outline emphases which will be explained below in the description of the preferred embodiments will be briefly summarized with reference to FIGS. 2A to 2F. FIG. 2A shows input image data which represents, for example, a character "L" in black. FIG. 2B shows a conventional example of color conversion, in which case the black character "L" is converted into a red character "L". FIG. 2C is a view showing an example of color conversion executed in accordance with any of first to third embodiments or a portion of a fourth embodiment. The black character "L" is converted into a pattern consisting of a red character body and a yellow outline portion.

Figure 2D:
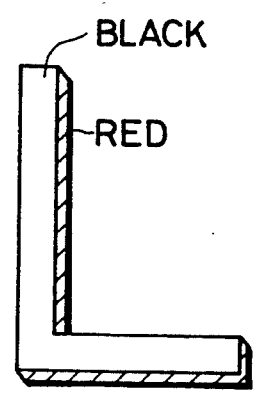
Figure 2E:
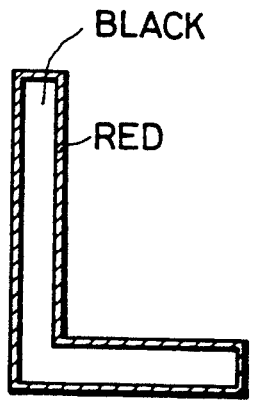
Figure 2F:
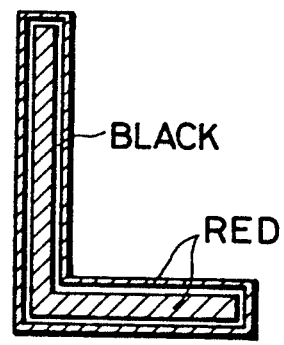

FIG. 2D is a view showing an example of color conversion which will be illustrated in one part of the description of the fourth embodiment; in this example, a red shadow is added to a color converted character "L". FIG. 2E is a view showing an example of color conversion according to sixth and seventh embodiments, and in this example, the outline of a color-converted character "L" is surrounded by a red portion having a predetermined width. FIG. 2F is a view showing an example of color conversion according to the seventh embodiment, and in this example, a color-converted character "L" consists of a red interior and a red portion having a predetermined width and extending along the outline thereof with the color of the outline remaining non-converted.

The color of each of the above examples is only illustrative and is not of course limitative. As a matter of course, any of the desired color conversion methods according to the respective embodiments may be incorporated into the image processing apparatus of the present invention, or a combination of a plurality of color conversion methods may be utilized.

Several embodiments will be explained below in more detail.

FIRST EMBODIMENT

Independent Color Conversion of Outline

Figure 3:
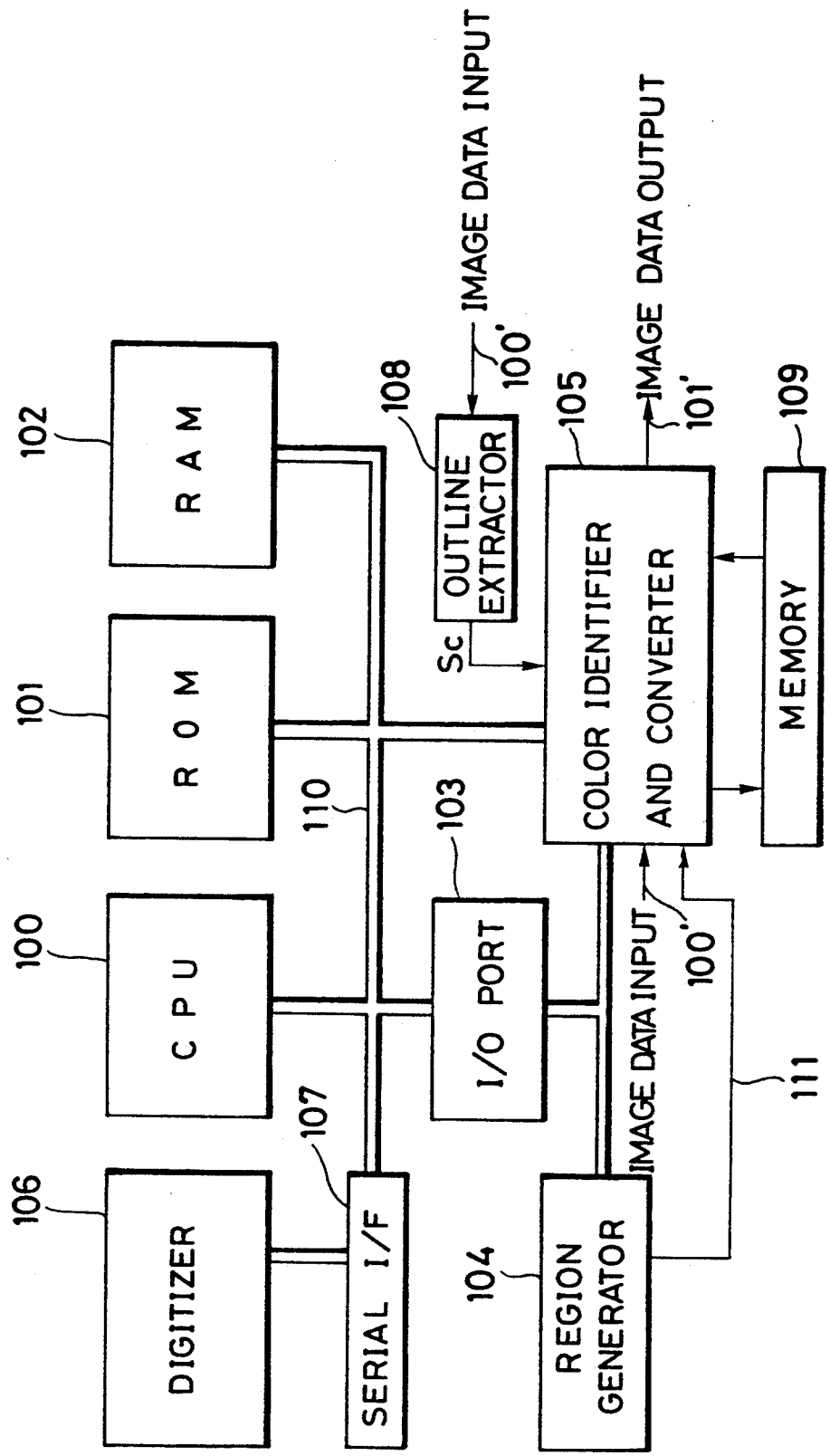
FIG. 3 is a block diagram diagrammatically showing the construction of the first embodiment of the image processing apparatus according to the present invention.

FIG. 3 is a block diagram schematically showing the construction of the first embodiment of the image processing apparatus.

The illustrated image processing apparatus includes a CPU 100 for controlling the entire apparatus, a ROM 101 which stores a control program for the CPU 100 and various types of data, and a RAM 102 which is used as a work area for the CPU 100 and which serves to temporarily store image data or various types of data. The apparatus also includes an I/O port 103 which connects a system bus 110 with a region generating circuit 104, a color identifying/converting circuit 105, and other circuits. A digitizer 106 is used to designate the position, region, etc. of image data, and is connected to the bus 110 through a serial interface 107. Further, the illustrated apparatus includes an outline generating circuit 104 and an outline extracting section 108 both of which will be described later. Reference numeral 100' represents input image data, and reference numeral 101' represents output image data.

The CPU 100 supplies the data required for color identification and color conversion to a plurality of registers (to be described later) of the circuit 105 through the I/O port 103 for storage purposes in accordance with the control program stored in the ROM 101 and shown in the flow chart of FIG. 15. The region generating circuit 104 creates a region signal 111 on the basis of the coordinate value entered from the digitizer 106 and then supplies the region signal 111 to the color identifying/converting circuit 105.

Figure 4:
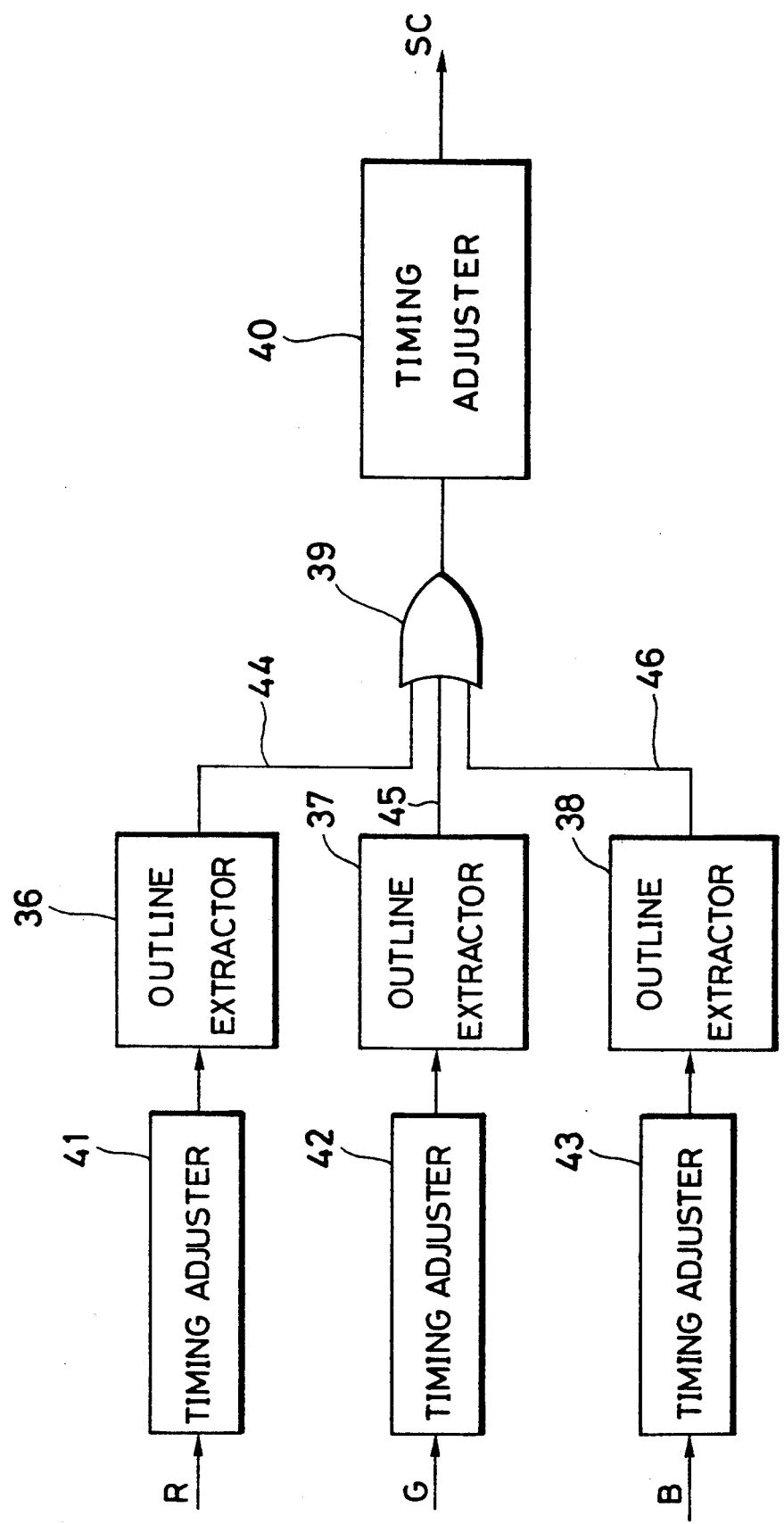
FIG. 4 is a block diagram diagrammatically showing the construction of the outline extracting section shown in FIG. 3.

FIG. 4 is a block diagram schematically showing the construction of the outline extracting section 108 shown in FIG. 3.

As illustrated, the outline extracting section 108 includes an outline extracting circuit 36 for color separation data R (red data), an outline extracting circuit 7 for color separation data G (green data), an outline extracting circuit 38 for color separation data B (blue data), an OR gate 39 for ORing outline information 44, 45 and 46 which correspond to R, G and B, respectively, and timing adjusting circuits 40, 41, 42 and 43.

In order to synchronize each of the color separation data R, G and B with any delay occurring in a color detecting circuit as will be described later, the respective color separation data are delayed when passed through the timing adjusting circuits 41, 42 and 43. Since, in this embodiment, each of the color separation data is delayed by one line, it is possible to easily realize the timing adjusting circuits 41, 42 and 43 by utilizing, in practice, FIFO memories each having a memory capacity for one line. The outputs delayed by one line in the timing adjusting circuits 41, 42 and 43 are input to the respective outline extracting circuits 36, 37 and 38.

Figure 5A:
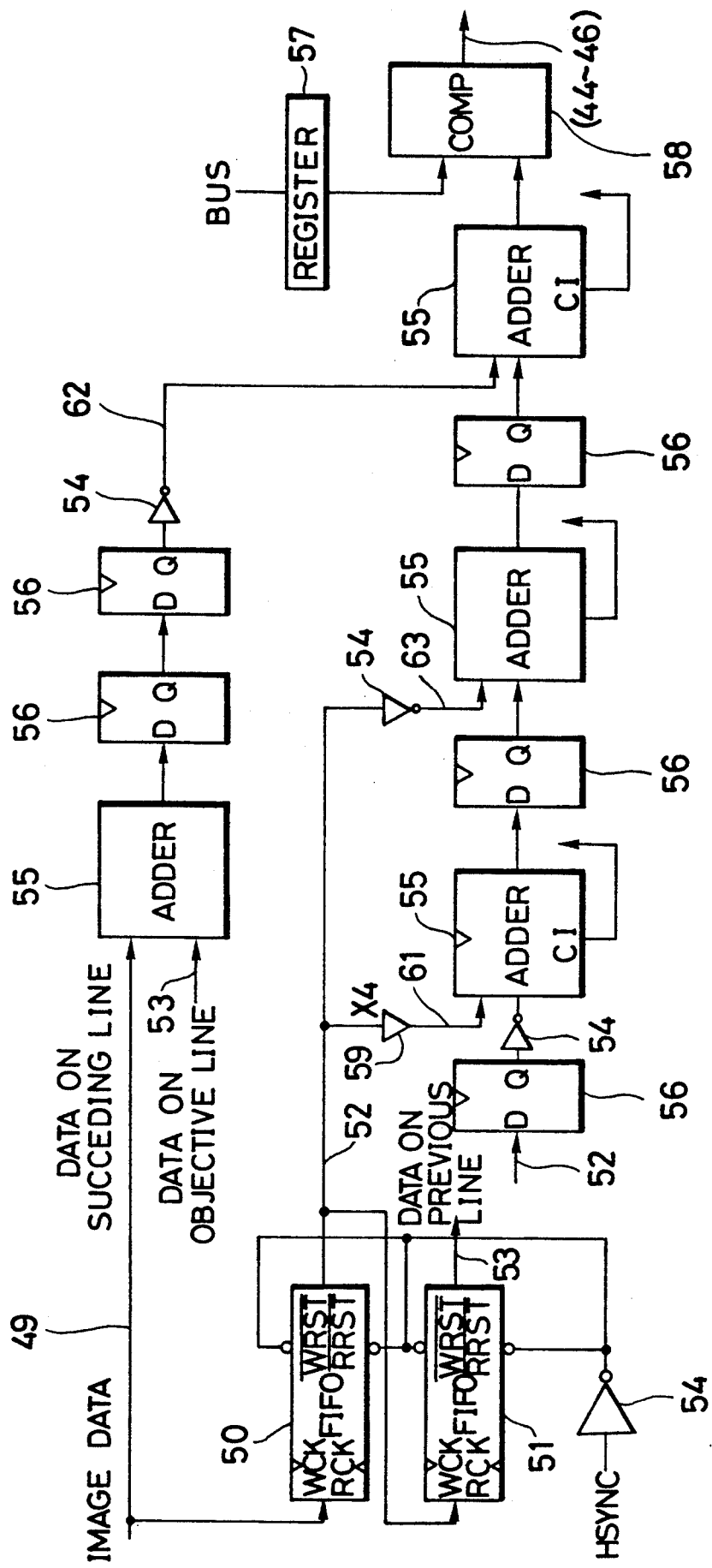
FIG. 5A is a circuit diagram showing the outline extracting circuit of FIG. 4.

The construction of one of the outline extracting circuits 36 to 38 is shown in FIG. 5A.

In FIG. 5A, FIFO memories 50 and 51 are provided for delaying input image data by one line, and each of them is arranged to sequentially receive image data 49 and to return a write position and a read position to respective initial positions in response to an HSYNC signal. Of the illustrated outputs, an output 52 is image data representing an objective line, an output 53 is image data representing the line immediately previous to the objective line, and an output 49 is image data representing the line subsequent to the objective line. Inverter circuits, adders and D-type flip-flops are denoted by 54, 55 and 56, respectively. A multiplier 59 multiplies the image data 52 representing the objective line by four and inputs the result to the corresponding adder 55. A register 57 stores a threshold value which serves as a reference value used to identify an outline, the threshold value being supplied from the CPU 100. A comparator 58 compares the threshold value stored in the register 57 with the output value of the adder 55 located at the last position, thereby outputting the signal (44, 45 or 46) representing a particular region.

A write clock WCK and a read clock RCK of each of the FIFO memories 50 and 51 are common to the clocks used in the timing adjusting circuits 41, 42 and 43 and so on. A write reset signal WRST and a read reset signal RRST are obtained by inverting the horizontal synchronizing signal HSYNC. Accordingly, the outputs 52 and 53 constitute image signals each of which is delayed by one line, as described above.

FIG. 5B is a diagram showing arithmetic operations concerning the filter realized in the circuit of FIG. 5A, and outline information is extracted by a comparison between the result of the arithmetic operations and a set threshold value. In FIG. 5A, reference numeral 61 denotes image data obtained by multiplying the image data 52 by the numerical value "4" shown at ⑤ in FIG. 5B, and reference numeral 62 denotes image data obtained by performing arithmetic operations using the numerical value shown at ②+the numerical value shown at ④ in FIG. 5B. The image data 52 represents data obtained by performing arithmetic operations using the numerical value shown at ③ in FIG. 5B, and an output 63 represents the result of the arithmetic operations using the numerical value shown at ① in FIG. 5B. All the results are added in the adder 55 located at the last position. In this manner, the arithmetic operations utilizing the filter shown in FIG. 5B are carried out, and the result of the multiplication of an objective picture element by utilizing the filter of FIG. 5B is output to the comparator 58. The comparator 58 compares the result with the threshold value stored in the register 57 to determine whether or not the result represents an outline. If the result represents an outline, the comparator 58 outputs "1".

Each of the flip flops 56 shown in FIG. 5A delays data by one picture element to perform timing adjustment, and each of the inverter circuits 54 performs a multiplication of $\times(-1)$.

Referring back to FIG. 4, the construction of the outline extracting section 108 will be explained. The respective outputs 44 to 46 from the outline extracting circuits 36 to 38 are input to the OR circuit 39. If it is determined, in the OR circuit 39, that at least one of the R, G and B signals represents an outline, the output of the OR circuit 39 goes to "1" whereby it is determined that the objective picture element is contained in an outline portion. The timing adjusting circuit 40 has a function similar to those of the timing adjusting circuits 41 to 43 described above, and is provided in order to make adjustments corresponding to any delay occurring in the color detecting circuit which will be described later. The timing adjusting circuit 40 is composed of such devices as, for example, D-type flip-flops, and provides a delay equivalent to approximately eleven to nineteen clocks.

The color identifying/converting circuit 105 will be explained below with reference to FIGS. 6 to 12.

First, the outline of algorithms for color identification will be explained. It is known that, if two representations of a given color are the same (in the case of a certain hue), the relationship between, for example, the red (R) signal, the green (G) signal and the blue (B) signal (hereinafter referred as "$R_1$", "$G_1$" and "$B_1$", respectively) will be represented by an equal ratio. Data MC representing one color (or maximum-value color; hereinafter called "main color") of certain colors to be color-converted is selected, and the ratio of the data MC to the remaining two colors is obtained. For example, if the main color is R, the ratio of $G_1$ to MC and the ratio of $B_1$ to MC are obtained. From the input data $R_i$, $G_i$ and $B_i$, the following relationships are obtained:

$$R_i \times (G_1/MC) \times \alpha_1 \leq G_i \leq R_i \times (G_1/MC) \times \alpha_2$$

$$R_i \times (B_1/MC) \times \beta_1 \leq B_i \leq R_i \times (B_1/MC) \times \beta_2$$

$$A \leq MC \leq B$$

From the above relationships, a picture element which satisfies the conditions of $\alpha_1$, $\beta_1 \leq 1$; $\alpha_2$, $\beta_2 \geq 1$; and $0 \leq A \leq B \leq 255$ is selected as the picture element whose color is to be converted.

Figure 6:
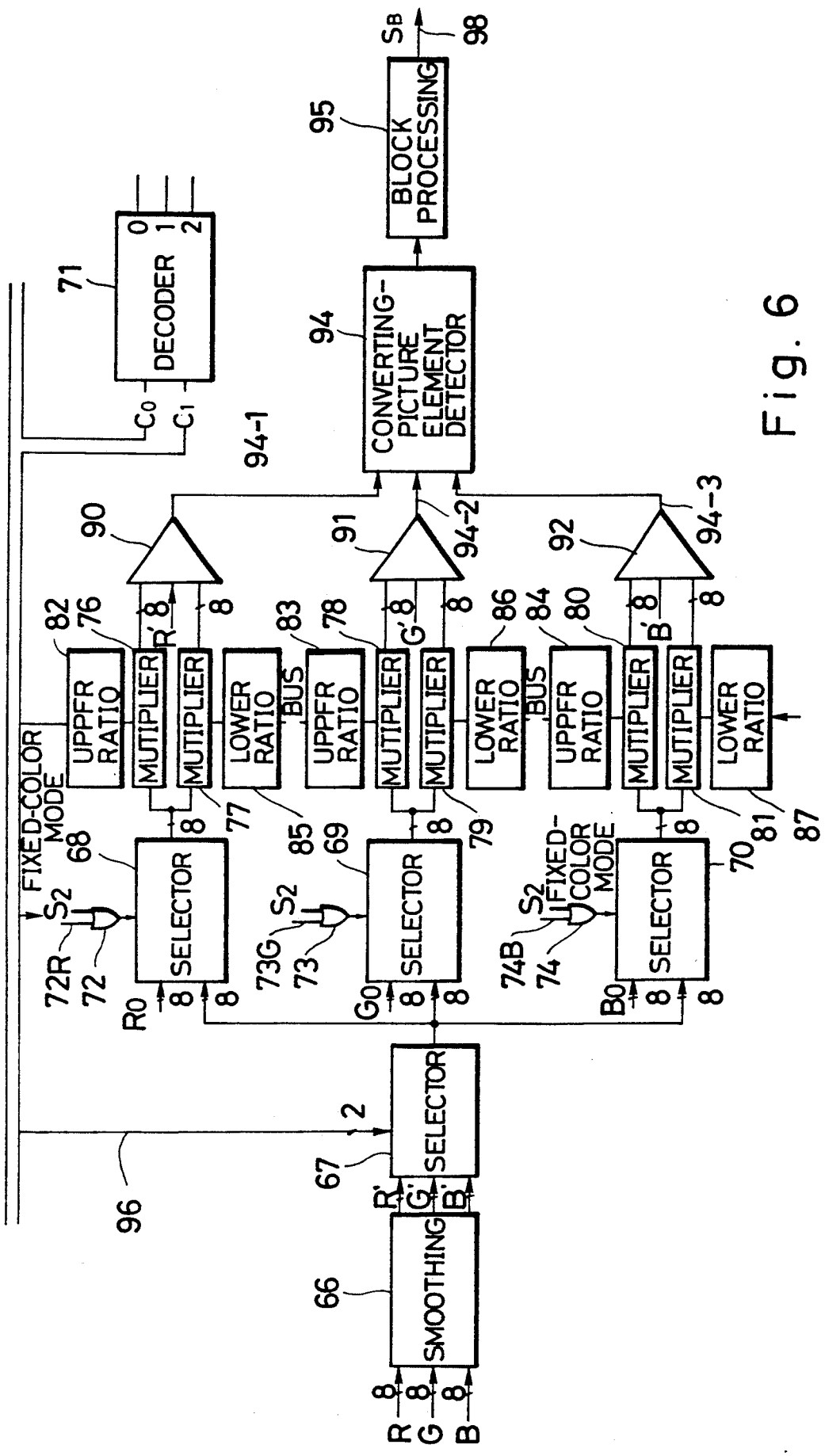
FIG. 6 is a block diagram showing the color identifying section used in the first embodiment.

FIG. 6 is a block diagram schematically showing the construction of the color identifying section of the color identifying/converting circuit 105, and serves to illustrate a case where a picture element to be color-converted is detected.

In the figure, a smoothing section 66 receives R, G and B data each of which consists of 8 bits, and effects smoothing of the respective R, G and B data. A selector 67 selects one (main color) of the outputs from the smoothing section 66. A selector 68 selects either the output value of the selector 67 or a fixed value $R_0$. A selector 69 selects either the output value of the selector 67 or a fixed value $G_0$. A selector 70 selects either the output value of the selector 67 or a fixed value $B_0$.

A decoder 71 determines which of R, G and B is the main color. OR circuits for R, G and B are denoted by 72, 73 and 74, respectively. Multipliers 76 and 77 perform computations on the upper and lower values of R, respectively; multipliers 78 and 79 on the upper and lower values of G, respectively; and multipliers 80 and 81 on the upper and lower values of B, respectively. Upper-ratio registers are denoted by 82, 83 and 84, while lower-ratio registers are denoted by 85, 86 and 87, and the numerical values of all these registers are set by the CPU 100 through the bus 110. Window comparators are denoted by 90, 91 and 92, a converting-picture element detecting section by 94, and a block processing section by 95.

The operation of the color identifying section having the above-described construction will be explained below.

When R, G and B data are input to the smoothing section 66, the smoothing section 66 effects smoothing of the R, G and B data and generates corresponding smoothed 8-bit data R', G' and B'. The data R', G' and B' of the smoothing section 66 are supplied to the selector 67, and the selector 67 outputs one of the data R', G' and B' in response to a 2-bit select signal set by the CPU 100. In this manner, the main color is selected. The OR circuits 72, 73 and 74 generate select signals for the respective selectors 68, 69 and 70.

The fixed values $R_0$, $G_0$ and $B_0$ are selected for the case of the main color in the conventional color conversion (fixed-color mode) and tone color conversion. The main-color data which is output from the selector 67 is selected for the case of any color other than the main color in the tone color conversion. An operator can freely perform this selection by utilizing the operating section provided (not shown). The fixed values $R_0$, $G_0$ and $B_0$ can also be altered under the control of the CPU 100 on the basis of the color data (data representing a color to be color-converted) which has been input by the input device (for example, the digitizer 106).

The respective multipliers 76, 78 and 84 calculate the upper values of the data R', G' and B' from the outputs of the corresponding selectors 68, 69 and 70 and the values which have been set in the upper-ratio registers 82, 83, and 84 by the CPU 100. The respective multipliers 77, 79 and 81 calculate the lower values of the data R', G' and B' from the outputs of the corresponding selectors 68, 69 and 70 and the values which have been set in the lower-ratio registers 85, 86 and 87 by the CPU 100. The results of the multipliers 76 to 81 are set in the corresponding window comparators 90, 91 and 92.

The respective window comparators 90, 91 and 92 determine whether or not the relationship between R', G' and B' falls within a certain ratio, that is, whether or not the value of main-color data is within a predetermined range. If it is within the predetermined range, each of the window comparators 90, 91 and 92 outputs "1". On the basis of the output of each of the comparators 90, 91 and 92, the converting-picture element detecting section 94 identifies a picture element to be color-converted. This converting-picture element detecting section 94 is basically composed of AND circuits. If the outputs of all the comparators 90, 91 and 92 are "1", the converting-picture element detecting section 94 outputs data "1" to the block processing section 95. Finally, if in the block processing section 95 at least one picture element to be color-converted is detected within a block consisting of 3 (picture elements)×3 (picture elements) and including an objective picture element as the center picture element, the block processing section 95 carries out the process of regarding the objective picture element as a picture element to be color-converted.

Figure 7:
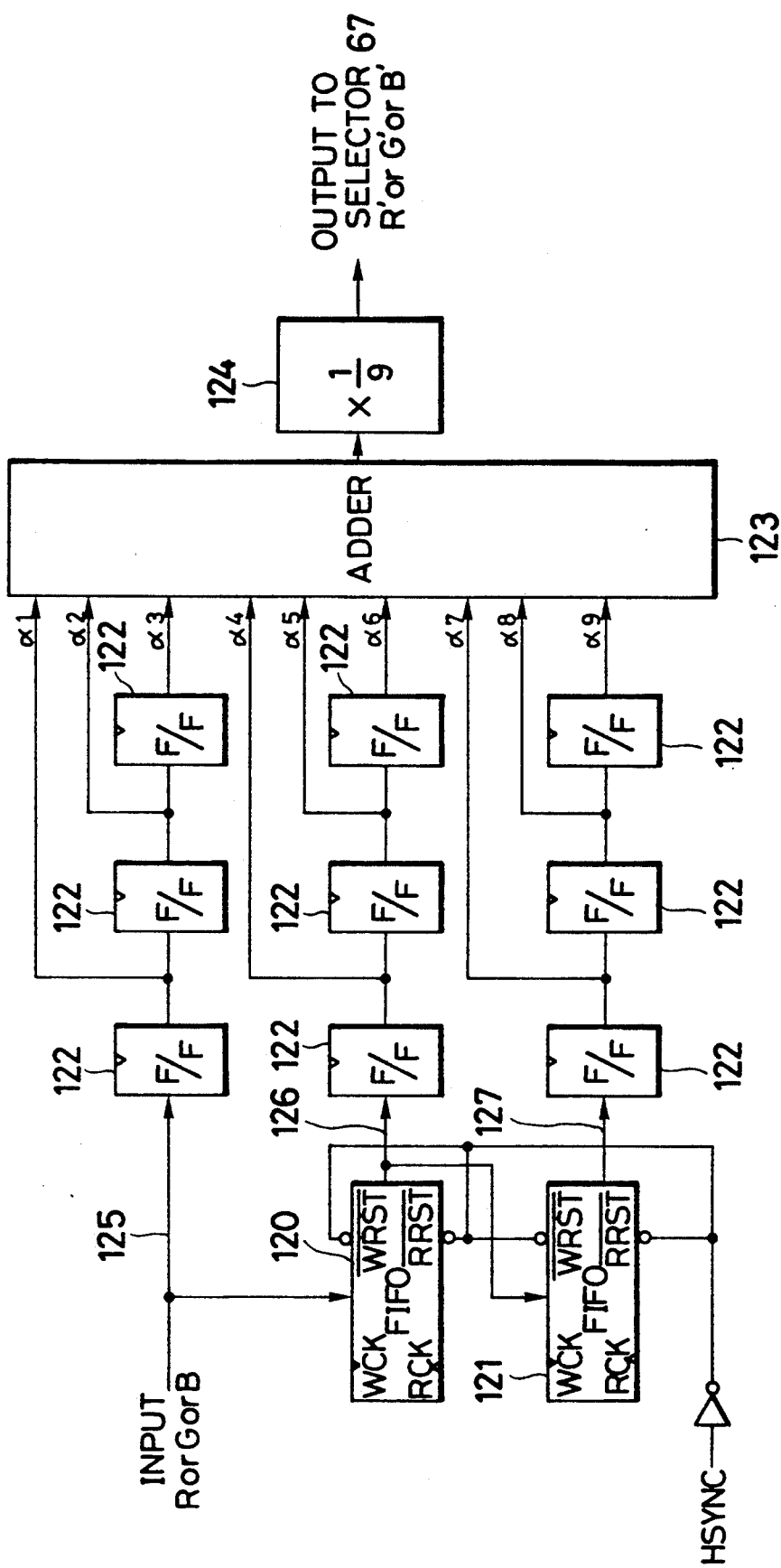
FIG. 7 is a circuit diagram showing the smoothing section of FIG. 6.

FIG. 7 is a block diagram showing the construction of the smoothing section 66.

In the figure, FIFO memories 120 and 121 are provided for delaying input image data by one line. Each flip-flop 122 delays data by one clock, and an addition section 123 receives and adds the output values of the respective flip-flops 122. A multiplier 124 multiplies the output value of the addition section 123 by 1/9. The write clock WCK and the read clock RCK of each of the FIFO memories 120 and 121 are common to the other clocks. The write reset signal WRST and the read reset signal RRST are obtained by inverting the horizontal synchronizing signal HSYNC.

In this smoothing section 66, the respective input data R, G and B are subjected to a smoothing of 3×3, and the outputs R', G' and B' are provided. More specifically, the smoothing section 66 performs arithmetic operations of
$(d_1+d_2+d_3+d_4+d_5+d_6+d_7+d_8+d_9)\times(1/9)$, where $d_1$ to $d_9$ represent the values of the respective picture elements in a picture element matrix consisting of 3 (picture elements)×3 (picture elements). In FIG. 7, reference numeral 125 denotes image data representing the line subsequent to an objective line, reference numeral 126 denotes image data representing the objective line, and reference numeral 127 denotes image data representing the line immediately previous to the objective line. $D_5$ represents the objective picture element data.

Figure 8:
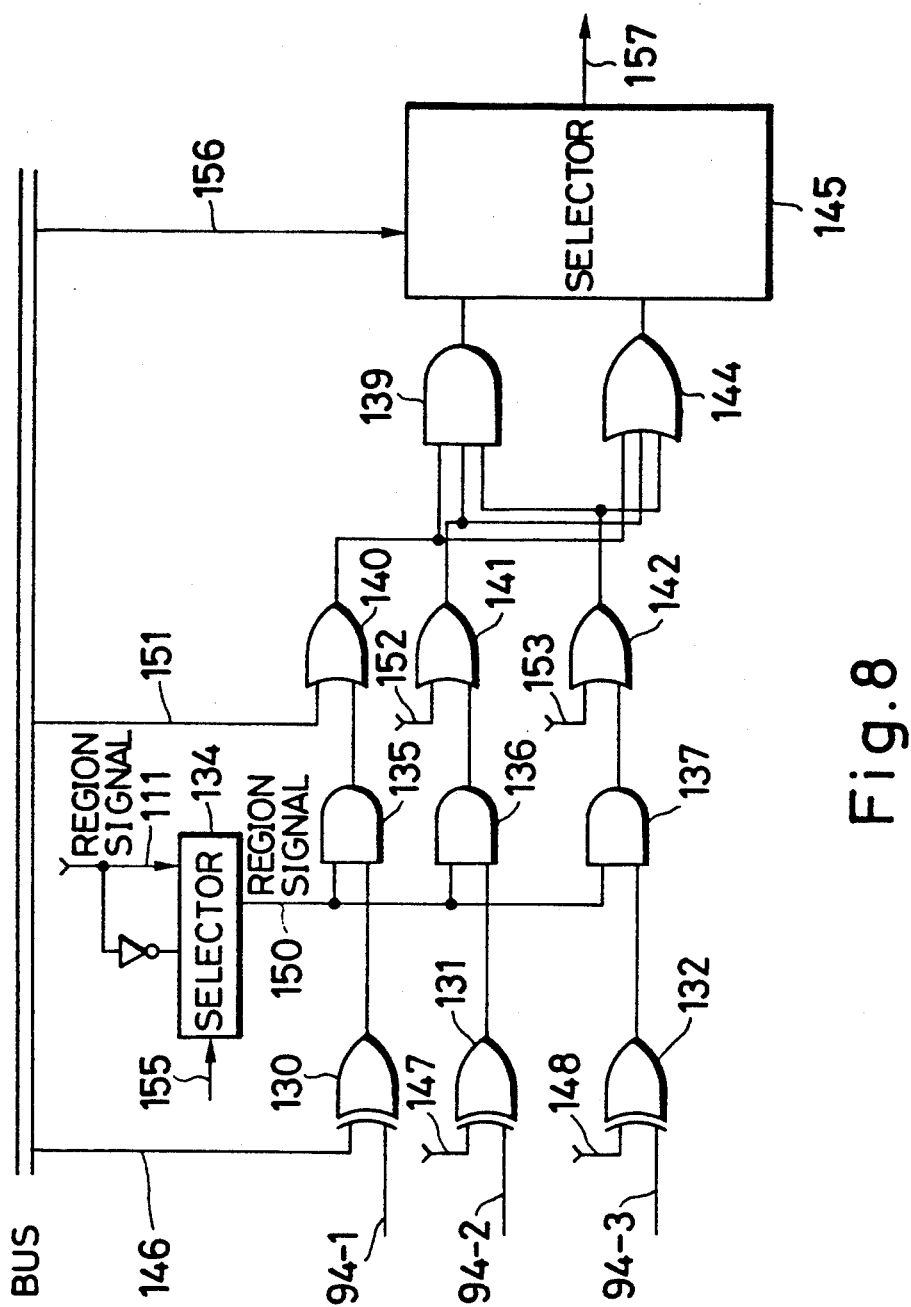
FIG. 8 is a circuit diagram showing the converting-picture element detecting circuit of FIG. 6.

FIG. 8 is a block diagram showing the circuit construction of the converting-picture element detecting section 94.

As shown in FIG. 8, the converting-picture element detecting section 94 includes exclusive OR circuits 130 to 132, a selector 134, AND gates 135, 136, 137 and 139, and OR gates 140, 141, 142 and 144.

In the above arrangement, the outputs 94-1, 94-2, and 94-3 of the respective window comparators 90, 91 and 92 of the color identifying section shown in FIG. 6 are supplied to the corresponding exclusive OR (EXOR) circuits 130, 131 and 132. The result is output from the AND gate 139 or the OR circuit 144. More specifically, if R:G:B takes on a certain ratio and if the main-color data falls within a certain value, a selector 145 outputs "1"; otherwise, the selector 145 outputs "0".

The operation of the converting-picture element detecting section 94 will be described below in detail.

Referring to the EXOR circuit 130 for the purpose of illustration, the EXOR circuit 130 selectively inverts the signal 94-1 in accordance with the state of a mode signal 146 set by the CPU 100. More specifically, if the mode signal 146 is "0", the EXOR circuit 130 outputs the signal 94-1 which is not inverted, while, if the mode signal 146 is "1", the EXOR circuit 130 outputs the signal 94-1 which is inverted. The EXOR circuits 130 and 132 operate in a similar manner in accordance with the respective states of the mode signals 147 and 148 set by the CPU 100.

The region signal 111 is converted into a high active signal or a low active signal by the selector 134 in accordance with a select signal 155, and a region signal 150 is output from the selector 134. The region signal 150 is supplied to the AND circuits 135, 136 and 137. Thus, the AND circuits 135, 136 and 137 utilize the respective region signals 150 to perform ANDing of the outputs from the corresponding EXOR circuits 130, 131 and 132. In other words, each of the AND circuits 135, 136 and 137 is a circuit which executes color conversion in the mode of region designation, and serves to determine whether the color in a designated region is color-converted or whether the input data is to be output with the original color unchanged.

The role of the OR circuit 140 will be explained below. In accordance with an inhibit signal 151 supplied by the CPU 100 over the bus, the OR circuit 140 determines whether or not the signal output from the AND circuit 135 is output to the subsequent stage. Specifically, if the inhibit signal 151 is "1", the output of the OR circuit 140 goes to "1" irrespective of the output of the AND circuit 135. The OR circuits 141 and 142 operate in a manner similar to that of the OR circuit 140 in accordance with the respective states of inhibit signals 152 and 153 set by the CPU 100.

The OR circuit 144 is a circuit which detects the color other than a certain color within a particular region. The selector 145 selects the output of the AND circuit 139 or the output of the OR circuit 144 in accordance with the select signal 156, and supplies the selected output as a converting-picture element detection signal 157.

The above-described construction and arrangement make it possible to effect detection, primarily in the manner which will be described below.

(1) Detection of a particular color in the entire region

Figures 9, 10B:
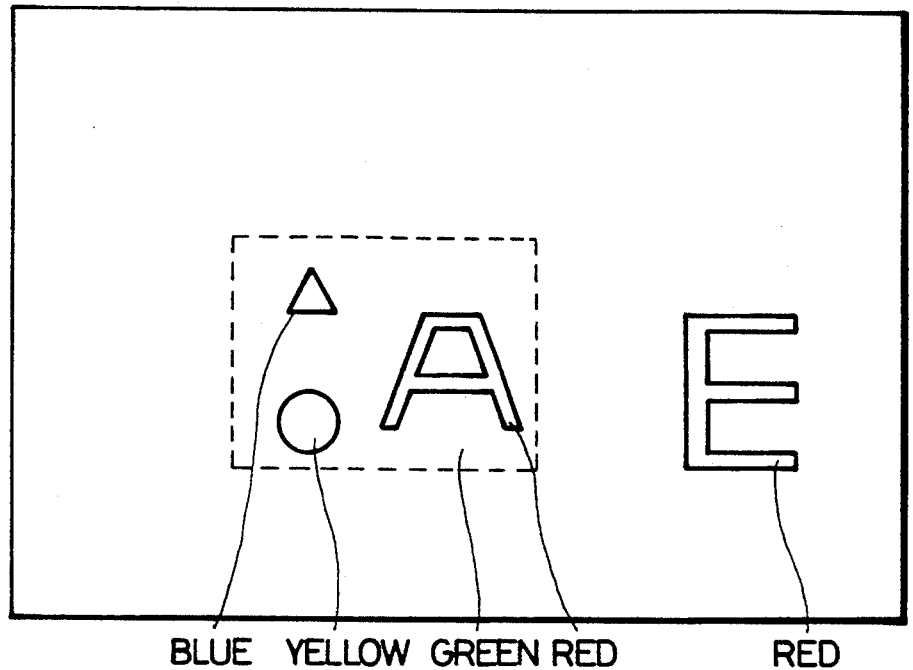
FIG. 9 is a view which serves to illustrate each mode for detecting a color.
FIG. 10B is a view which serves to illustrate the relationship between an objective picture element and peripheral picture elements.

In FIG. 9, for example, if red characters "A" and "E" are to be detected,

Mode signal: All the mode signals 146, 147 and 148 are set to "0".

Inhibit signal: All the inhibit signals 151, 152 and 153 are set to "0".

The region signal 150 is set to "1" over the period corresponding to the entire region.

The selector 145 selects the output of the AND circuit 139. In this case, the output of the AND circuit 139 is set to "1" in response to the portions occupied by the red characters "A" and "E", and the selector 145 outputs "1".

(2) Detection of a portion excluding a particular color in the entire region

For example, a portion excluding the red characters "A" and "E" in FIG. 9 is detected.

Mode signal: All the mode signals 146, 147 and 148 are set to "1".

Inhibit signal: All the inhibit signals 151, 152 and 153 are set to "0".

The region signal 150 is set to "1" over the period corresponding to the entire region.

The output of the OR circuit 144 is provided at the output of the selector 145.

(3) Detection of a particular color in a designated region

For example, the red character "A" is detected in the rectangular region shown by a dashed line in FIG. 9.

The region signal 150 is set to "1" within the rectangular region, but is set to "0" in the region excluding the rectangular region.

The setting of the mode signals 146 to 148 and the inhibit signals 151 to 153 as well as the operation of the selector 145 is done in a manner similar to that used in (1).

(4) Detection of the portion excluding a particular color in a designated region For example, the portion excluding the red character "A" within the rectangular region shown by the dashed line in FIG. 9 is detected.

The region signal 150 is set to "1" within the rectangular region, but is set to "0" in the region excluding the rectangular region.

The setting of the mode signals 146 to 148 and the inhibit signals 151 to 153 as well as the operation of the selector 145 is done in a manner similar to that used in (1).

(5) Detection of a particular color in a designated region excluding a particular region For example, the red character "E" is detected in the region excluding the rectangular region shown by the dashed line in FIG. 9.

The region signal 150 is set to "1" outside the rectangular region, but is set to "0" in the region excluding the rectangular region.

The setting of the mode signals 146 to 148 and the inhibit signals 151 to 153 as well as the operation of the selector 145 is done in a manner similar to that used in (1).

(6) In FIG. 9, a region excluding a particular region is designated and, in the designated region, the portion excluding both the red character "E" and the rectangular region shown by the dashed line in FIG. 9 is detected.

The region signal 150 is set to "1" outside the rectangular region, but is set to "0" in the region excluding the rectangular region.

The setting of the mode signals 146 to 148 and the inhibit signals 151 to 153 as well as the operation of the selector 145 is done in a manner similar to that used in (2).

(7) Selection of all the portions in the entire region $R_0$, $G_0$ and $B_0$ as well as the upper values thereof are set so that the upper and lower values of each of the window comparators are set to "0" and "255", respectively.

The region signal 150 is set to "1" within the rectangular region, but is set to "0" in the region excluding the rectangular region.

Mode signal: All the mode signals 146 to 148 are set to "0".

Inhibit signal: All the inhibit signals 151 to 153 are set to "0".

(8) Selection of all the portions in a region excluding a particular region

The region signal 150 is set to "0" within the rectangular region shown by the dashed line in FIG. 9, but is set to "1" in the region excluding the rectangular region.

The setting of the values of the respective window comparators, the mode signals, and the inhibit signals is done in a manner similar to that used in (7).

Since various kinds of color signals can be detected in the above-described way, it is possible to conduct various types of image processing (for example, undefined masking).

Figure 10A:
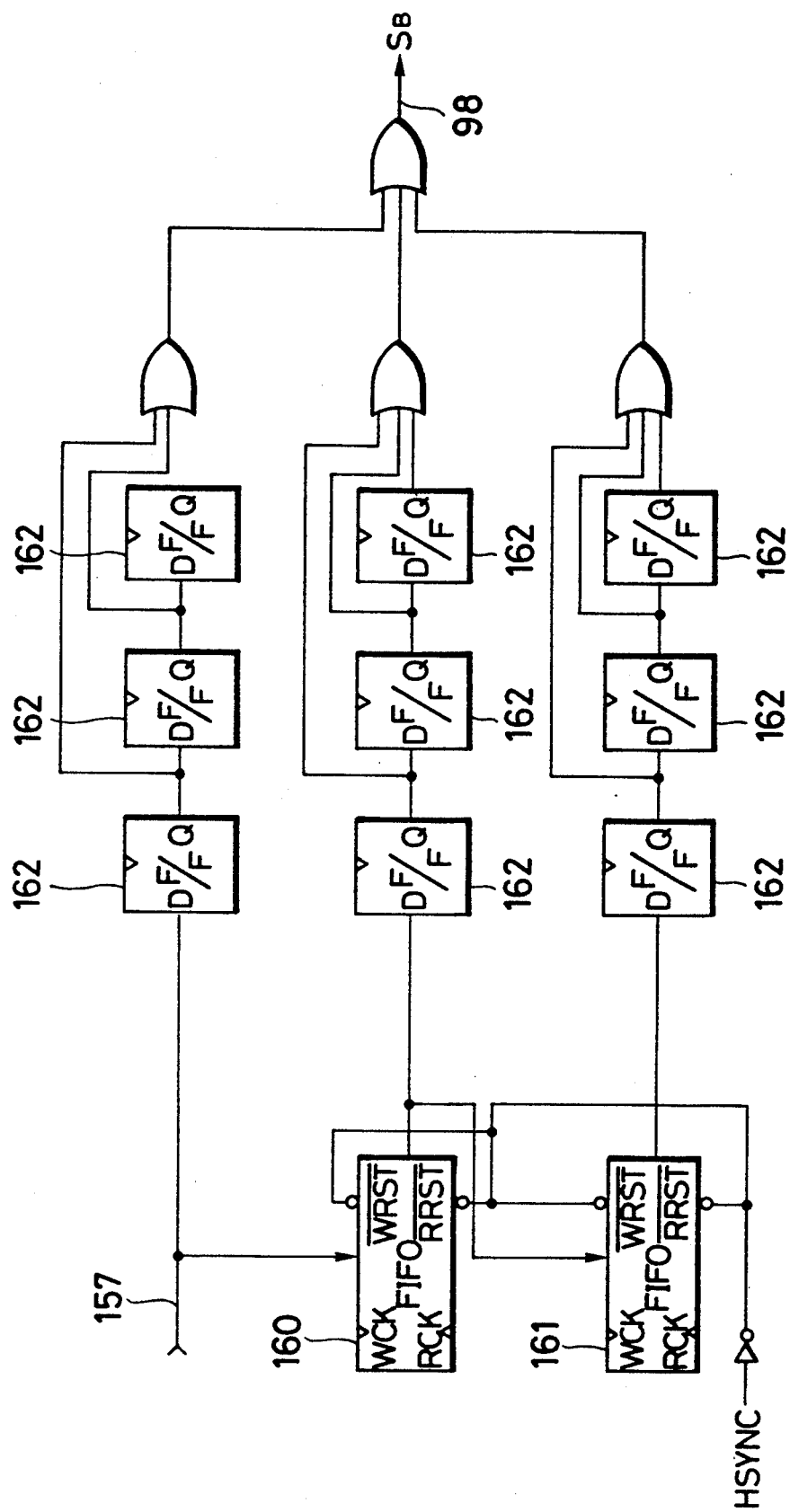
FIG. 10A is a block diagram showing the construction of the block processing section of FIG. 6.

FIG. 10A is a block diagram showing the construction of the block processing section 95.

In the figure, FIFO memories 160 and 161 are each provided for delaying corresponding image data by one line, and flip-flops 162 are provided in respective circuits which delay received data by one clock. The method of controlling the FIFO memories 160 and 161 is similar to that used in controlling the FIFO memories 120 and 121 of the smoothing section shown in FIG. 6, and description of the method is omitted.

The block processing section 95 receives the converting-picture element signal 157, and if it is determined in the block processing section 95 that at least one picture element to be color-converted is present in a picture element block consisting of 3 (picture elements)×3 (picture elements), the block processing section 95 processes an objective picture element in that block as a picture element to be color-converted. In FIG. 10B, a line of $a_{i-1}$, $a_i$ and $a_{i+1}$ represents line data immediately previous to objective-line data, a line of $b_{i-1}$, $b_i$ and $b_{i+1}$ represents line data representing the objective line, and a line of $c_{i-1}$, $c_i$ and $c_{i+1}$ represents line data subsequent to the objective-line data, and it is assumed that $b_i$ represents the objective picture element. If it is determined that at least one picture element to be color converted is contained in the line data of $a_{i-1}$, $a_i$ and $a_{i+1}$, the line data of $b_{i-1}$, $b_i$ and $b_{i+1}$ or the line data of $c_{i-1}$, $c_i$ and $c_{i+1}$, the objective picture element $b_i$ is processed as the picture element to be color-converted. In other words, if it is determined that the objective picture element $b_i$ is a portion to be color-converted, the process of regarding all the portions in the picture element block consisting of 3 (picture elements)×3 (picture elements) as a portion to be color-converted is carried out.

Figure 11:
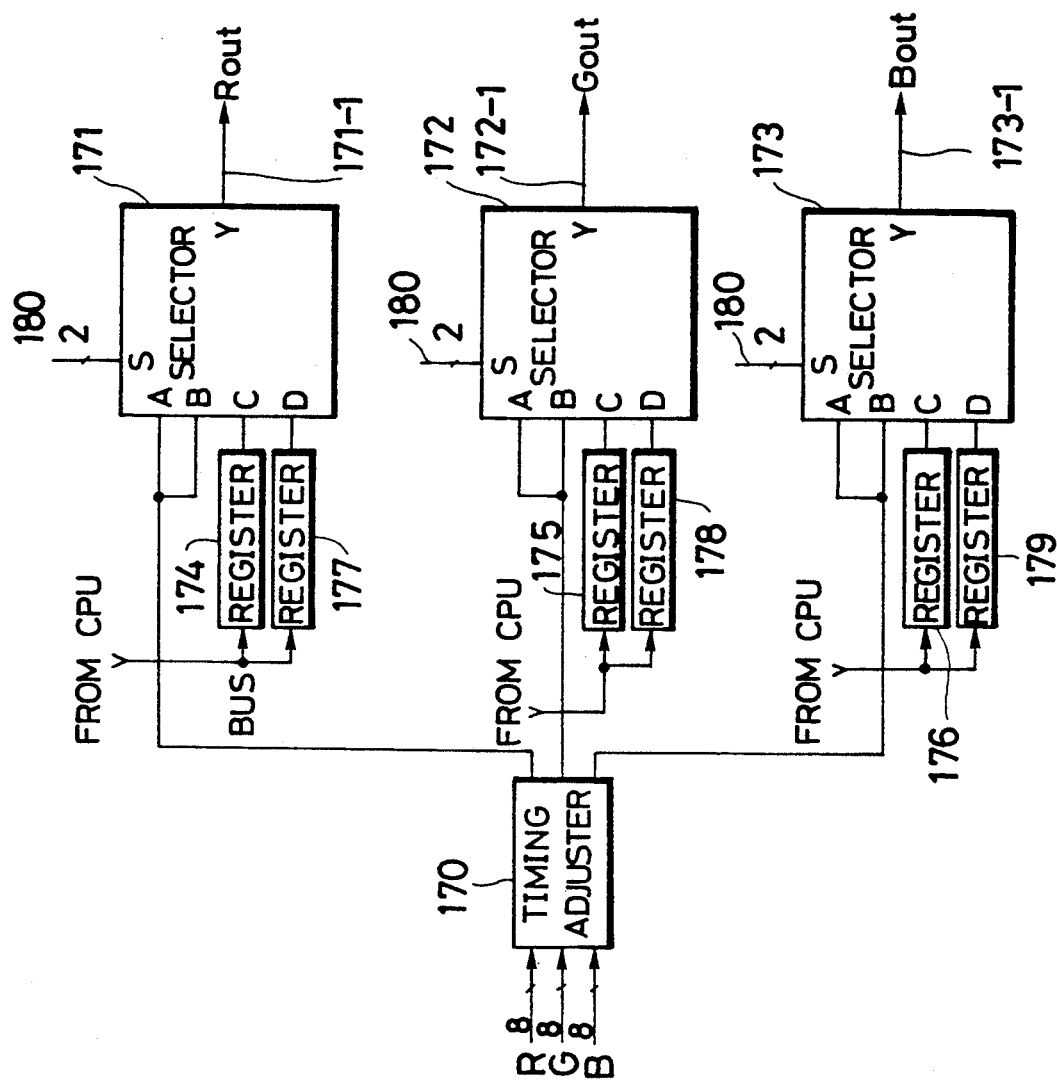
FIG. 11 is a block diagram showing the construction of the color converting circuit used in the embodiment shown in FIG. 1.

FIG. 11 is a block diagram showing the construction of the color conversion circuit of the color identifying/converting circuit 105.

The illustrated color conversion circuit is arranged to select the original signal or a signal which has been color-converted in accordance with an output 98 from the color identifying section and an output Sc from the color identifying section 108.

In the figure, a timing adjusting circuit is denoted by 170, and selectors are denoted by 171, 172 and 173. Registers 174, 175 and 176 store color separation data representing color obtained by converting the color of a picture element which corresponds to a detected color but which is not contained in an outline portion. Registers 177, 178 and 179 store color separation data representing color obtained by converting the color of a picture element which corresponds to a detected color and which is contained in an outline portion.

The timing adjusting circuit 170 delays each color separation R, G and B signal by the number of lines equivalent to the amount of delay occurring in the smoothing section 66 and the block processing section 95. Specifically, an FIFO memory having a capacity for one line is utilized to delay each of the color separation R, G and B signals by an amount equivalent to two lines and approximately eleven to nineteen clocks.

The selectors 171, 172 and 173 select through-data or color conversion data. The following is a description of a select signal 180 to be applied to each of the selectors 171 to 173. The select signal 180 is generated by the circuit shown in FIG. 12.

Figure 12:
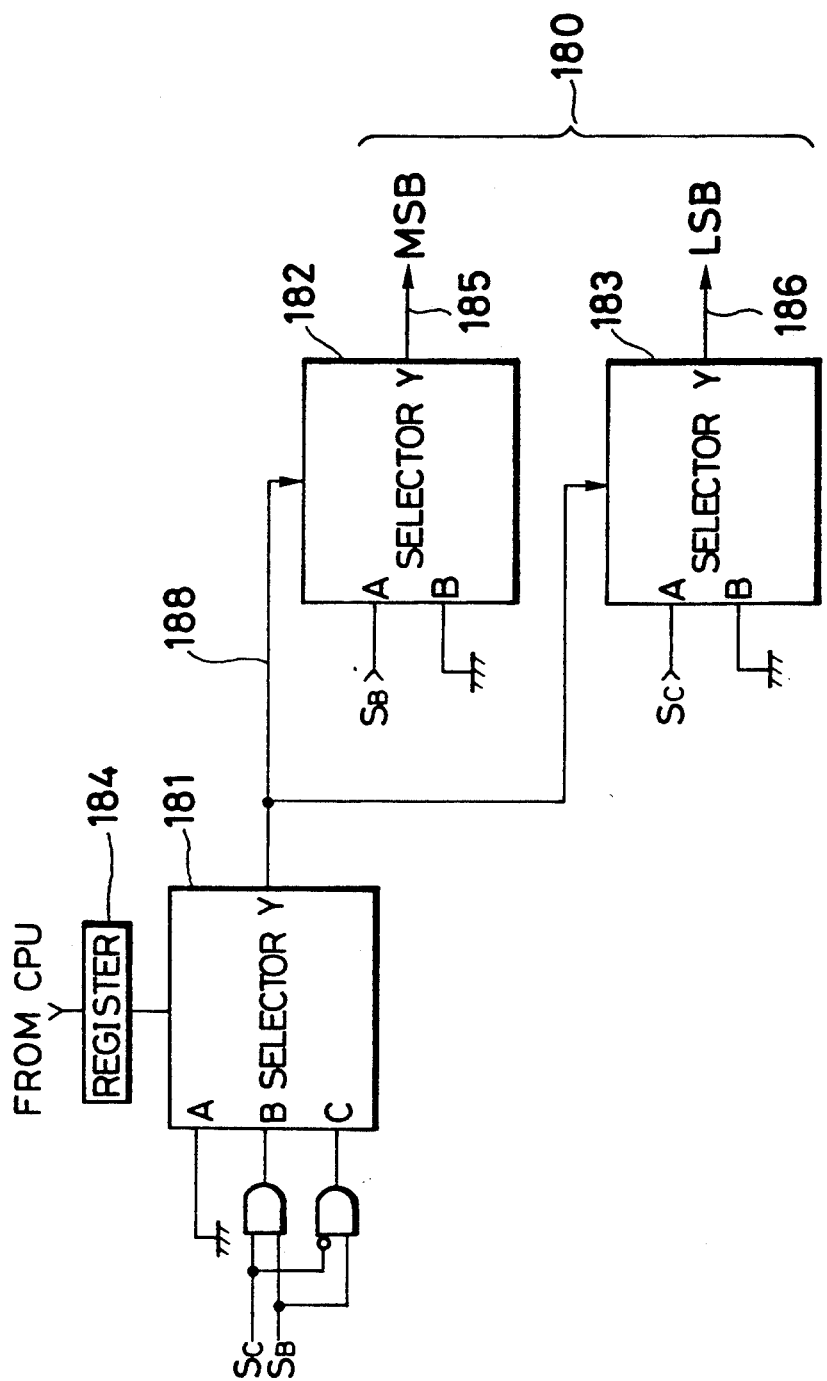
FIG. 12 is a circuit diagram showing an example of a circuit for generating a select signal to control each selector in the color converting circuit of FIG. 11.

In FIG. 12, reference numerals 181, 182 and 183 denote selectors, and each of the selectors 182 and 183 selects its B input when a select input 188 is "1" and its A input when the select input 188 is "0". Output signals 185 and 186 in each mode and the output signals 171-1, 171-2 and 171-3 shown in FIG. 11 will be described below. The three primary modes are as follows, and the output signal 185 corresponds to the most significant bit (MSB) of the select signal 108, while the output signal 186 corresponds to the least significant bit (LSB) of the select signal 180.

(1) Mode for applying color conversion to both a picture element which does not correspond to a detected color or an outline and a picture element which corresponds to the detected color and the outline.

In this mode,
Register 184→"00" (the A input is selected),
Output 188 of the selector 181→"0",
Output 185 of the selector 182→A input ($S_B$)
Output 186 of the selector 183→A input ($S_C$)
where $S_B$ is the output from the block processing section 95, and $S_C$ is the output from the outline extracting section 106.

In this mode, the selectors 171, 172 and 173 shown in FIG. 11 select the values of the respective registers 174, 175 and 176 for the case of a picture element which does not correspond to the detected color nor the outline, and the values of the respective registers 177, 178 and 179 for the case of a picture element which corresponds to the detected color and the outline. With respect to any picture element other than the above picture elements, the selectors 171, 172 and 173 select the through-data supplied to the individual A and B inputs, and outputs the selected through-data so as to reproduce the color represented by the through-data.

(2) Mode for applying color conversion to only a picture element which does not correspond to a detected color or an outline.

In this mode,
Register 184→"01" (the B input is selected), and
Output 188 of the selector 181→B input.

The outputs of the selectors 182 and 183 are set to "00" when both $S_B$ and $S_C$ are "1". In the other cases, the output of the selector 182 is $S_B$, while the output of the selector 183 is $S_C$.

In this mode, the selectors 171, 172 and 173 of FIG. 11 operate so that the picture element which does not correspond to the detected color or the outline is represented by the values stored in the registers 174, 175 and 176. Any picture element other than the above picture element is represented on the basis of through-data.

(3) Mode for applying color conversion to only a picture element which corresponds to a detected color and an outline.

In this mode,
Register 184→"10" (the C input is selected), and
Output 188 of the selector 181→C input.

The outputs of the selectors 182 and 183 are set to "00" when $S_B$ is "1" with $S_C$ being "0". In the other cases, the selector 182 outputs $S_B$, while the selector 183 outputs $S_C$.

In this mode, the selectors 171, 172 and 173 of FIG. 11 operate so that the picture element which corresponds to the detected color and the outline is represented by the values stored in the registers 177, 178 and 179. Any picture element other than the above picture element is represented on the basis of through-data.

An operator can freely select a desired one from among the above three modes.

Figure 14:
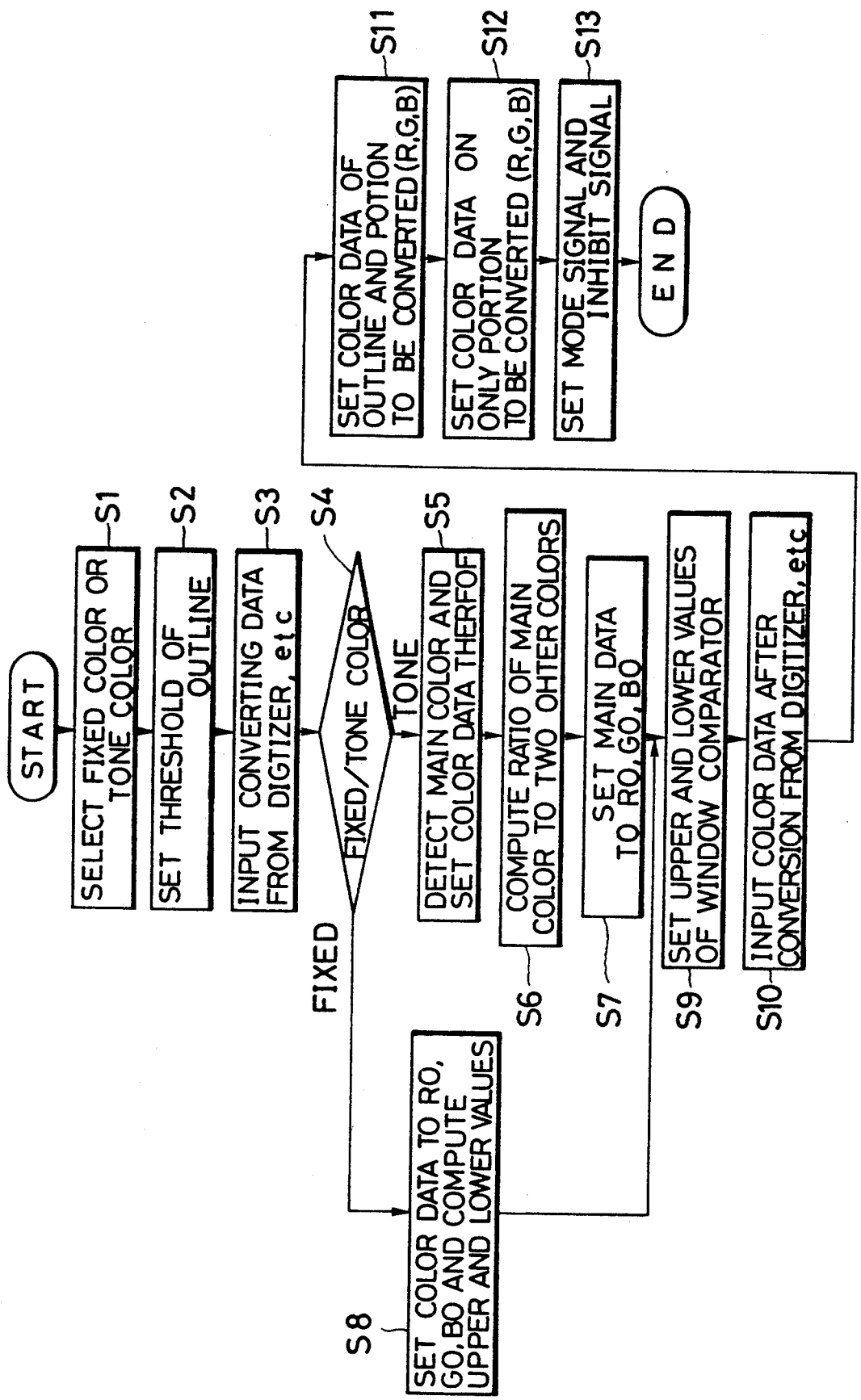
FIG. 14 is a flow chart showing the operation of CPU in the first embodiment.

FIG. 14 is a flow chart which serves to illustrate the operation of setting various types of data for the CPU 100 used in the embodiment. A control program for executing the process show in this flow chart is stored in the ROM 101.

In Step S1, the process of identifying a tone color or the process of identifying a fixed color is selected and the process of converting a tone color or the process of converting a fixed color is also selected. In accordance with the result of the selection, a select signal $S_2$ is set to "1" for the case of the fixed color, but is set to "0" for the case of the tone color. In Step S2, a threshold value which determines an outline is set in the register 57 (FIG. 5A) of the outline extracting section 108. In Step S3, data representing a color before color conversion is input from, for example, a digitizer, and the process proceeds to Step S4. In the case of the identification of a tone color, the process proceeds from Step S4 to Step S5. In Step S5, a main color (maximum-value color) in the data is identified and a data number indicating the main color is set in the decoder 71 (FIG. 6). The data number is determined in such a manner that each of $C_1$ and $C_0$ is set to "00" when the main color is red (R), "01" when the main color is green (G), and "10" when the main color is blue (B). Thus, the decoder 71 generates select signals 72R, 73G and 74B which are to be applied to the corresponding selectors 68, 69 and 70 provided for the respective R, G and B colors.

When the main color is determined, the process proceeds to Step S6, where the ratio of the main color to the two other colors is calculated. In Step S7, the data representing the main color is set as $R_0$, $G_0$ and $B_0$. In Step S9, the obtained ratio of the main-color data to the data on the two other colors is multiplied by each predetermined constant. The results of the calculation are set in the corresponding upper-ratio registers 82, 83 and 84 and the corresponding lower-ratio registers 85, 86 and 87. The upper ratio and the lower ratio of the respective upper-ratio and lower-ratio registers corresponding to the main data are determined so that the values of the main data are accommodated within an appropriate range. For example, if R is the main color, $R_0$ and the upper and lower ratios are set so that the upper and lower values of the window comparator 90 are set to "20" and "255", respectively.

The values set in each register when R is the main color are shown below by way of example:
$\gamma_2$→register 82,
$\gamma_1$→register 85,
$G_i/MC \cdot \alpha_2$→register 83,
$G_i/MC \cdot \alpha_1$→register 86,
$B_i/MC \cdot \beta_2$→register 84, and
$B_i/MC \cdot \beta_1$→register 87.

In Step S10, data representing a color to be obtained through color conversion is again input from a digitizer or the like. In Step S11, color data (R, G, B) which correspond to the outline and a portion to be color-converted is set and, in Step S12, color data (R, G, B) representing only the portion to be color-converted alone is set. In Step S13, the mode signals 146, 147 and 148, the inhibit signals 151, 152 and 153, and the select signal 156 are set, thereby completing the setting of the data in all the selectors and registers.

SECOND EMBODIMENT

Example of a serial input system

Although a system in which R, G and B signals are input in parallel is employed in the first embodiment, the second embodiment utilizes a serial input system, as will be described in detail below.

Figure 16:
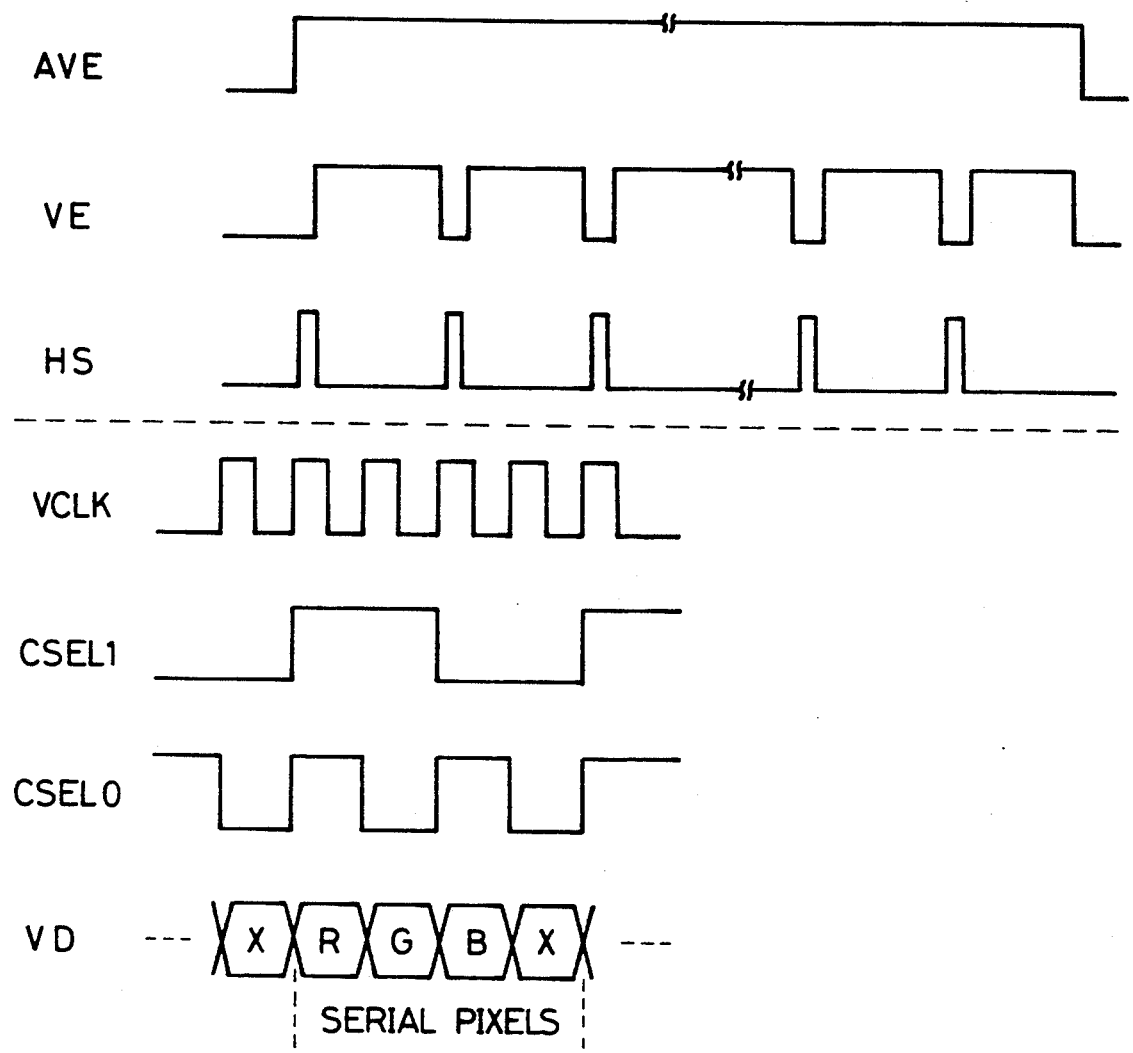
FIG. 16 is a timing chart showing the behaviors of primary signals in the second embodiment.

FIG. 16 is a chart showing the primary signals used in the serial system. Symbol AVE denotes a signal which indicates that the video signals over the entire period are available. Symbol VE denotes an available video signal for one line. Symbol HS denotes a signal which is output at the beginning of a new line (at the beginning of a 1 H period). Symbol VCLK denotes a video clock. Symbol CSEL1 denotes a signal obtained by dividing the frequency of the video clock VCLK by 2. Symbol CSEL0 denotes a signal obtained by dividing the frequency of the video clock VCLK by 4. Symbol VD denotes a signal selected by the signal CSEL1 or CSEL0, and the signal VD is read in a color-sequential manner of R, G, B and X (X is luminance information obtained by, for example, (R+G+B)/3).

Figure 15:
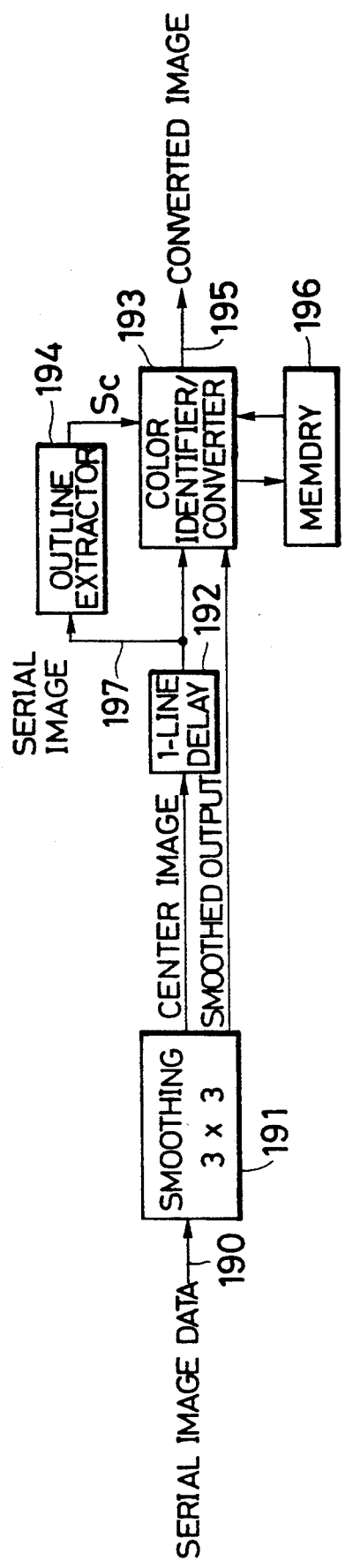
FIG. 15 is a block diagram schematically showing the construction of a second embodiment of the image processing apparatus according to the present invention.

FIG. 15 is a block diagram which serves to illustrate the color conversion process executed in the serial system of the second embodiment.

Referring to FIG. 15, a smoothing section 191 is arranged to apply a smoothing of 3×3 to serial image data 190, and a one-delay section 192 is arranged to delay, by one line, center image data which is not subjected to such smoothing. An outline extracting section is denoted by 194, and a color identifying/converting circuit for effecting identification and conversion of a color is denoted by 193. A buffer memory 196 is provided for effecting color conversion of all the portions of the 3×3 picture element block, which includes a certain picture element as the center picture element, when it is determined that the center picture element is a picture element to be color-converted, as shown in FIG. 10B.

Although the individual constituent elements will be explained below, the construction of the portion shown in FIG. 15 is substantially the same as the construction of the corresponding portion of the first embodiment described above. Accordingly, the following description will be centered on a portion associated with the processing of serial image data.

Figure 17:
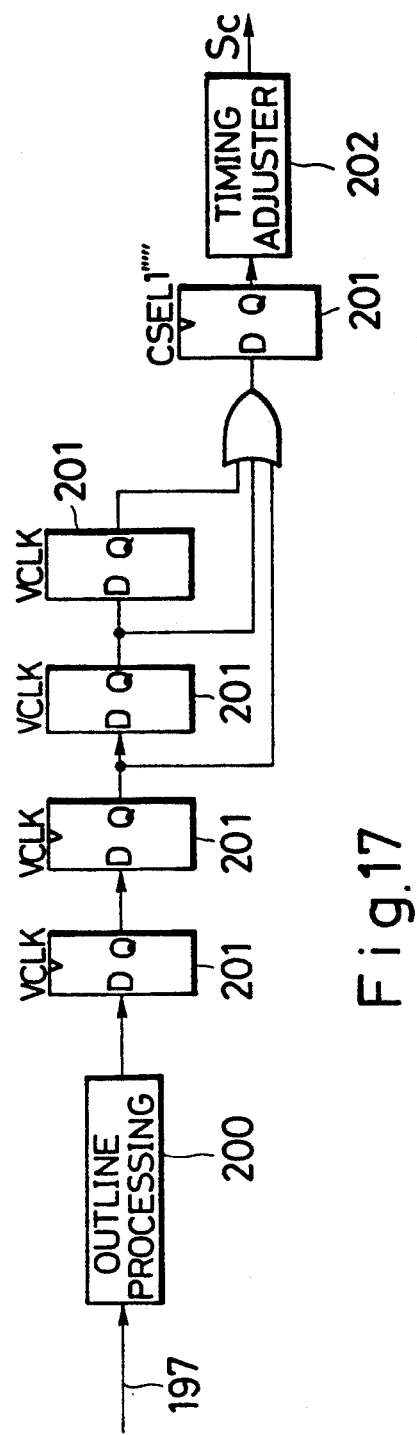
FIG. 17 is a block diagram schematically showing the construction of the outline extracting circuit used in the second embodiment.

FIG. 17 is a block diagram showing a specific example of the outline extracting circuit 194.

In the figure, an outline processing circuit is denoted by 200, D-type flip-flops by 201, and a timing adjusting circuit by 202. The outline extracting circuit 194 corresponds to the outline extracting circuit 108 of FIG. 4 incorporated in the above-described first embodiment. The difference between the outline extracting circuit 194 and the outline extracting circuit 108 of FIG. 17 resides in the fact that the circuit 194 includes four flip-flops 201 which serve to convert serial data into parallel data. The outline processing circuit 200 has a construction which is the same as that of each of the outline extracting circuits 36, 37 and 38. The outline processing circuit 200 makes a decision as to whether or not an objective picture element is contained in an outline.

Figure 18:
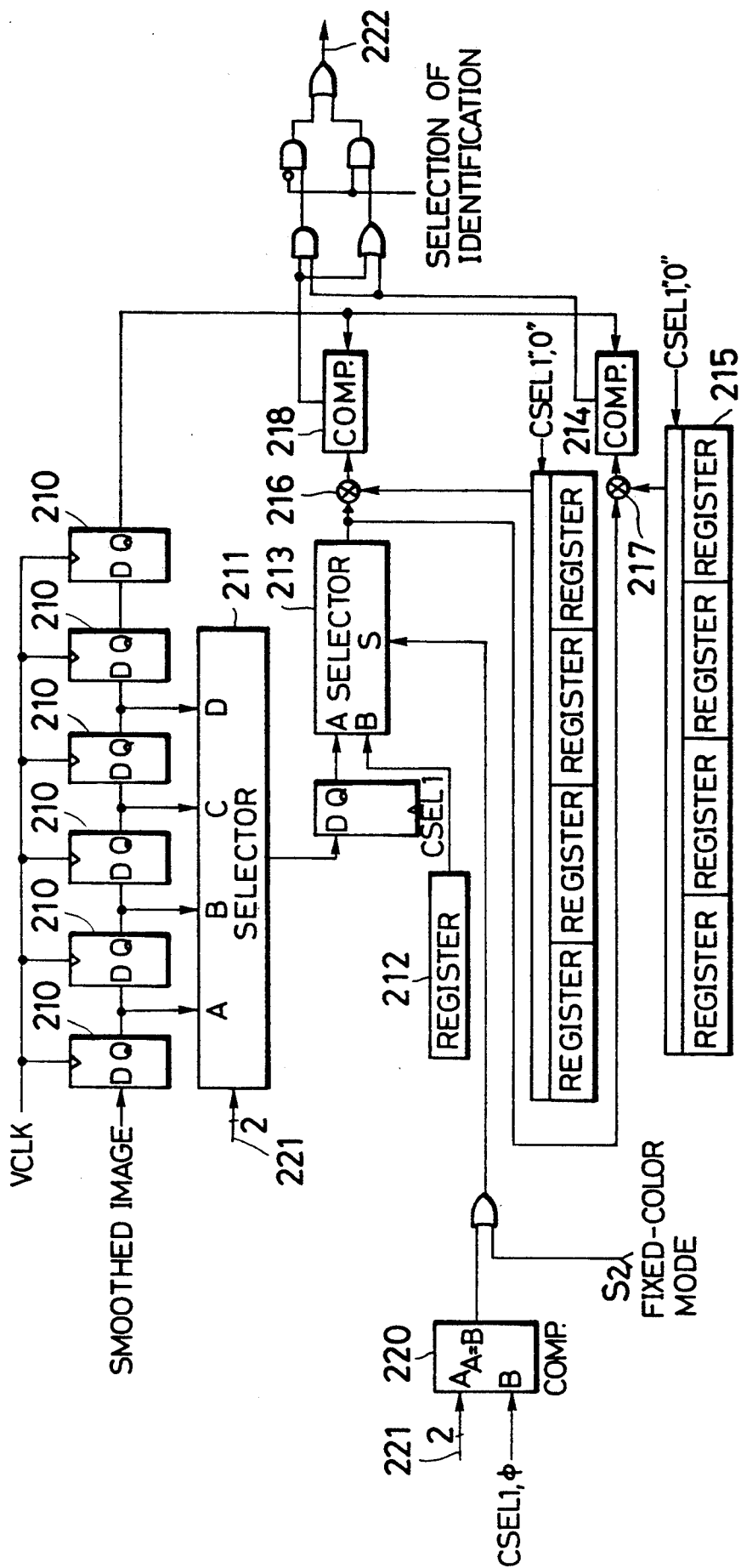
FIG. 18 is a block diagram showing the construction of the front portion of the color identifying section of the second embodiment.
Figure 19:
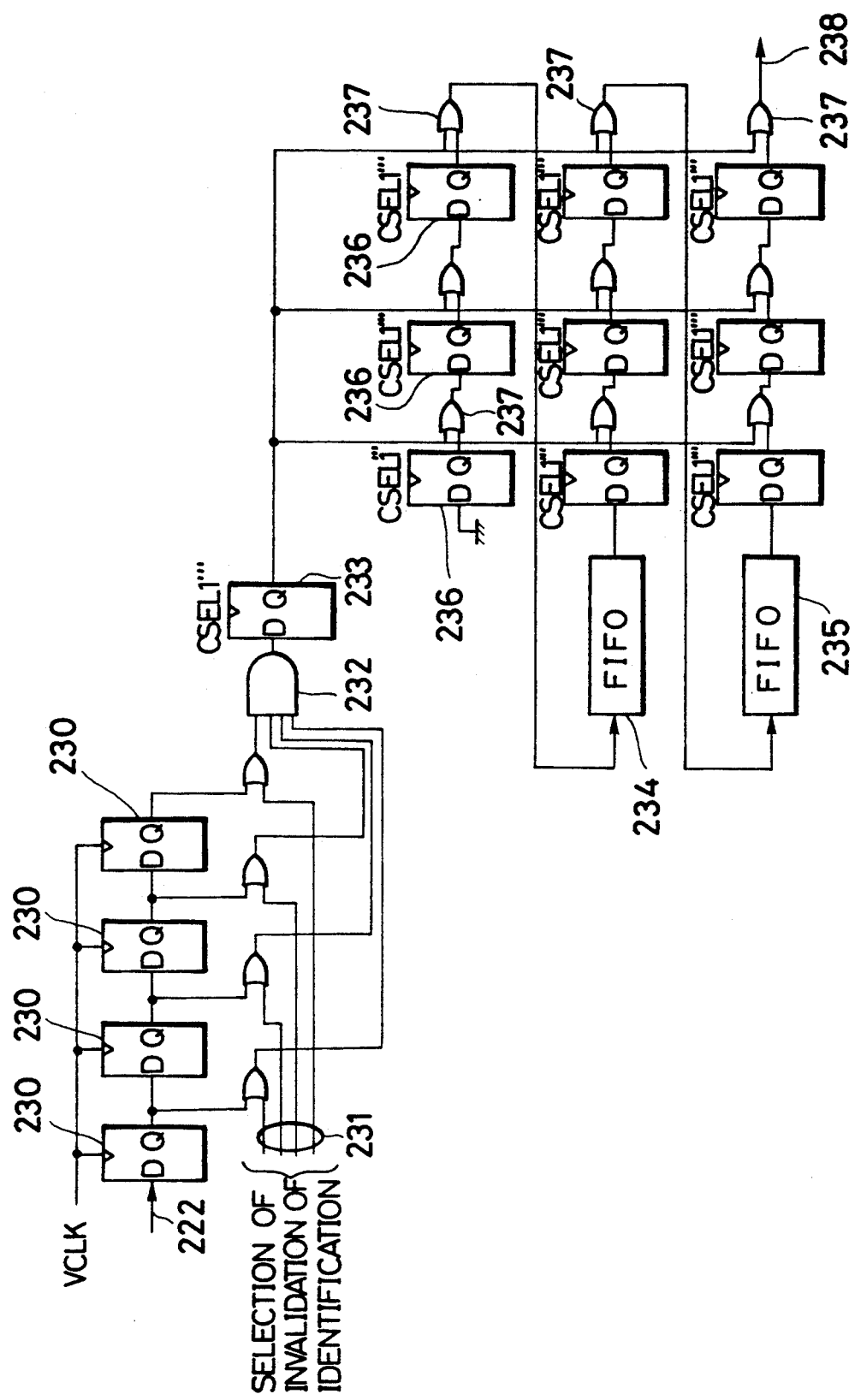
FIG. 19 is a block diagram showing the construction of the rear portion of the color identifying section of the second embodiment.

FIGS. 18 and 19 are block diagrams showing the construction of the color identifying section of the color identifying/converting circuit 193.

Referring to FIG. 18, each D-type flip-flop 210 performs serial/parallel conversion so as to supply four kinds of data to a selector 211 and is arranged to be delayed for synchronizing purposes. A register 212 is arranged so that a fixed value is set in it by the CPU through a bus. A comparator 220 outputs the timing at which the main-color data is transferred.

A selector 213 selects fixed-color data or main-color data. Registers 214 are arranged to set four kinds of upper ratios, while registers 215 are arranged to set four kinds of lower ratios. Multipliers 216 and 217 perform multiplications to determine the upper value and the lower value, respectively, on the basis of the main-color data and the corresponding register mentioned above. Comparators 218 and 219 are arranged to check whether the upper and lower values of each signal correspond to the upper and lower ratios, respectively. The outputs from the respective comparators 218 and 219 are input to a logic circuit provided at the rear of the comparators 218 and 219, whereby various color portions are detected by using various types of multiplication. (FIG. 18 corresponds to FIG. 6 which is connected with the first embodiment.)

FIG. 19 is a block diagram showing the rear-stage portion of the color identifying section which receives the result output from the front-stage portion shown in FIG. 18.

In the rear stage shown in FIG. 19, each D-type flip-flop 210 receives the signal VCLK and effects serial/parallel conversion so as to check whether or not four kinds of data are accommodated within respective certain ranges. Reference numeral 231 denotes a select signal which determines whether or not the result of identification executed by each D-type flip-flop 210 is invalid. Whether the result of each D-type flip-flop 210 is to be cancelled is determined on the basis of the select signal 231. An AND circuit 232 outputs a signal which indicates whether or not an objective picture element is a picture element to be color-converted. Further, the circuit shown in FIG. 19 includes FIFO devices 234 and 235, nine D-type flip-flops 236, and nine OR circuits 237 so as to execute a block process such as that shown in FIG. 10B. In this block process, if the center picture element of a 3×3 block is a picture element to be color-converted, all the picture elements of the block are processed as picture elements to be color-converted. Data 238 represents a final decision as to whether or not the objective picture element is a picture element to be color-converted.

The difference between the color identifying section of the second embodiment and the corresponding section in the first embodiment described above resides in the fact that the color identifying section of the second embodiment includes a serial/parallel conversion section. More specifically, in the second embodiment, the flip-flops 210 and the selectors 211 (all of which are shown in FIG. 18) as well as the flip-flops 230, OR circuits, the AND circuit 232 and the flip-flops 233 (all of which are shown in FIG. 19) are added.

The flip-flops 210 and the selector 211 cooperate to convert four kinds of serial signals into a parallel form, and the selector 211 selects a main-color signal from the four kinds of signal in accordance with a select signal 221. Further, in order to check whether or not the four kinds of signal fall within the respective set ranges, the flip-flops 230 and their associated elements effect serial/parallel conversion of the serial signals, whereby whether the objective picture element is a picture element to be color-converted is determined.

Figure 20:
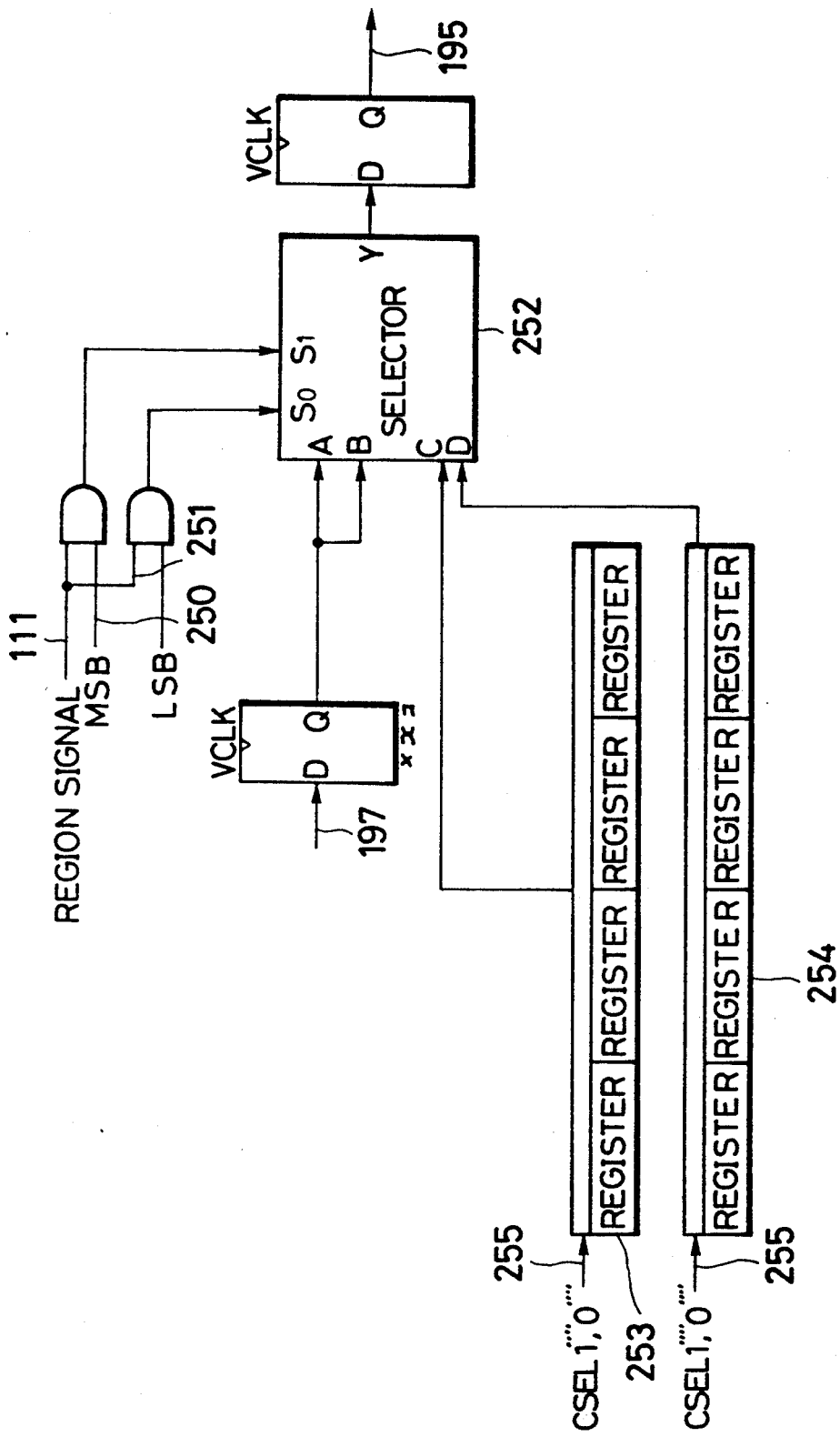
FIG. 20 is a block diagram showing schematically showing the construction of the color converting section incorporated in the second embodiment.

FIG. 20 is a block diagram of a color converting section.

Signals 250 and 251 correspond to the signals 185 and 186 shown in FIG. 12, and the output of a selector 252 is controlled in accordance with the signals 185 and 186. Each register assembly 253 and 254 includes four registers, and a desired one is selected from among the four registers in accordance with a clock 255 obtained by dividing the frequency of the signal VCLK. This selecting operation is controlled so that data is selected which is the same in kind as image data. The thus-selected data is input to the selector 252. The construction and arrangement of the remaining portion are similar to those of the corresponding portion in the first embodiment, and the illustration is therefore omitted.

The merits of such a serial system are as follows. First, the use of the serial system enables hardware to be realized with gates the number of which is smaller than the number of gates which would be required when hardware is realized by using a parallel system. Second, almost all the processing systems of the serial system can be operated at frequencies lower than the frequency of an image clock (in this embodiment, VCLK).

Each of the signals CSEL0', CSEL0'', CSEL0''', CSEL0'''' and CSEL0''''' which are shown in FIGS. 17 to 20 is equal in frequency to, but out of phase with, the signal CSEL0 shown in FIG. 14. Similarly, each signal CSEL1', CSEL1'', CSEL1''', CSEL1'''', and CSEL1''''', shown in FIGS. 17 to 20 is equal in frequency to, but out of phase with, the signal CSEL1 shown in FIG. 14.

THIRD EMBODIMENT

Another example of color identification

In each of the above-described embodiments, color data representing a color (main color) which exhibits the maximum value is selected from color separation data concerning detected colors, and color detection is performed on the the basis of the color data. However, color detection can also be realized by using a color detection method based on the total sum of color separation data. The basic block diagram of the latter method is completely the same as FIG. 3, and FIG. 21 has only to be substituted for FIG. 6.

Figure 21:
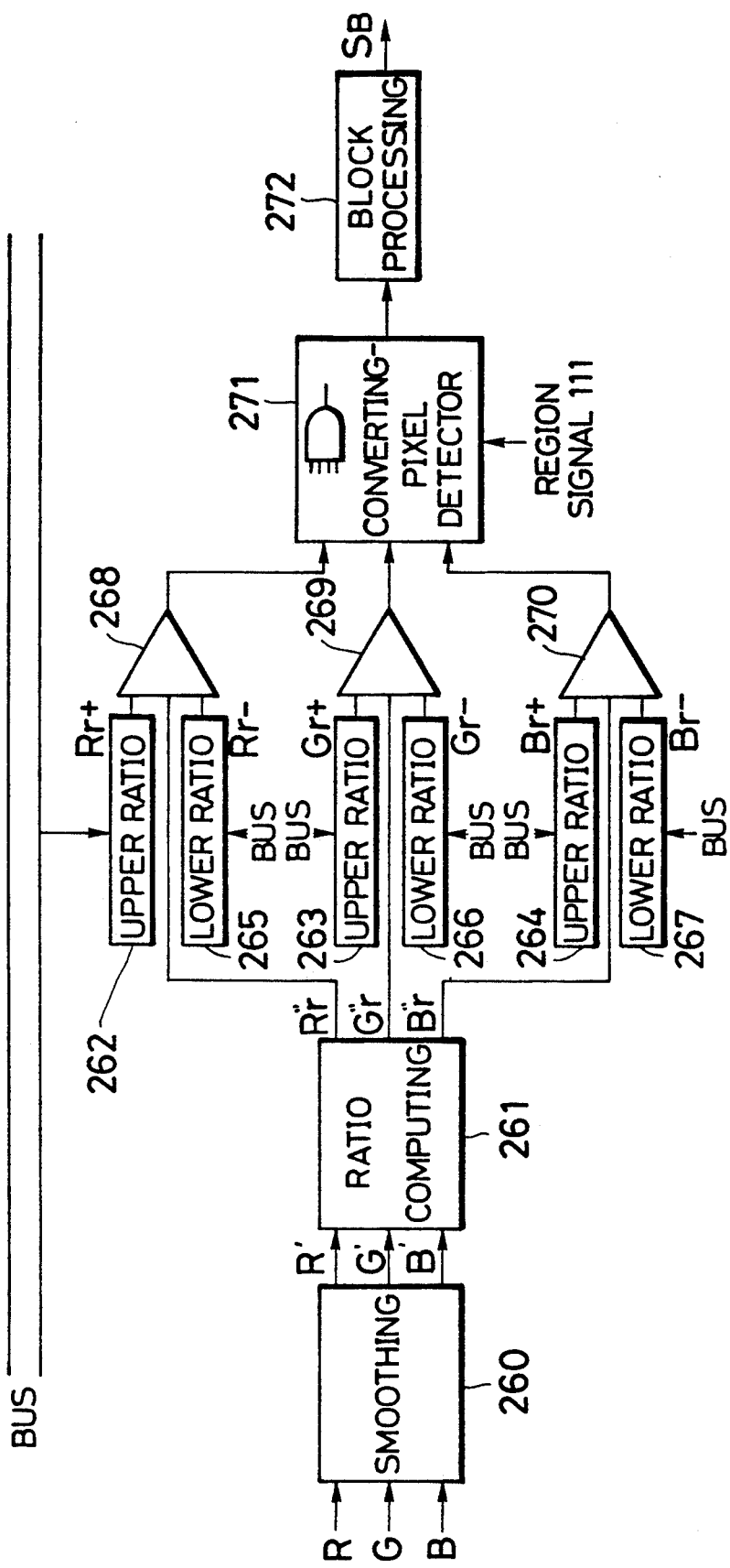
FIG. 21 is a block diagram showing schematically showing the construction of the color converting section incorporated in a third embodiment.
Figure 22:
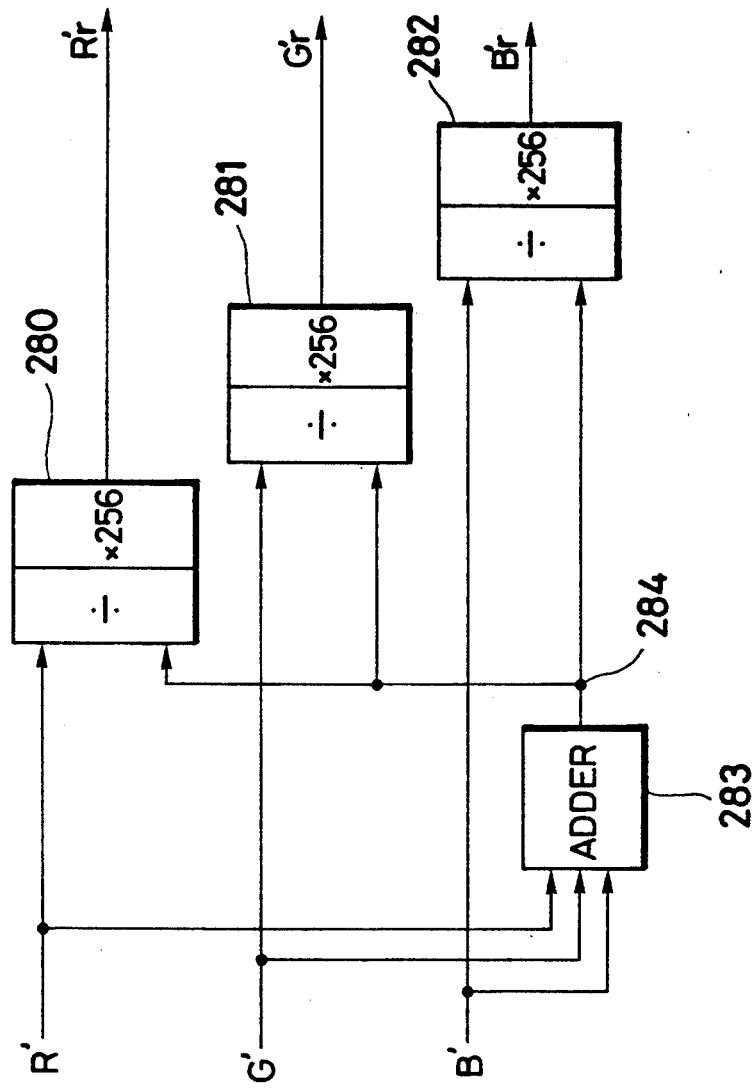
FIG. 22 is a block diagram which serves to illustrate the construction of a ratio computing circuit in the color identifying section of the third embodiment.

FIG. 21 is a block diagram showing a color identifying section which performs a function similar to that of the above-described color identifying section.

The illustrated color identifying section includes a smoothing section 260, a ratio computing circuit 261, registers 262, 263 and 264 for storing the upper ratios of respective R, G and B color separation data, registers 265, 266 and 267 for storing the lower ratios of the respective R, G and B color separation data. These upper and lower ratios are set in the corresponding registers by the CPU through a bus. The color identifying section also includes window comparators 268, 269 and 270, a converting-picture element detecting section 271, and a block processing section 272.

Each color separation data R, G and B is first smoothed by the smoothing section 260 shown in FIG. 21. The output results R', G' and B' are then input to a ratio computing circuit 261, where the following three calculations are performed. A circuit construction for executing such calculations is as shown in FIG. 20.

$$R''_r = \frac{R'}{R' + G' + B'} \times 256$$

$$G''_r = \frac{G'}{R' + G' + B'} \times 256$$

$$B''_r = \frac{B'}{R' + G' + B'} \times 256$$

where $R' + G' + B'$ represents the output value 284 of an adder 283.

Calculations in each divider/multiplier 280, 281 and 282 are realized by means of, for example, a ROM. Ratios $R_r''$, $G_r''$ and $B_r''$ are then supplied to the respective window comparators 268, 269 and 270 which follow the ratio computing circuit 261. The window comparators 268, 269 and 270 make a decision as to whether or not the ratios $R_r''$, $G_r''$ and $B_r''$ satisfy the following three conditions, respectively:

$$R_{r-} \leq R_r'' \leq R_{r+}$$

$$G_{r-} \leq G_r'' \leq G_{r+}$$

$$B_{r-} \leq B_r'' \leq B_{r+}$$

When any of the ratios satisfies the corresponding condition and when the region signal 111 is "1", the output of the converting-picture element detecting section 271 goes to "1". Finally, the block processing section 272 executes the process of detecting the boundary between the objective color portion and another color portion (in a manner similar to that explained in connection with FIG. 10A) The result $S_B$ of the detection is supplied to the selector control section (FIG. 12) of the color identifying/converting circuit 193.

As described above, according to this embodiment, the individual regions of an original document such as that shown in, for example, FIG. 2A can be independently color-converted in such a manner that an outline portion having a certain color and a region excluding the outline are processed independently of each other, whereby image such as that shown in FIG. 2C can be obtained. Accordingly, the above-described embodiment can be effectively applied to the preparation of a document for a color OHP, emphasis on characters, particularly, emphasis on characters representing a title, and so forth. Moreover, since it is possible to select a desired mode with respect to each individual mode, the above embodiment finds wide applications in the field of, for example, graphic design.

FOURTH EMBODIMENT

Color conversion for different outlines

Figure 23:
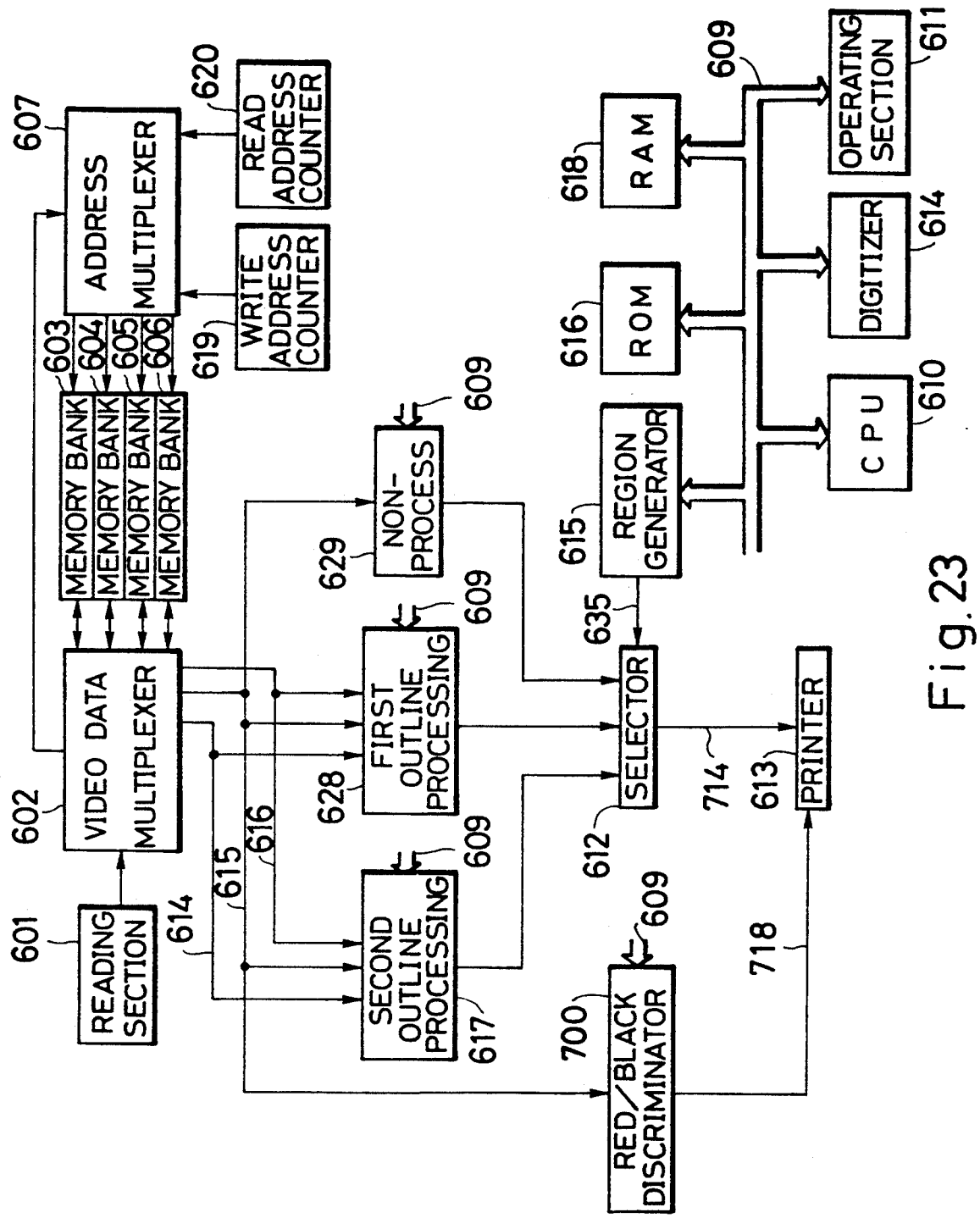
FIG. 23 is a block diagram showing a fourth embodiment of the image processing apparatus according to the present invention.

FIG. 23 is a block diagram of an image processing apparatus according the fourth embodiment. First of all, this embodiment will be explained with reference to an example in which two colors, red and black, are processed.

The image processing apparatus includes a readout section 601 arranged to read information from an original document and then to output 7-bit image data including a red/black bit which determines whether an output color is red or black, a video-data multiplexer 602 for determining the destination of the image data, four memory banks 603, 604, 605 and 606, an address multiplexer 607, a write address counter 619, a read address counter 620, the elements 607, 619 and 620 cooperating to select a memory bank in which data is to be stored and determine an address of the selected memory bank, a first outline processing circuit 628 for executing an outline process 1, a second outline processing circuit 617 for executing an outline process 2, a non-process circuit 629 arranged to execute no outline process, a CPU 610 for performing arithmetic operations and processes, an operating section 611, such as a keyboard, to be operated by an operator, a digitizer 614 used for designating a particular region, a region generating circuit 615 for generating a region signal, a ROM 616 for storing the processing program of the CPU 610, a RAM for auxiliary storage, a selector 612 responsive to the output of the region generating circuit 615 for selecting one output from the outputs of the non-process circuit 629, the first outline processing circuit 628, and the second outline processing circuit 617, a red/black discriminating circuit 700 for discriminating between red and black, and a printer 613 for effecting two-color printing in red and black.

The CPU 610 controls and sets a value in each of the process elements through a bus 609. The video data multiplexer 602, the respective outline processing circuits, and the red/black discriminating circuit 700 are connected by a communication line 614, a communication line 615, and a communication line 616, as shown in FIG. 23. Data representing a line immediately previous to an objective line is transmitted through the communication line 614, data representing the objective line is transmitted through the communication line 615, and data representing data representing a line subsequent to the objective line is transmitted through the communication line 616.

Image data consisting of seven bits including a red/black bit is transmitted from the readout section 601, and the image data is sequentially written into the memory banks 603 to 606 in units of lines by the operation of the video data multiplexer 602 and the address multiplexer 607. First, the image data for one line is written into each of the memory banks 603, 604 and 605. Then, when writing of the next line into the memory bank 606 is started, the data written into the memory banks 603 to 605 is read out in synchronization with the start of the writing. The data thus read out are transmitted to the first outline processing circuits 628 and 617 through the communication lines 614, 615 and 616. Data representing the objective picture line alone is also transmitted to the non-process circuit 629.

Then, when the writing to the memory bank 606 is completed and writing to the memory bank 603 is started, the data of the memory banks 604, 605 and 606 is read out. Thus, the data read from the memory bank 604 becomes data representing a line immediately previous to an objective line, the data read from the memory bank 605 becomes data representing the objective line, and the data read from the memory 606 becomes data representing a line subsequent to the objective line. The above process is sequentially effected on all the lines by using the four memory banks 603 to 606.

In accordance with the inputs from the digitizer 614 and the operating section 611, a desired process is selected from among the outline process 1, the outline process 2 and the non-process, and a region to which the selected process is to be applied is determined.

If the outline process 1 or 2 is to be performed, a decision is made as to a density slice level, a color to be obtained through the selected outline process, whether or not the portion other than the outline is to be output, and so forth. If the non process is selected, it is determined whether a negative process or a positive process is to be performed. The resultant image data 714 and red/black bit data 718 are transmitted to a printer 613.

Figure 24:
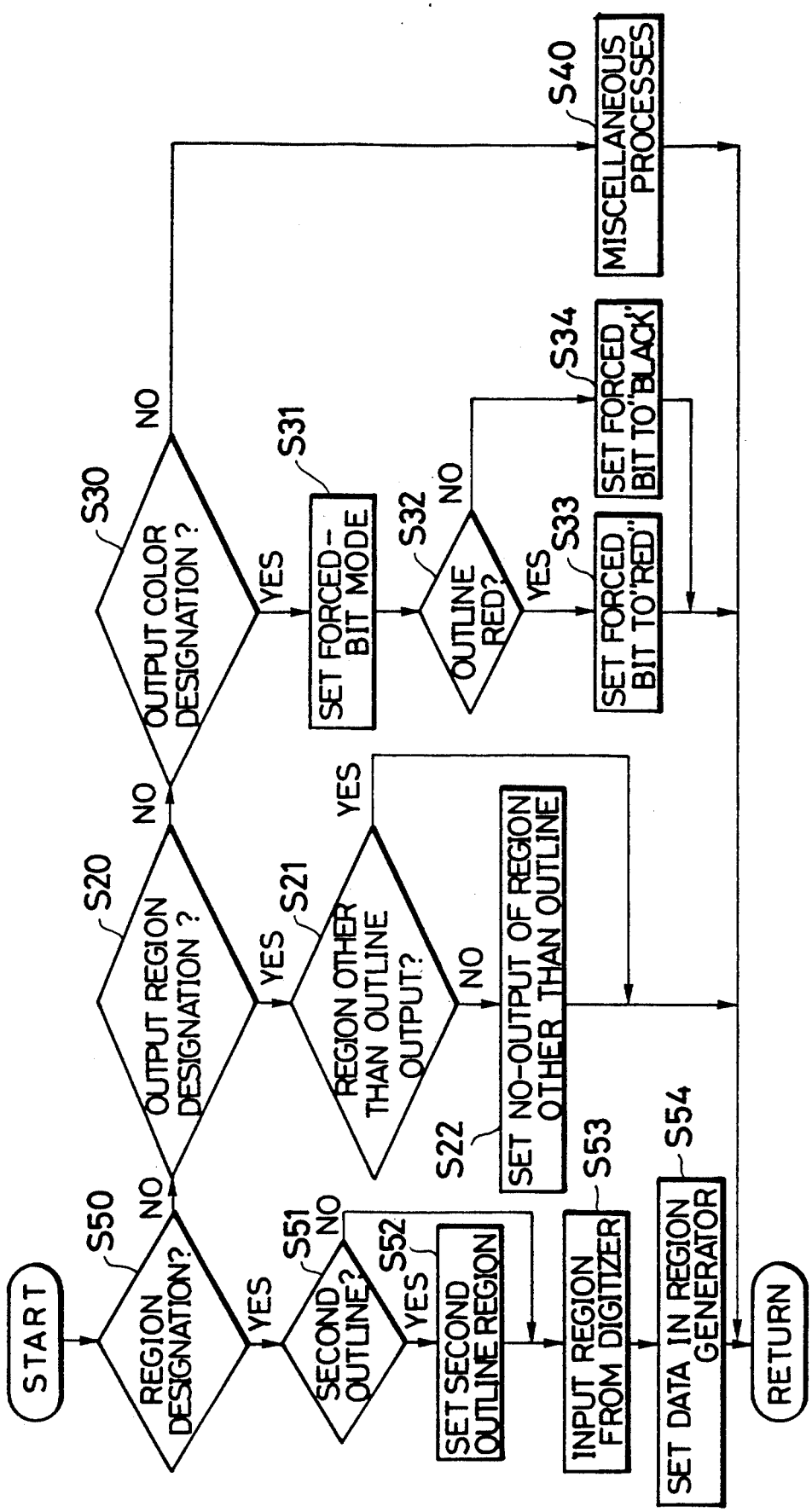
FIG. 24 is a flow chart showing the operation of CPU 610 in the fourth embodiment.

FIG. 24 is a flow chart showing the operation of the CPU 610 of the present embodiment. The illustrated flow chart includes only steps particularly related to the fourth embodiment. Accordingly, the designation of a negative or positive process, the setting of a slice level for identification of an outline, and so forth are collectively shown as "MISCELLANEOUS PROCESSES" and the detailed illustration is omitted.

First, in Step S50, whether or not the execution of the designation of a particular region has been selected is determined. If the answer is "NO", the process proceeds to Step S20, wherein the execution of designation of a region to be output has been selected is determined. If the answer is "NO", the process proceeds to Step S30, wherein the execution of designation of a color to be output has been selected is determined. These steps are executed by operation of the operating section 611.

If the execution of the designation of a particular region is selected, the process proceeds to Step S51, where it is determined whether this region designation is intended for the outline process 1 or the outline process 2. If the region designation is intended for the outline process 2, the outline process 2 is selected in Step S52. In Step S52, if the outline process 2 is not selected, the outline process 1 is selected, and if neither the outline process 1 nor the outline process 2 is selected, the non-process is selected. Then, in Step S53, a designated region is input from the digitizer 614. It is preferable that this region designation be performed by inputting two selected points for the sake of simplified operation. Data corresponding to the designated region which has been input in Step S54 is set in a memory section in the region generating circuit 615. This setting in the memory section in the region generating circuit 615 will be explained in detail in the following description of the region generating circuit 615.

If the execution of the designation of a region to be output is selected, the process proceeds from Step S20 to Step S21, where whether or not a portion other than the outline is to be output is determined. If the portion is not to be output, the process proceeds to Step S22, where the first and second outline processing circuits 628 and 817 which will be described later in detail are set so that no portion other than the outline is output. In the following description, it is assumed that the circuits 628 and 617 are set so that the portion other than the outline is also normally output.

If the execution of the designation of a color to be output is selected, the process proceeds from Step S30 to Step S31, where the red/black discriminating circuit 700 which will be described in detail later is set to a forced-bit mode. Then, it is determined in Step S32 that the outline is painted in red or black. If the answer is "red" the process proceeds to Step S33, where the forced bit is set to "red", while if the answer is "black", the process proceeds to Step S34, where the forced bit is set to "black".

If none of the execution of the designation of a particular region, the execution of the designation of a region to be output and the execution of the designation of a color to be output is selected, the process proceeds to Step S40, where the designation of a negative or positive process, the setting of a slice level for identification of an outline, and other operations are performed.

Figure 25:
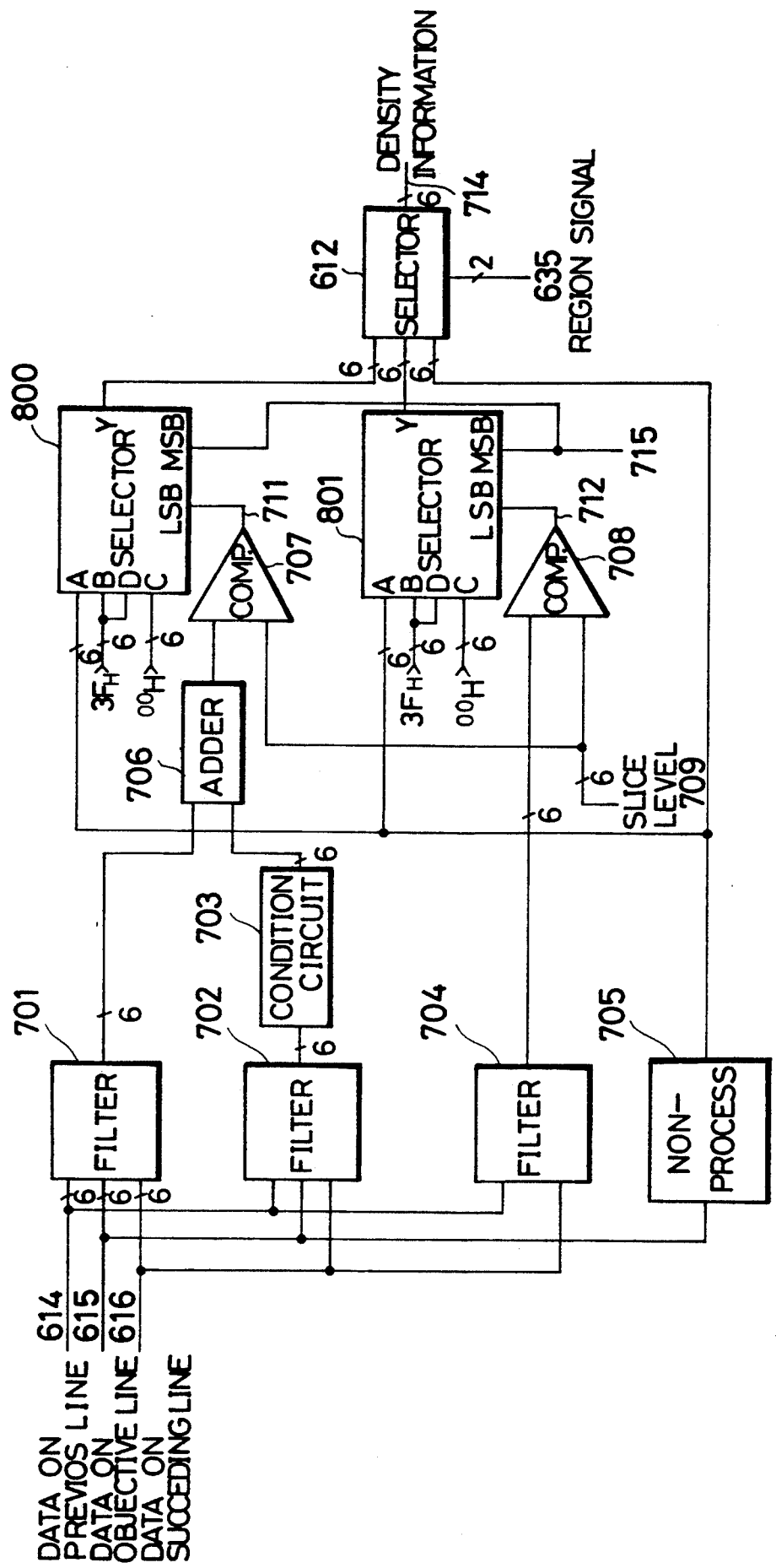
FIG. 25 is a block diagram showing a first outline processing circuit, a second outline processing circuit, and a non-process circuit in the fourth embodiment.

FIG. 25 is a detailed block diagram showing the first outline processing circuit 628, the second outline processing circuit 617, and the non-process circuit 629 in the present embodiment.

In FIG. 25, the first outline processing circuit 628 consists of a block for detecting an outline and a block for outputting the outline alone in a color which differs from the color of a corresponding character body. Specifically, an output image such as that shown in FIG. 2C can be obtained from an original such as that shown in FIG. 2A.

The block for detecting an outline includes a filter circuit 704 and a comparator 708, while the block for outputting an outline in a color which differs from that of a corresponding character body includes a selector 801. Both blocks execute the following process.

In the filter 704, data 614, 615 and 616 for three lines are subjected to a filtering process C having the characteristics shown in FIG. 26C. In FIG. 26C, $\beta$ represents a factor of $\frac{1}{4}$ to $\frac{1}{8}$. The result of this operation is supplied to a comparator 708, where it is compared with a slice level 709 for binary-decoding purposes. In the case of the outline, the output 712 of the comparator 708 goes high and the selector 801 selects a B input or a D input (3FH). A signal 715 is a signal which serves to determine whether picture elements other than the outline are to be output. An operator can freely change the setting of the signal 715. If the signal 715 is low in the case of the outputting of a portion other than the outline, the selector 801 selects an A input to output the non processed data supplied from a non-process circuit 705. If the signal 715 is high in the case of the outputting of the portion other than the outline, the selector 801 selects a C input (00H). In this embodiment, although the selector 801 is arranged to normally select the D input (3FH) when an outline is to be output, the density of the outline can be freely adjusted by the operator.

The second outline processing circuit 617 similarly consists of a block for detecting an outline and a block for outputting an outline alone in a color which differs from that of a corresponding character body. Specifically, an output image such as that shown in FIG. 2D can be obtained from an original such as that shown in FIG. 2A.

The block for detecting an outline includes the filter circuit 701, a filter circuit 702, a condition circuit 703, an addition circuit 706, and a comparator 707, while the block includes a selector 800 for outputting an outline alone in a color which differs from that of a corresponding character body. In the outline process 2 executed by the second outline processing circuit 617, two filtering processes A and B each having a different characteristic are combined to provide an output while changing the thickness of a raising edge portion and that of a falling edge portion. The operation of the second outline processing circuit 617 will be described in detail below.

The data 614, 615 and 616 for three lines are subjected to each of the filtering processes A and B which are executed in the filter circuit 701 and the filter circuit 702, respectively. The filtering processes A and B have the characteristics shown in FIG. 26A and 26B, respectively. In FIG. 26B, $\alpha$ is a factor of $\frac{1}{4}$ to $\frac{1}{8}$. Then, in the addition circuit 706, the result obtained from the filtering process A is added to the result obtained by passing the output result of the filtering process B through the condition circuit 703. (The condition circuit 703 outputs "zero" when it receives a signal representing a minus value, but, when receiving a signal representing a value other than the minus value, the condition circuit 703 outputs a signal which is the same as the input.) The result of this addition is compared with the slice level 709 in the comparator 707, whereby the result is obtained as a binary coded output 711. In the case of an outline, the selector 800 outputs 3FH, but, in the case of a portion other than the outline, the selector 800 outputs data representing an objective picture element. In this mode, it is also possible to select a setting which does not allow a portion other than the outline to be output, as described above. In this case, an outline-image having a plurality of colors and extracted only on outline portion is obtained. In response to a 2-bit region signal 635, the non-process, the outline process 1 or the outline process 2 can be selected in accordance with which region has been designated by the operator's operation of the operating section 611. More specifically, the CPU 610 changes the level of the region signal 635 in accordance with the operation of the operating section 611, whereby a process which the operator is desirous to execute is selected by the selector 612. The thus-obtained density information 714 is supplied to the printer 613.

Figure 27:
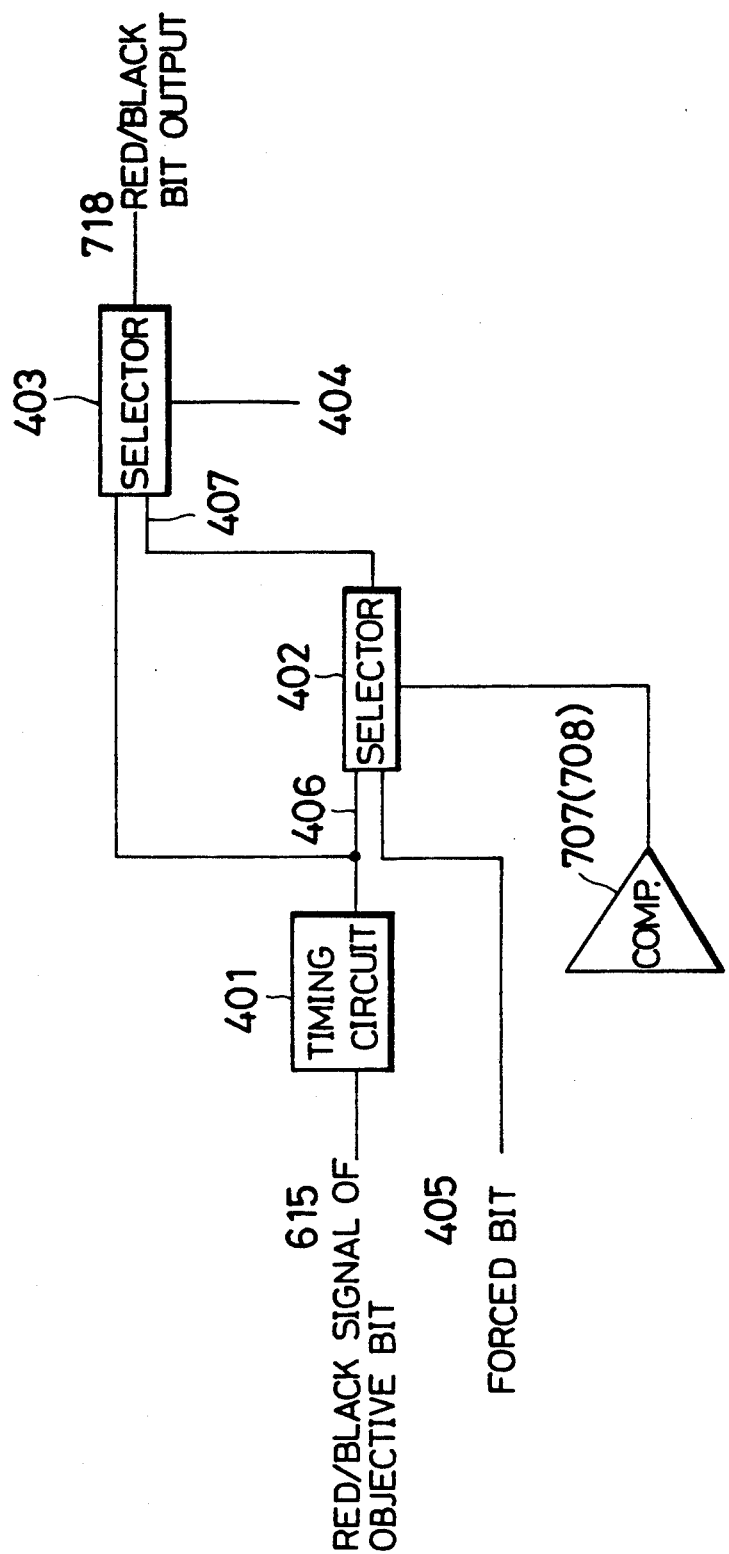
FIG. 27 is a block diagram showing an outline-color converting circuit according to the fourth embodiment.

FIG. 27 is a block diagram which serves to illustrate the red/black discriminating circuit. The red/black discriminating circuit is arranged such that the operator can freely select the color of outline information to be output (between, for example, red and black), and includes a timing circuit 401, a selector 402, and a selector 404.

The following explanation is given on the basis of the assumption which will be described below. If the color of image data is identified as red, the red/black bit is set to "1", while if that color is identified as black, the red/black bit is set to "0". If image data represents an outline, the output of the comparator 707 or 708 is set to "1", while if image data represents no outline, that output is set to "0". During a forced-bit mode, if a signal 404 goes to "1" and if the output of the comparator 707 or 708 goes to "1", the selector 402 provides a forced bit 405 as an output 407. If the output of the comparator 707 or 708 goes to "0", the selector 402 provides the output 406 of the timing circuit 401 as an output 407. If the signal 404 is "1", the selector 403 provides the output 407 of the selector 402 as an output 718, while if the signal 404 is "0", the selector 403 provides the output 406 of the timing circuit 401 as the output 718.

The timing circuit 401 is a circuit for synchronizing the red/black signal of an objective bit with a corresponding objective picture element, and consists of flip-flops. If an objective picture element is contained in an outline, the selector 402 outputs the forced bit 405, but if the objective picture element is not contained in the outline, the selector 402 outputs the red/black signal 406 of the objective bit which has been delayed in the timing circuit 401. The selector 403 supplies the output 407 of the selector 402 as the red/black bit output 718 if the forced-bit mode is selected, but if no forced-bit mode is selected, the selector 403 outputs the output 406 of the timing circuit 401 as the red/black bit output 718. Accordingly, under such a rule, if the forced-bit mode is selected and if an objective picture element is contained in an outline, the forced bit 405 is supplied as the red/-black bit output 718. Otherwise, the red/black signal 615 is output as the red/black bit output 718. Accordingly, the operator can freely designate the color of the outline.

FIFTH EMBODIMENT

Example of color image processing

Figure 28:
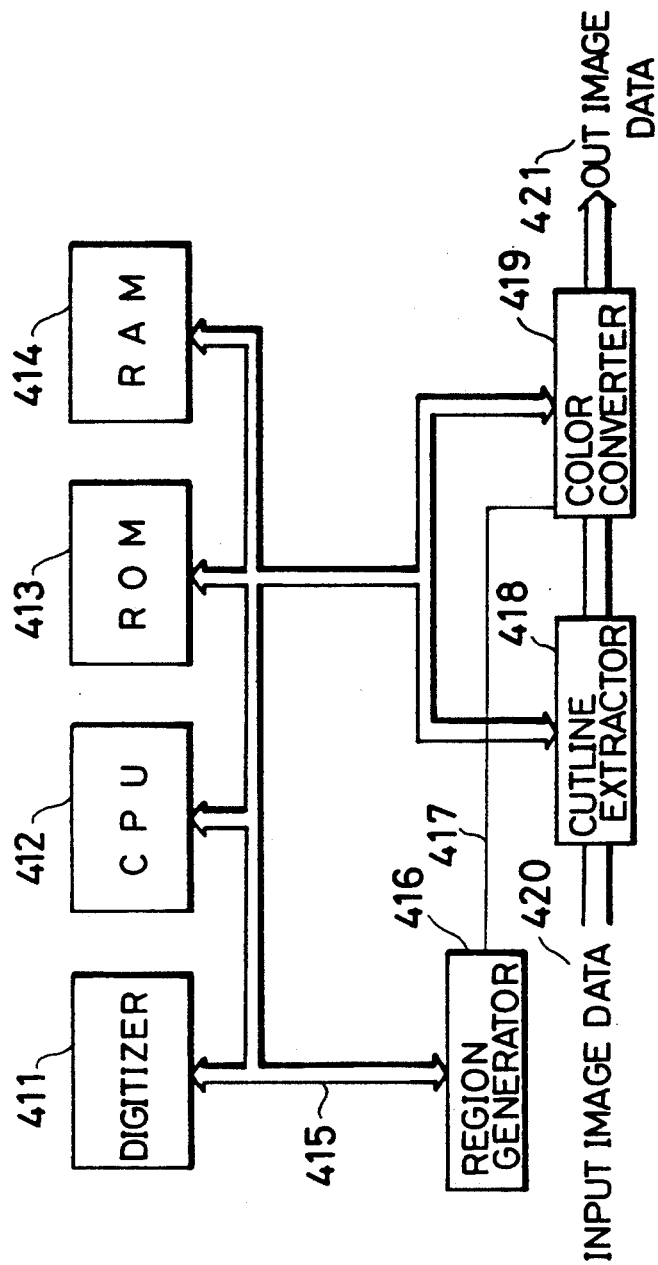
FIG. 28 is a block diagram showing a fifth embodiment of the image processing apparatus according to the present invention.

FIG. 28 is a block diagram showing the fifth embodiment of the image processing apparatus according to the present invention.

The fifth embodiment of the image processing apparatus according to the present invention includes a digitizer 411 used for designating a desired color in color conversion, a CPU 412 for executing arithmetic operations and various processes, a ROM 413 in which process programs and the like are stored, a RAM 414 for auxiliary storage, a region generating circuit 416 for generating a region signal, an outline extracting circuit 418 for extracting an outline portion from input image data 420, a color converting circuit 419 for converting the color of the outline into an arbitrary color and outputting the result as output image data 421, and a CPU 415 for connecting these elements.

Figure 29:
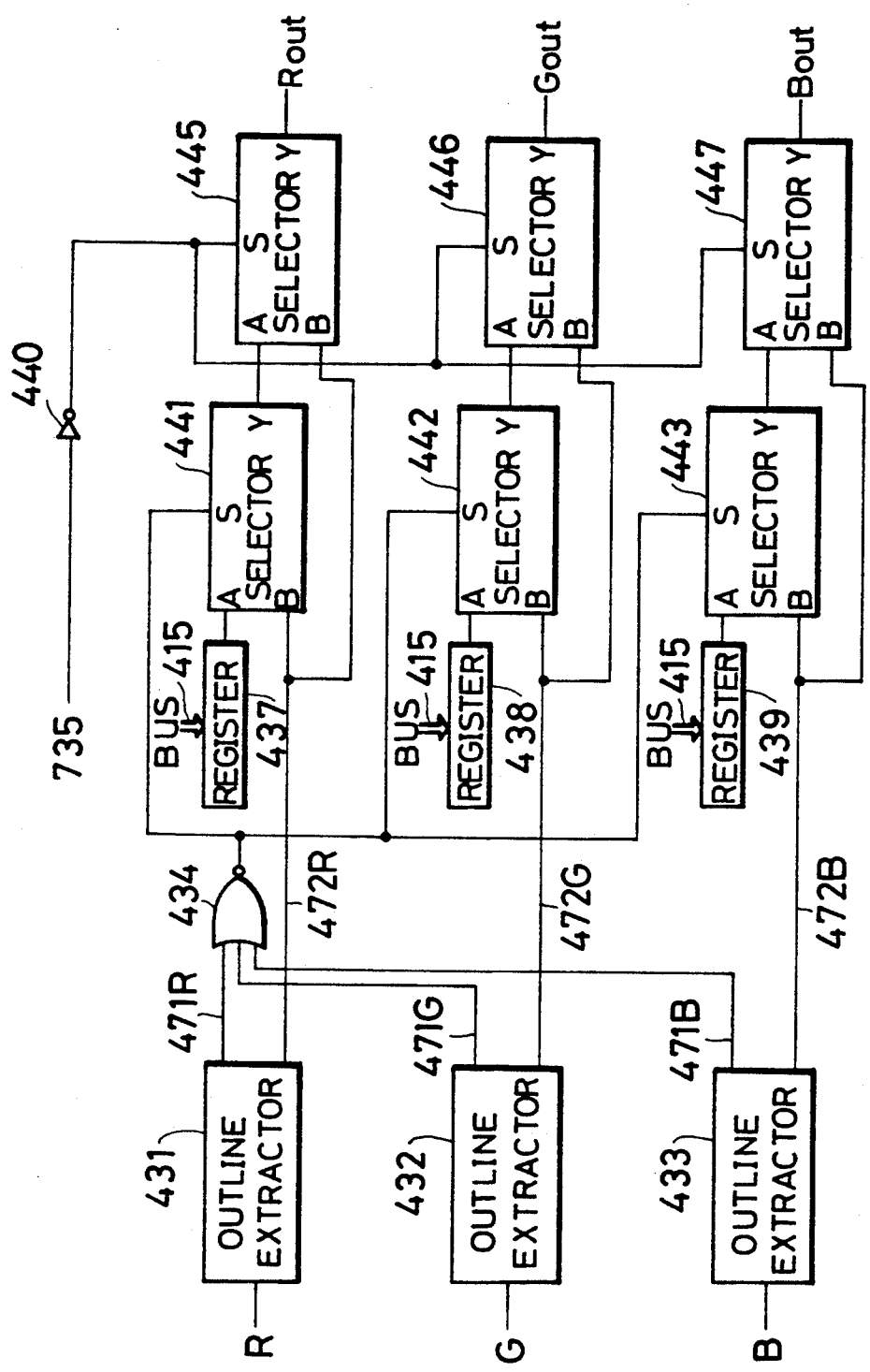
FIG. 29 is a circuit diagram showing an example of the outline extracting circuit of the fifth embodiment and an example of the color converting circuit of the same.

FIG. 29 is a circuit diagram showing the outline extracting circuit 418 and the color converting circuit 419 which are shown in FIG. 28.

The outline extracting circuit 418 and the color converting circuit 419 which are incorporated in this embodiment is composed of an outline extracting circuit 431 for extracting an outline on the basis of the color separation data R, an outline extracting circuit 432 for extracting an outline on the basis of the color separation data G, an outline extracting circuit 433 for extracting an outline on the basis of the color separation data B, a NOR gate 434, an inverter 440, a register 437 for storing the R data of an outline picture element, a register 438 for storing the G data of the outline picture element, a register 439 for storing the B data of the outline picture element, selectors 441, 442 and 443 for selecting color data or through-data of the outline picture element, the selectors 441, 442 and 443 corresponding to R data, G data and B data, respectively, and selectors 445, 446 and 447 for selecting color data or through-data of the outline picture element, the selectors 445, 446 and 447 corresponding to R data, G data and B data, respectively.

The outline extracting circuits 431, 432 and 433 extract outline information from the respective color separation data R, G and B. Each of the outline extracting circuits 431, 432 and 433 has a circuit construction such as that shown in FIG. 30. The circuit shown in FIG. 30 is composed of FIFO devices 451 and 452 for delaying input image data by one line, inverters 453, 457, 459 and 463, adders 416, 464 and 466, D-type flip-flops 455, 456, 458, 462, 465, 469 and 470, a multiplier 459, a register 467 for storing a threshold value which indicates whether or nor an objective picture element is contained in an outline, and a comparator 468.

The write clock WCK and the read clock RCK of each of the FIFO devices 451 and 452 are common to the clocks used in the other circuits. A write reset signal WRST and a read reset signal RRST are obtained by inverting a horizontal synchronizing signal HSYNC. Accordingly, an input signal, the output data of the FIFO device 451, and the output data of the FIFO device 452 are delayed one from another by one line.

These signals are each subjected to a filtering process such as that shown in FIG. 26C, and outline information is extracted by a comparison between the result of this operation and a set threshold value. Through-data 472 representing an objective picture element is output after timing adjustment in the D-type flip-flops 469 and 470.

Figure 30:
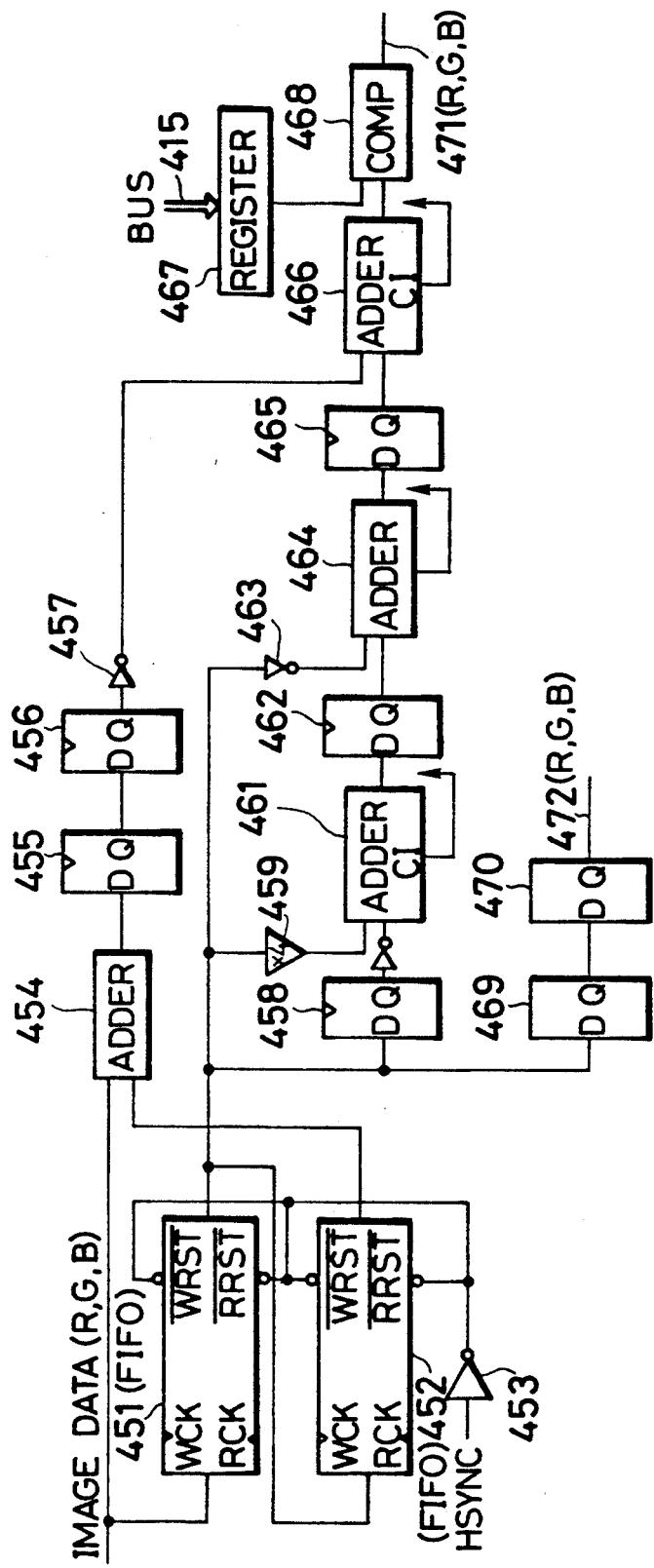
FIG. 30 is a circuit diagram showing an example of the outline extracting circuit according to the fifth embodiment.

Referring back to FIG. 29, When the outline extracting circuits 431, 432 and 433 shown in FIG. 30 receive the R, G and B data, respectively, the outline extracting circuit 431 outputs outline information (R) 471R and through-data (R) 472R synchronized therewith, the outline extracting circuit 432 outputs outline information (G) 471G and through-data (G) 472G synchronized therewith, and the outline extracting circuit 433 outputs outline information (B) 471B and through-data (B) 472B synchronized therewith. If it is determined that the outline information corresponding to at least one of R, G and B represents an outline, that is, if the NOR gate 434 determines that the objective picture element is contained in the outline, the selectors 441, 442 and 443 select the data which are written into the corresponding registers 437, 438 and 439 by the CPU 412. The selectors 445, 446 and 447 serve to determine whether or not the process of converting an outline color is to be executed, and is controlled by the region signal 635. The selectors 445, 446 and 447 output signals $R_{out}$, $G_{out}$ and $B_{out}$.

Although R, G and B are utilized as the color separation data, equivalent color separation data may of course be employed.

As described above, this embodiment is advantageous in emphasizing characters, particularly characters representing a title, and in processing color characters for OHPs so that they can easily be identified, and it is also possible to facilitate an even higher degree of image processing.

SIXTH EMBODIMENT

Creation of outlined character

Figure 31:
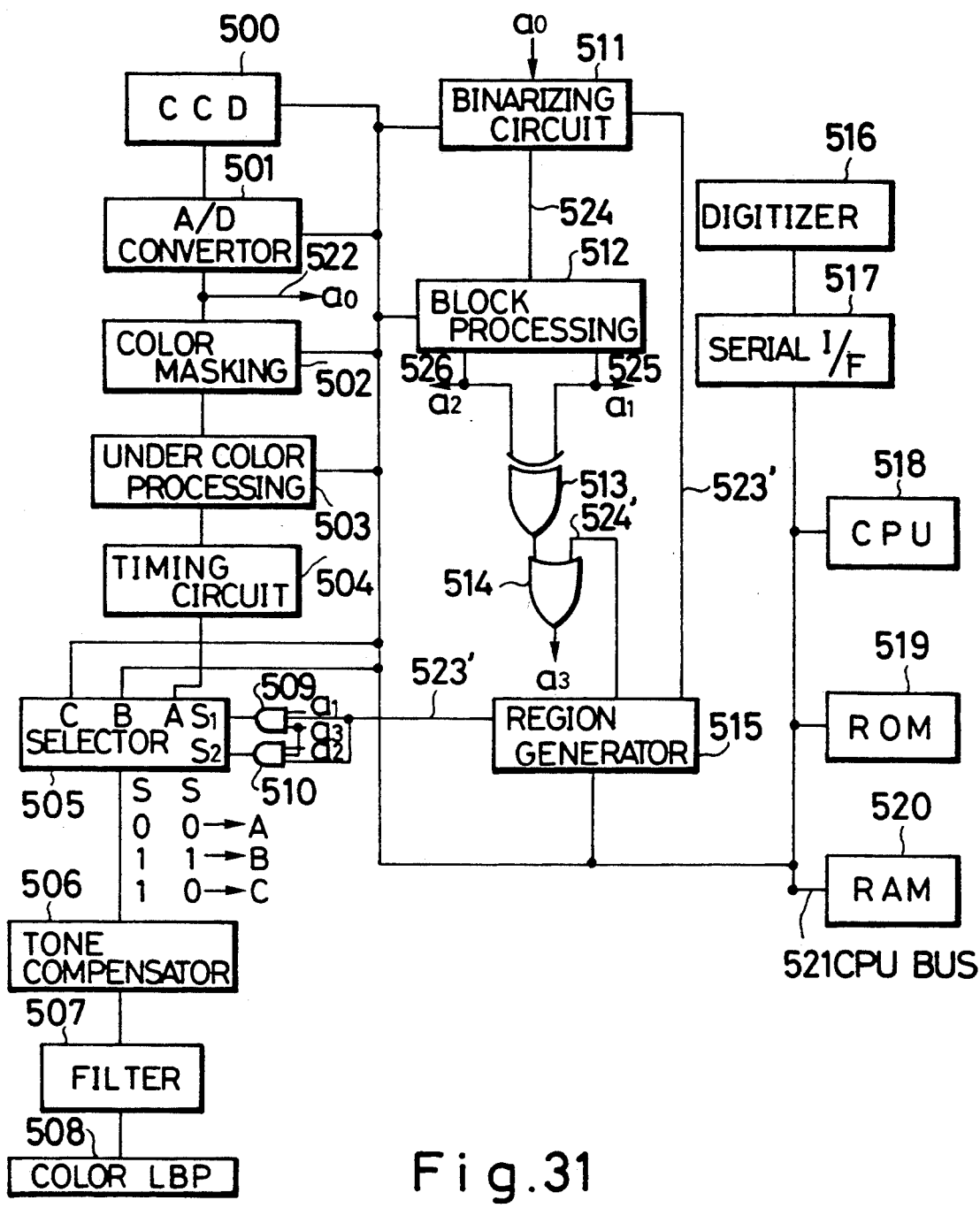
FIG. 31 is a block diagram showing a sixth embodiment of the image processing apparatus according to the present invention.

FIG. 31 is a block diagram showing the sixth embodiment of the image processing apparatus according to the present invention. The illustrated image processing apparatus is composed of a CPU 518 connected to a CPU bus 521 for executing arithmetic operations and various processes, a ROM 518 for storing a program or the like, a RAM 520 for auxiliary storage, a CCD 500, an A/D converting section 501, a color masking section 502, an under color removing section 503, a timing circuit 504, a binarizing circuit 511 for executing binarizing on the basis of data after A/D conversion, a block processing section 512, a region generating circuit 515 for generating a plurality of area signals and enable signals, a selector 505 arranged to operate on the basis of a signal obtained by a block process, a tone compensating section 506, a filter section 507, and a color LBP 508.

The following is a description of a process for generating an outlined character. For example, "an outlined character" means a black character "L" edged by red as illustrated in FIG. 2E.

Figure 32:
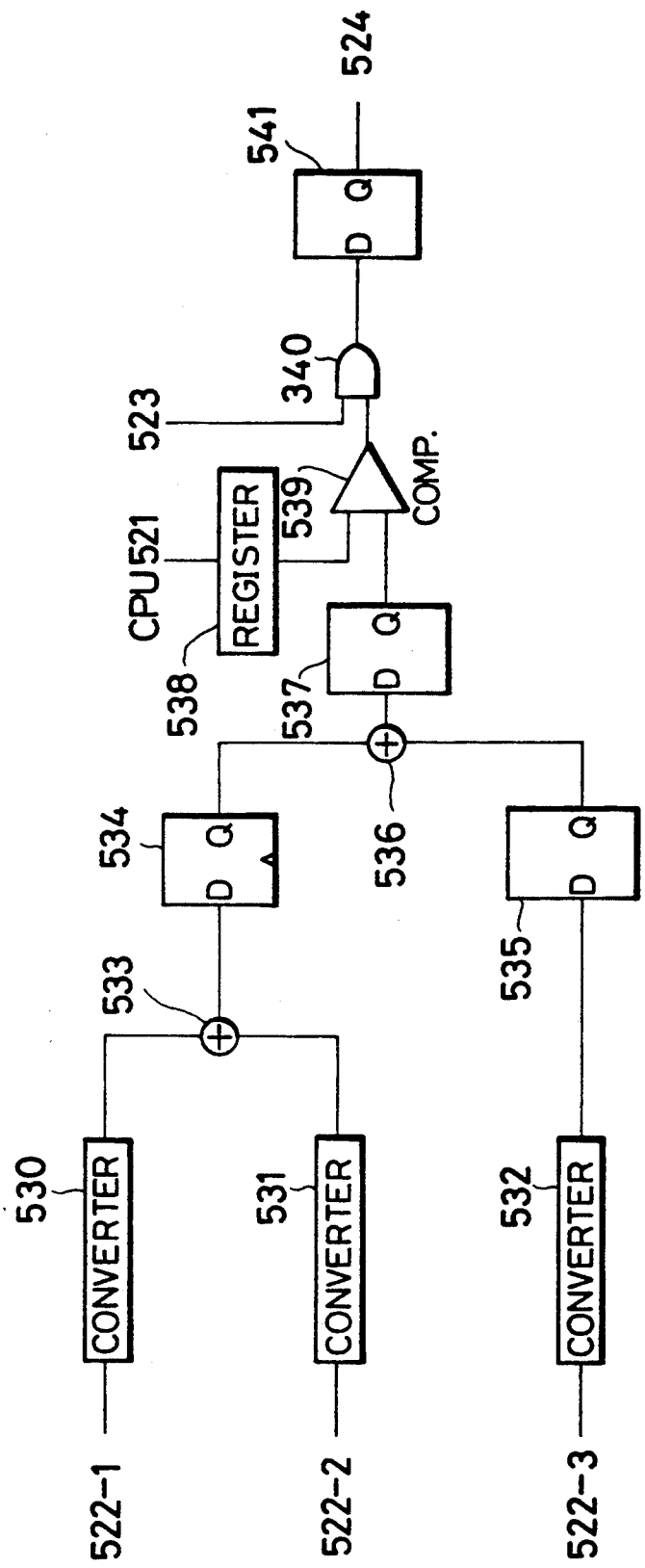
FIG. 32 is a block diagram which serves to illustrate a binary-coding circuit according to the sixth embodiment.

FIG. 32 is a view which serves to illustrate the binarizing circuit 511. Data 522-1, 522-2, and 522-3, which have been subjected to A/D conversion, are converted into Y data, M data and C data by respective converters 530, 531, and 532. Then, data representing Y+M+C is obtained in adders 533 and 536 and a comparator 539 in turn compares the result with the data set in the register 538 by the CPU 518 to output a binarized signal. An AND gate 540 serves as an enable gate, and D-type flip-flops 534, 535, 537 and 541 are provided for the purpose of timing adjustment. With the binarizing circuit 511, an area image such as that shown in FIG. 36A, that is, an area signal which goes to "1" in a character body alone, is generated.

Figure 33:
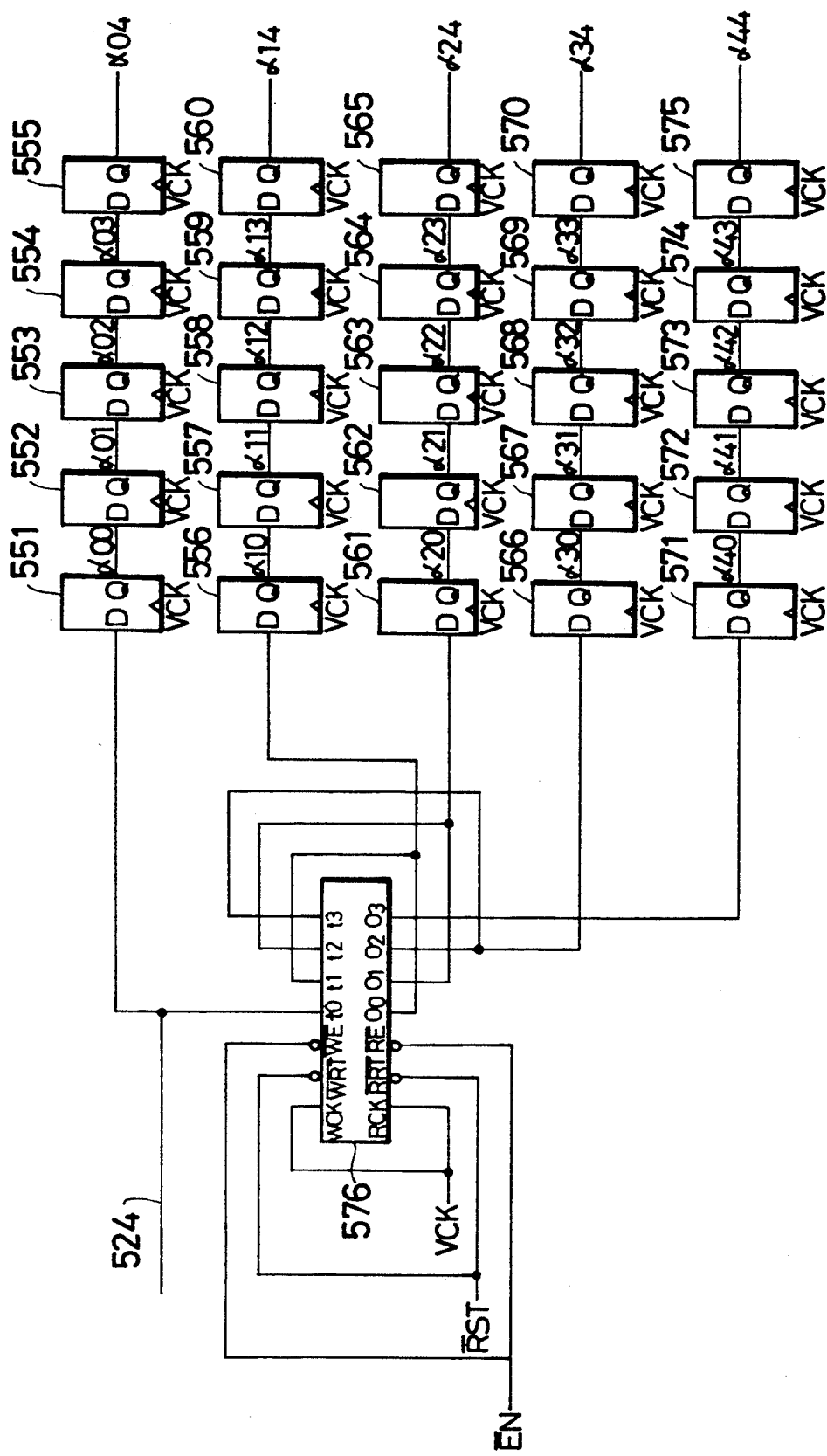
FIGS. 33 and 34 are block diagram which serves to illustrate a block processing circuit according to the sixth embodiment.

FIG. 33 shows a circuit for generating a block consisting of a matrix of five lines each having five picture elements, a picture element $d_{22}$ being the center picture element. In the illustrated circuit, a FIFO device 576 synchronizes five lines with one another and generates a data block consisting of the five lines thus synchronized. Then, a data block consisting of 5 (picture elements)×5 (picture elements) is generated by D-type flip-flops 551 to 575.

Figure 34:
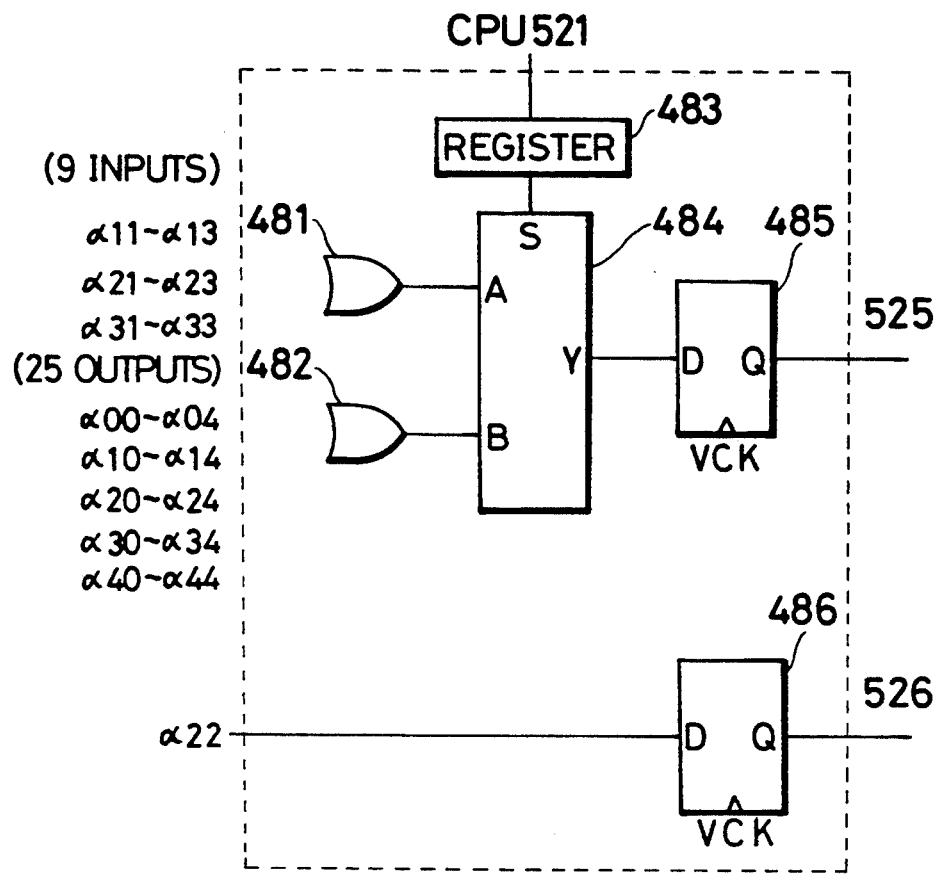

FIG. 34 shows the output processing portion of the block processing section 512 which consists of two portions; one portion includes OR gates 481 and 482, and actually executes a block process, while the other portion serves to output through data. The OR gate 481 outputs "1" if "1" is placed in at least one picture element in a 3×3 block in the center of which the picture element $d_{22}$ is located. Similarly, the OR gate 482 outputs "1" if "1" is placed in at least one picture element in a 5×5 block in the center of which the picture element $d_{22}$ is located. A selector 484 selects one of the outputs of the OR gates 481 and 482 and a D-type flip-flop 485 provides the result of the selection as an output 525. Thus, it is possible to change a width of edge portion by selecting matrices different in size.

Figure 35:
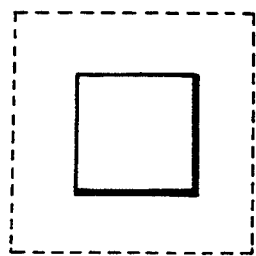
FIG. 35 is a view which serves to illustrate a block process according to the sixth embodiment.
Figures 36A, 36B:
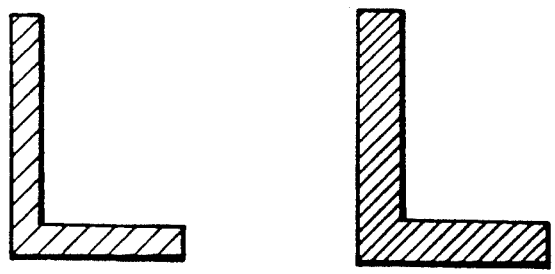
FIGS. 36A and 36B are views showing specific examples of the results of the processes executed according to the sixth embodiment.

FIG. 35 is a view which serves to illustrate the block process according to this embodiment. When the solid-line portion in the figure is subjected to the above-described 3×3 block process, the result of the binarized output is the dotted-line portion. In this process, an area signal, as shown in FIG. 36B, which represents a character consisting of thick leg portions is generated. Then, the binarized area is spread by block processing.

When it is desired to obtain an output such as that shown in FIG. 2E, a region signal 524 from region generation circuit 515 is set to "0" (low). Thus, for the case of a character body, S1 and S2 are set to "0" (FIG. 31) and input data A is selected by a selector 505, and arbitrary data C which has been set by the CPU is selected at a portion surrounding a character. If it is assumed that this register C is set to "red", it is possible to obtain an output image such as that shown in FIG. 2E.

If the same operation as that described above is executed with the region signal 524 set to "H"(High), an input B is selected by the selector 505 with respect to a character body, while an input C is selected with respect to such a shaded outline. Accordingly, the operator can freely determine the colors of the character body and the shaded outline. Although not shown in FIG. 31, a plurality of registers may be provided in the inputs B and C of the selector 505 so that the registers are switched in response to a plurality of region signals generated by the region generating circuit 515. With this arrangement, it is possible to apply different types of outlining to a plurality of areas.

SEVENTH EMBODIMENT

Outlining of a portion having a particular color alone

Figure 43:
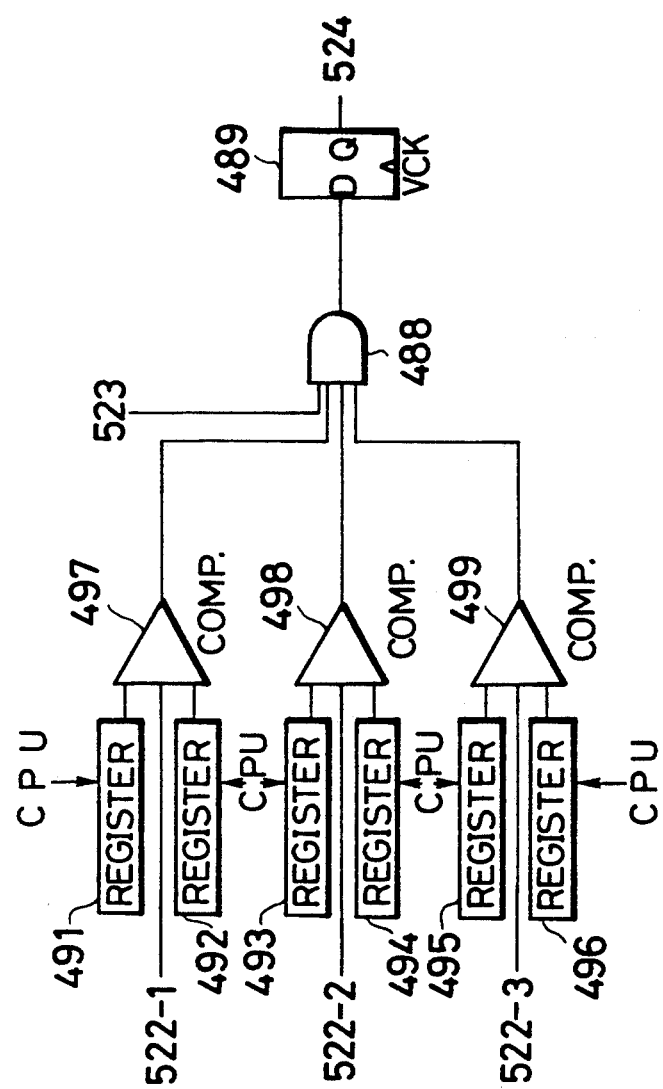
FIG. 43 is a block diagram which serves to illustrate a seventh embodiment of the present invention.

The circuit construction of the seventh embodiment is nearly the same as that of the circuit shown in FIG. 31, and only a portion corresponding to the binarizing circuit 511 has a different construction. This portion is illustrated in FIG. 43.

If the range of values of each color separation data 522-1, 522-2 and 522-3 falls within the range of values which has been set in the corresponding registers by the CPU, the region signal 524 is made active. Then, only predetermined color can be detected. The merit of this arrangement is that, when it is desired to outline only a particular color character in an original consisting of characters having a plurality of colors, it is possible to obtain a desired output image without the need to designate a particular region by means of the digitizer 516.

EIGHTH EMBODIMENT

Figure 37:
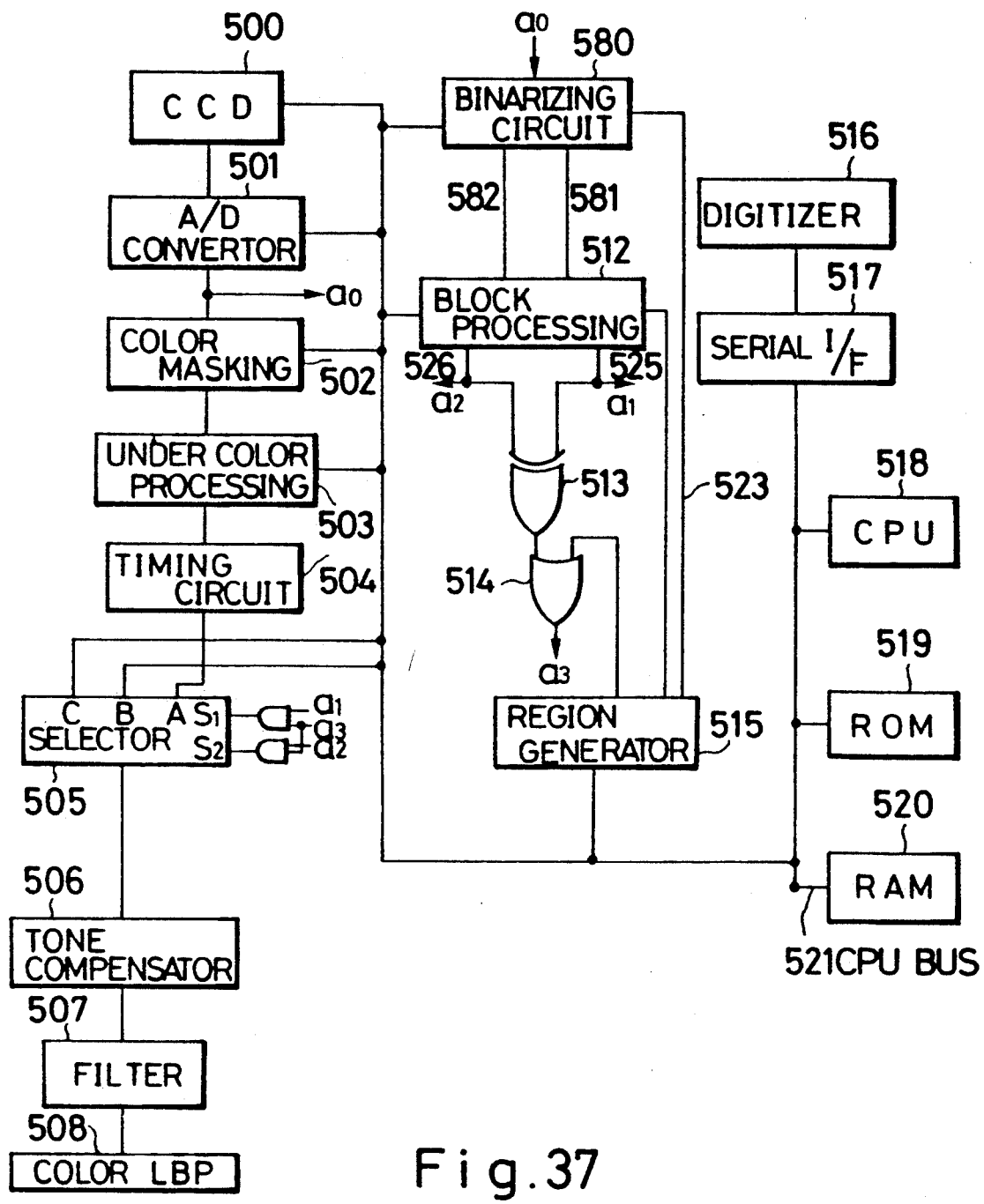
FIG. 37 is a block diagram of an eighth embodiment of the image processing apparatus according to the present invention.

FIG. 37 shows the eighth embodiment of the image processing apparatus according to the present invention. According to this embodiment, it is possible to provide an output image, such as that shown in FIG. 2F, in which, while the edge portion of a character is made the same as that of the original, the periphery of the edge portion is painted in an arbitrary color.

The difference between the arrangement of FIG. 37 and the arrangement of FIG. 31 resides in a binarizing circuit 580 and a portion associated with a block process.

Figure 39:
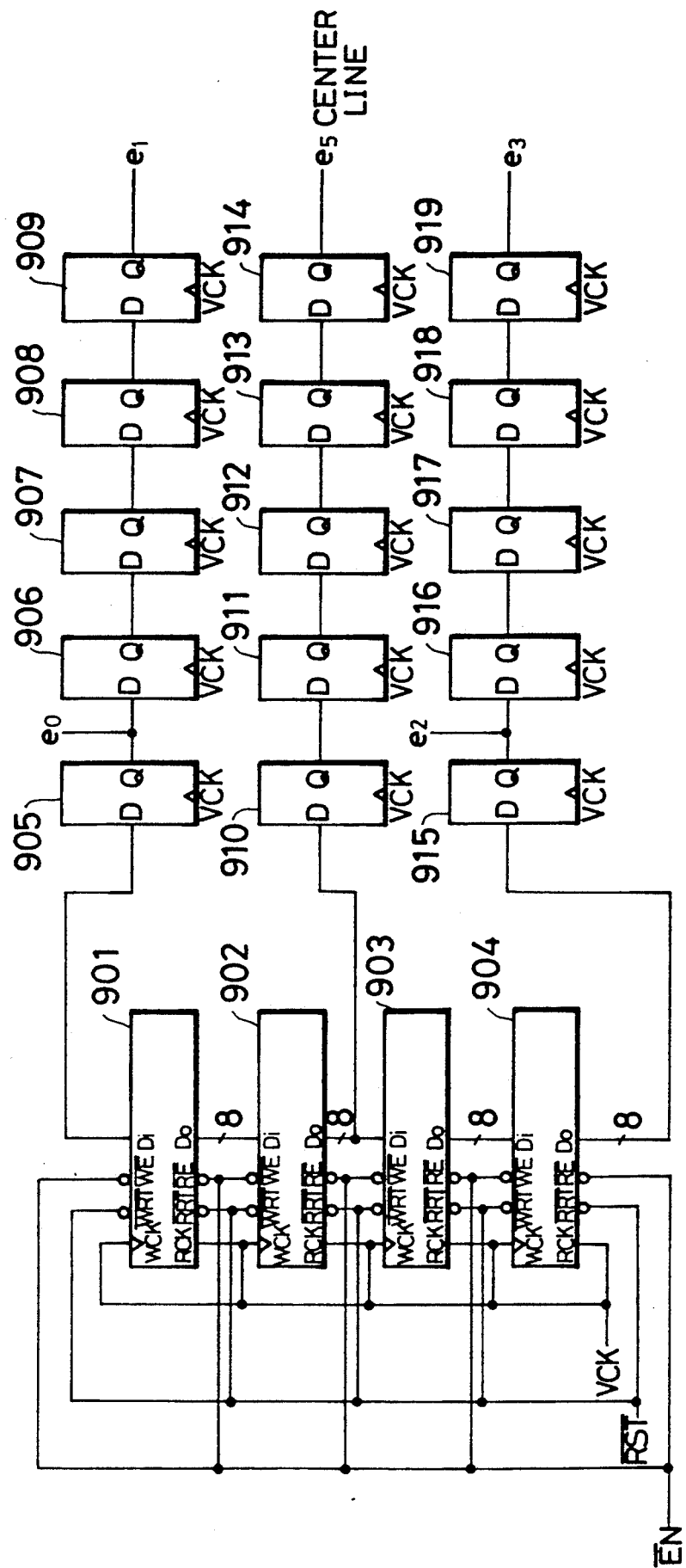
FIGS. 39 and 40 are circuit diagrams showing the outline extracting circuit of the eighth embodiment.
Figure 40:
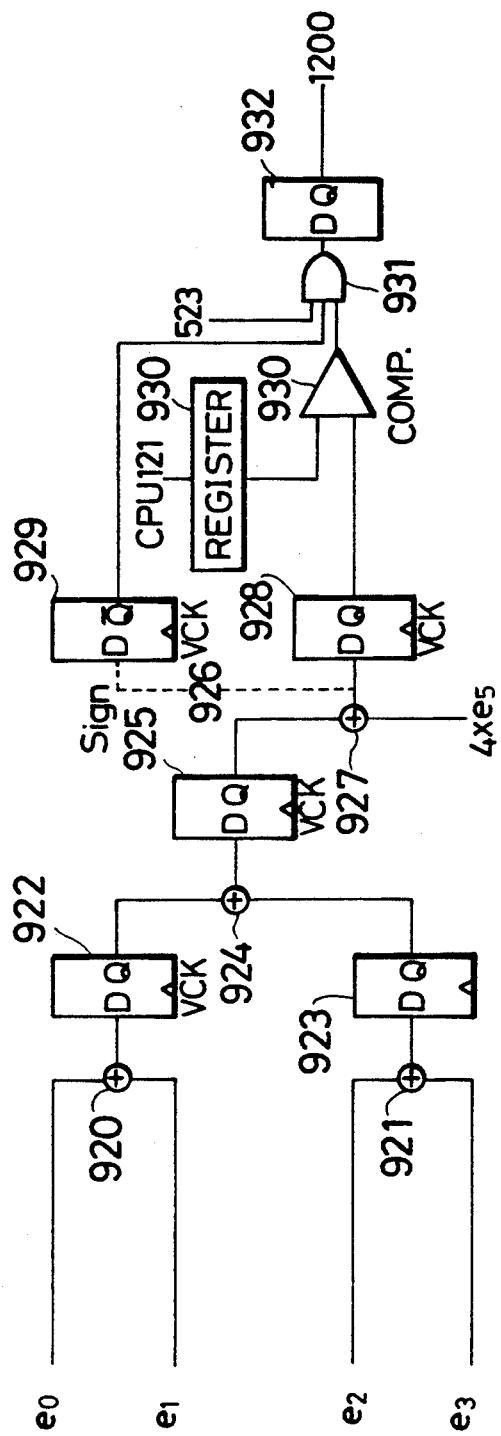

The binarizing circuit 580 consists of a binary-coding circuit utilizing the density of an image, as shown in FIG. 32 and an outline extracting circuit shown in FIGS. 39 and 40. The outline emphasis in this embodiment utilizes the filter shown in FIG. 38.

Referring to FIG. 39, FIFO devices 901, 902, 903 and 904 generate five lines, and D-type flip-flops 905 to 919 generate three lines each having five picture elements.

Data $e_0$, $e_1$, $e_2$ and $e_3$ are generated in the circuit shown in FIG. 39, and the data $e_0$ and $e_1$ are added by an adder 920, while the data $e_2$ and $e_3$ are added by an adder 921. Both results are added by an adder 924, and the result is subtracted from a value equivalent to $4 \times e_5$. If the result of the subtraction is larger than the data set in a register 930, a comparator 930 outputs "1". A signal 926 is a sign bit which is forcibly set to "0" in the case of a negative sign.

Figure 41:
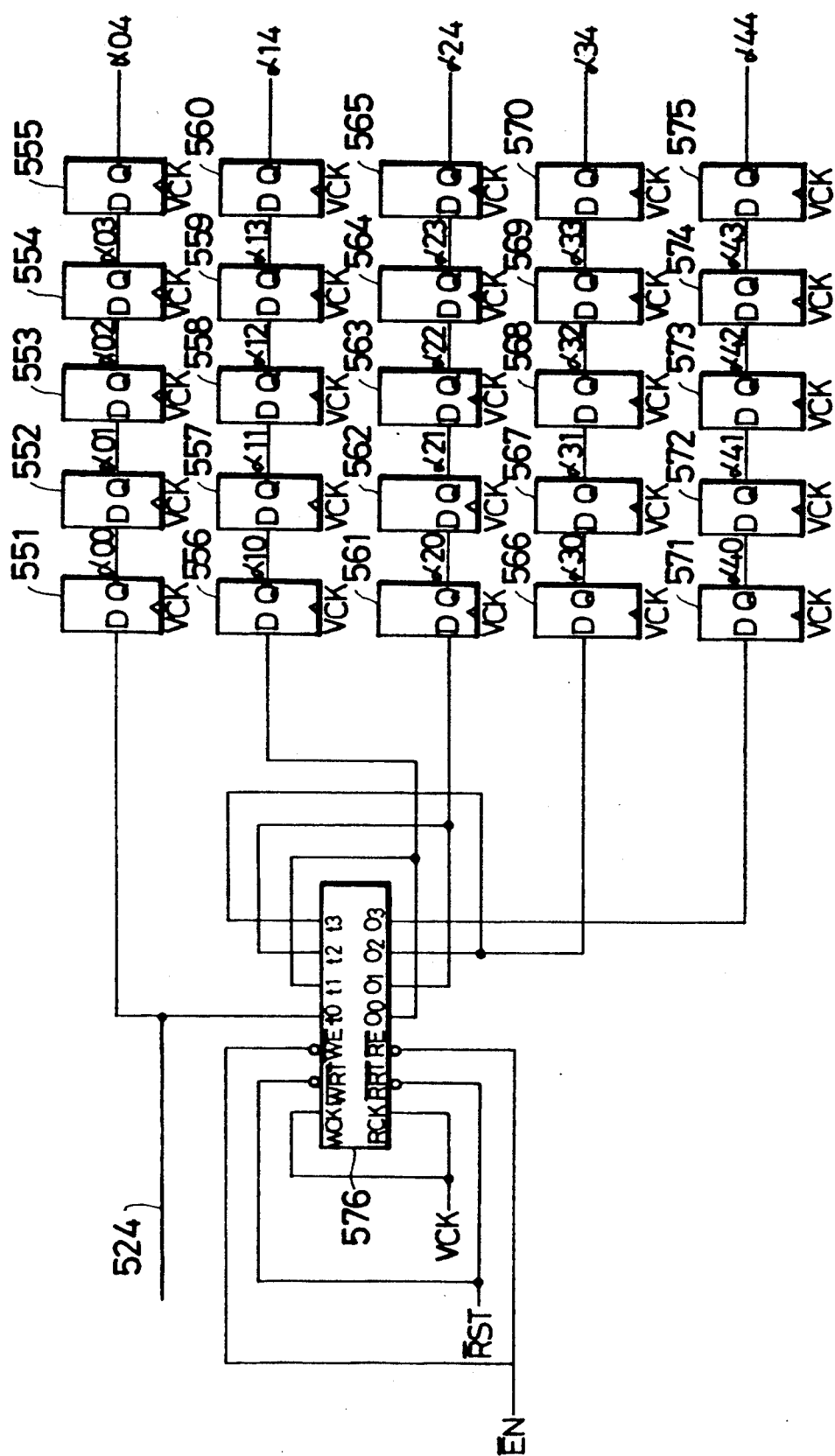
FIGS. 41 and 42 are block diagrams which serve to illustrate the block process executed in the eighth embodiment.
Figure 42:
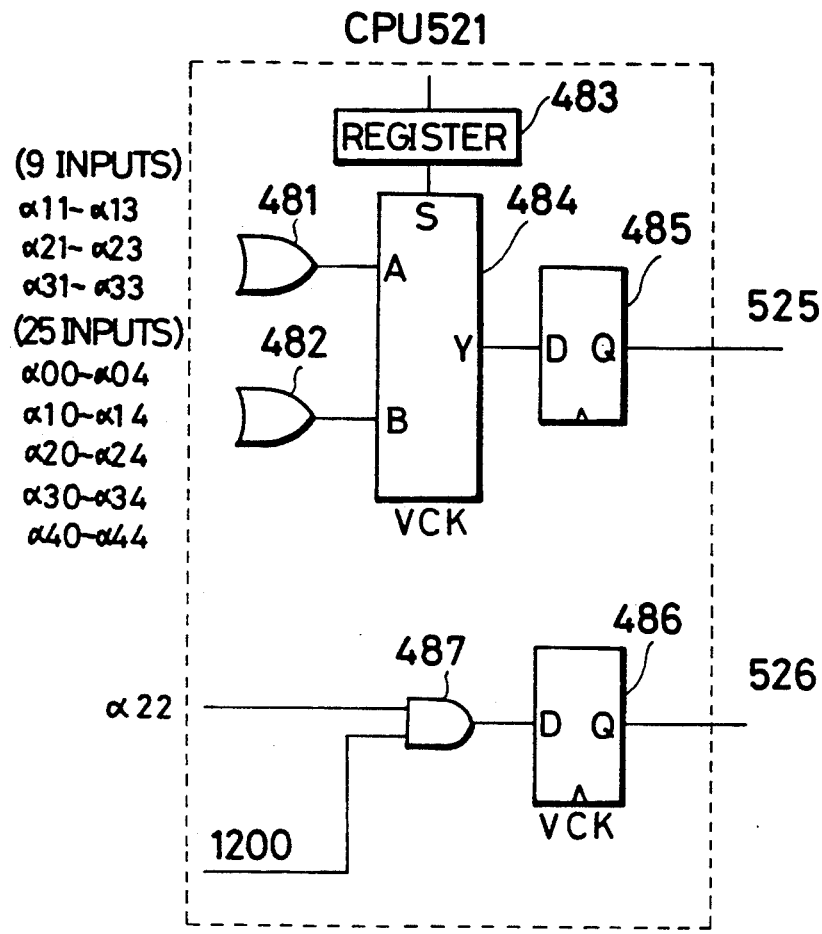

FIGS. 41 and 42 are diagrams which serve to illustrate a block process. Since FIG. 41 is similar to FIG. 33, the description is omitted.

Elements 481, 482, 484 and 485, which are shown in an upper portion of FIG. 42, are the same as the corresponding elements shown in FIG. 34, and are arranged to output the result of a 3×3 or 5×5 block process as a signal 525.

A portion including a gate 487 is arranged to output an outline as a signal 526.

An output image such as the image of FIG. 2F can be obtained as two signals 525 and 526. If the color of an outline alone is to be replaced with a different color, the data 487 has only to be controlled as explained in connection with FIG. 1. Though in this embodiment data at edge portion remaines original data, the data may be set arbitrary color by CPU. In this case, color conversion at edge portion is also possible.

As described above, in spite of a simple hardware arrangement consisting of binarizing and block processing of input image data, it is possible to easily and, in realtime, effect various editing process such as outlining. This embodiment can therefore find a wide range of applications, particularly, in the field of design.

EXPLANATION OF REGION SIGNAL GENERATING CIRCUIT

FIGS. 44A to 44F are views which serve to illustrate the operation of the region generating circuit used in each of the above embodiments.

Figure 44A:
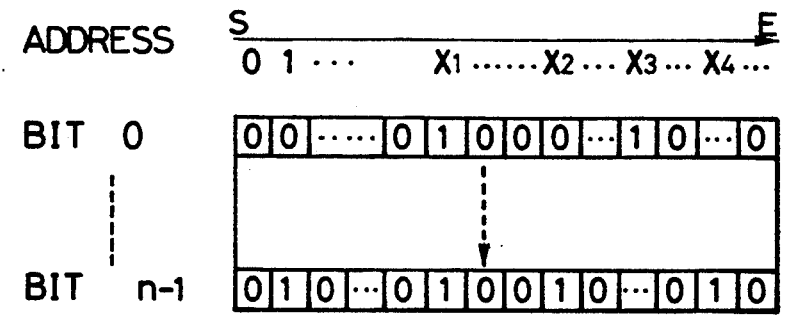
FIGS. 44A to 44F are diagrammatic views which serve to illustrate the operation of the region generating circuit used in each of the embodiments.
Figure 44B:
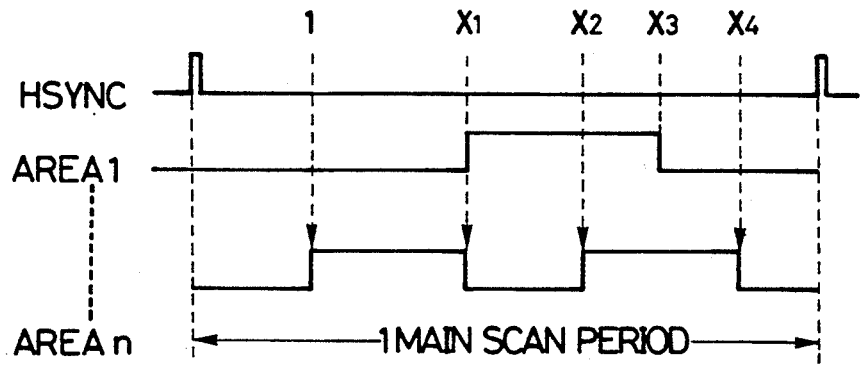
Figure 44C:
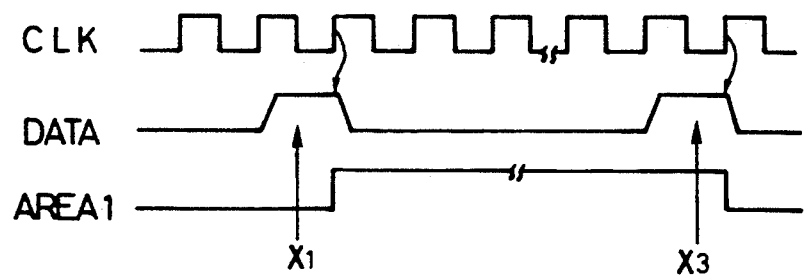
Figure 44D:
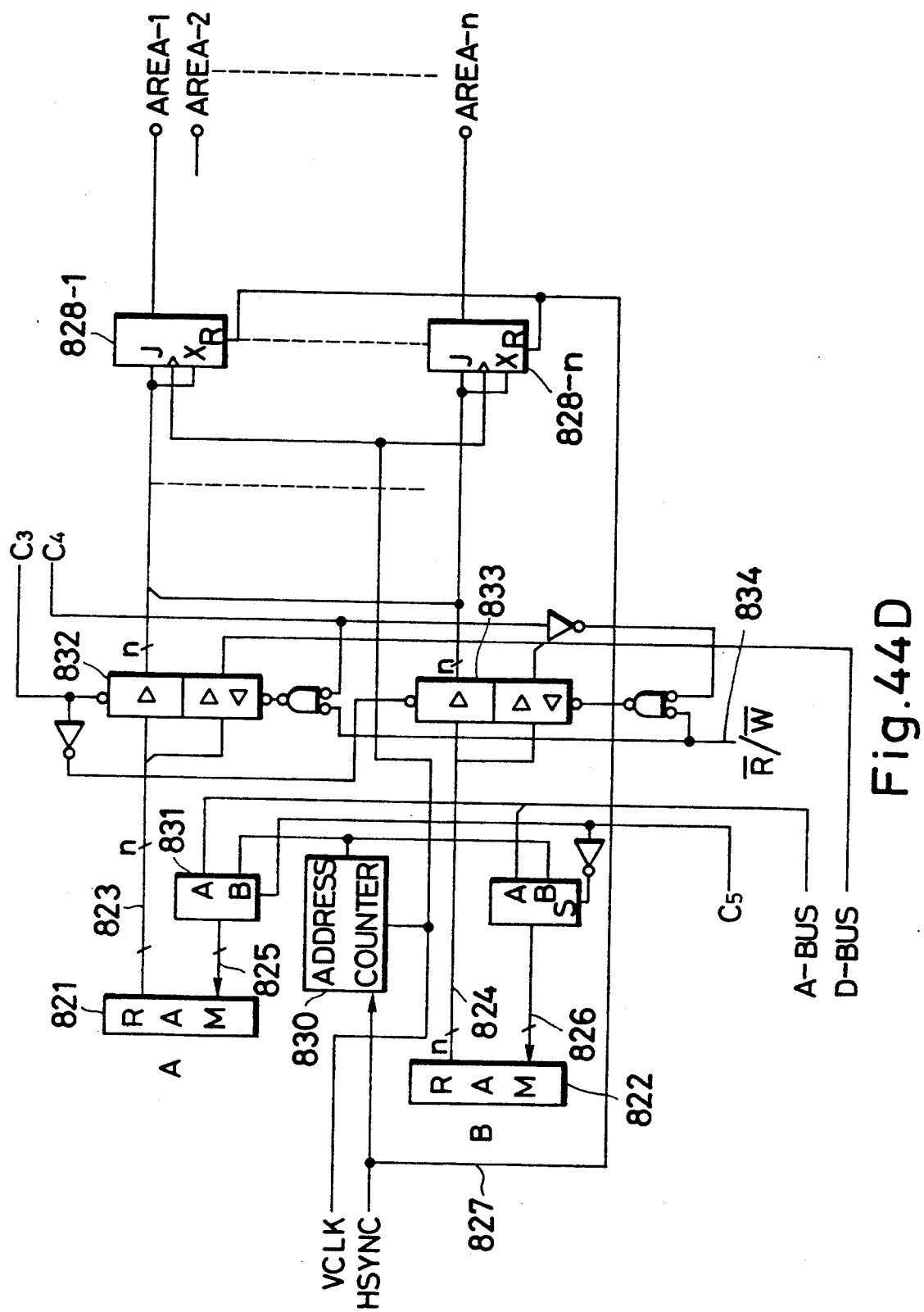
Figure 44E:
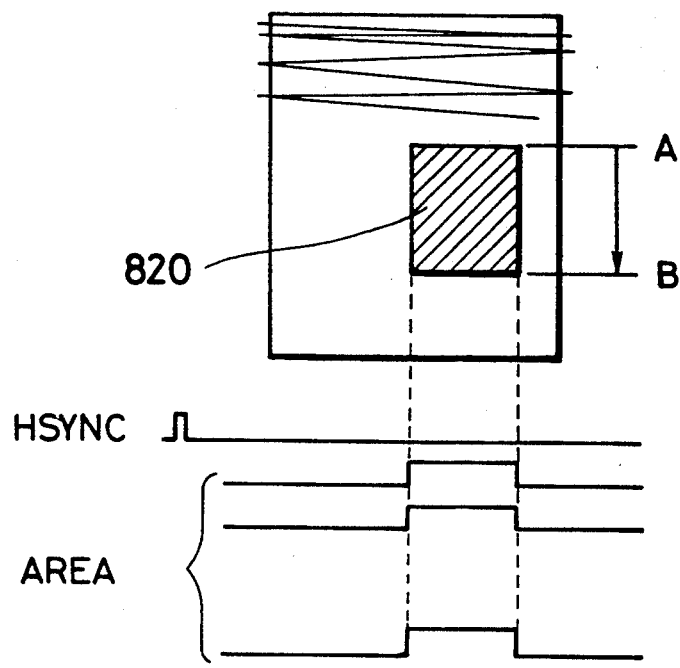

The term "region" represents, for example, a shaded portion 820 in FIG. 44E, and this portion is discriminated from another region on the basis of the signal AREA shown in the timing chart of FIG. 44E, in units of lines in the sub-scanning direction, that is, during the period of each horizontal synchronizing signal (HSYNC). Such a region is designated by a digitizer.

FIGS. 44A to 44D show an arrangement which allows a position at which the region signal is to be generated, the period of the region signal, and the number of periods to be programmed by the CPU and which is capable of generating a multiplicity of region signals. In this arrangement, a single region signal consists of one bit of a RAM which is accessible by the CPU, and RAMs 821 and 822 each having an n-bit construction are provided in order to obtain, for example, n region signals AREA1 to AREAn, as shown in FIG. 44D.

In order to obtain the region signals AREA1 to AREAn such as those shown in FIG. 44B, in the RAMs 821 and 822, "1" is placed in bit 0 at addresses $x_1$ and $x_2$ thereof with "0" placed in the same bit at the remaining addresses, as shown in FIG. 44A. On the other hand, in the RAMs 821 and 822, "1" is placed in bit $n-1$ at addresses 1, $x_1$, $x_2$, and $x_3$ thereof with "0" placed in the same bit at the remaining addresses.

As the data of the RAMs 821 and 822 is sequentially read out in synchronization with a predetermined clock on the basis of an HSYNC signal 827, data "1" are read from the respective RAMs 821 and 822 at addresses $x_1$ and $x_3$, as shown in, for example, FIG. 44C. The data thus read out are input to the J and K terminals of n J-K flip-flops 828-1 to 828-n in FIG. 44D. Accordingly, the outputs of the respective flip-flops 828-1 to 828-n toggle; that is to say, when "1" is read from the RAM 821 (822) and a video clock VCLk is input to the flip-flops 828-1 to 828-n, the outputs of these flip-flops go from "1" to "0" or "0" to "1". In this manner, a period signal or region signal such as that shown as AREA1 in FIG. 44C is generated. If data "0" is placed in the RAMs 821 and 822 over all the addresses, no region period is generated and the setting of a particular region is not executed.

In order to switch region periods at high speeds, the switching between the outputting of the region signal and CPU's writing to the memory (or RAMs 821 and 822) is performed by alternately switching the RAMs 821 and 822. In this switching operation, while data is being read from, for example, the RAM 821 in units of lines, the CPU writes to the RAM 822 so as to set a different region.

Figure 44F:
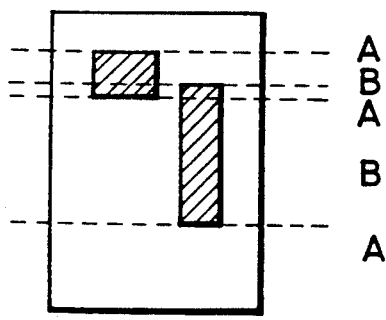

Accordingly, if the shaded regions shown in FIG. 44F are designated, the RAM 821 and the RAM 822 are switched in the order of A→B→A→B→A, where A represents the RAM 821, and B represents the RAM 822. If $(C_3, C_4, C_5) = (0, 1, 0)$ in FIG. 44D, the count output of an address counter 830 which is based on the video clock VCLK is supplied through a selector 831 to the RAM 821 as address 25 thereof.

At this time, the gate 832 is opened, while the gate 833 is closed, and n-bit data is read from the RAM 21. The n-bit data is input to n J-k flip-flops 828-1 to 828-n, and the period (or region) signal AREA1 to a period signal AREAn are generated in accordance with the values thus set.

In the writing to the RAM 822 which is executed by the CPU during the above-described time, an address bus A-BUS, a data bus B-BUS and an access signal R/W are utilized.

In the other case where a period signal is generated on the basis of the data set in the RAM 822, $(C_3, C_4, C_5)$ is set to (0, 1, 0) to cause the gate 833 to open, thereby supplying the count output of the address counter 830 to the address 826 of the RAM 822. The n-bit data read from the RAM 822 is output to the n flip-flops 828-1 to 828-n. Then, the states of the respective flip-flops 828-1 to 828-n are inverted in response to the video clock VCLK, whereby it is possible to output a region signal as in the case of the RAM 821. During this time, the CPU is capable of executing writing to the RAM 821 through the address bus A-BUS and the data bus B-BUS.

EXPLANATION OF IMAGE OUTPUT SECTION

An image output section suitable for use in the present invention will be explained below with illustrative reference to a printer for printing out output image data produced according to the fourth embodiment.

In the following description, the arrangement and construction of such a printer and the complete printing process will be explained with reference to FIG. 45 which is a diagrammatic view showing the construction of the printing section of the printer.

The illustrated printing section includes a pulse-width modulating circuit 750, a laser driver 752, a semiconductor laser 754, a polygon mirror 757, an f/θ lens 758, a mirror 760, and a developer 761, all of which are arranged for printing using red toner. The printing section also includes a pulse-width modulating circuit 751, a laser driver 753, a semiconductor laser 755, a polygon mirror 756, an f/θ lens 759, a developer 762, and a photosensitive drum 763, all of which are arranged for printing using black toner.

Figure 45:
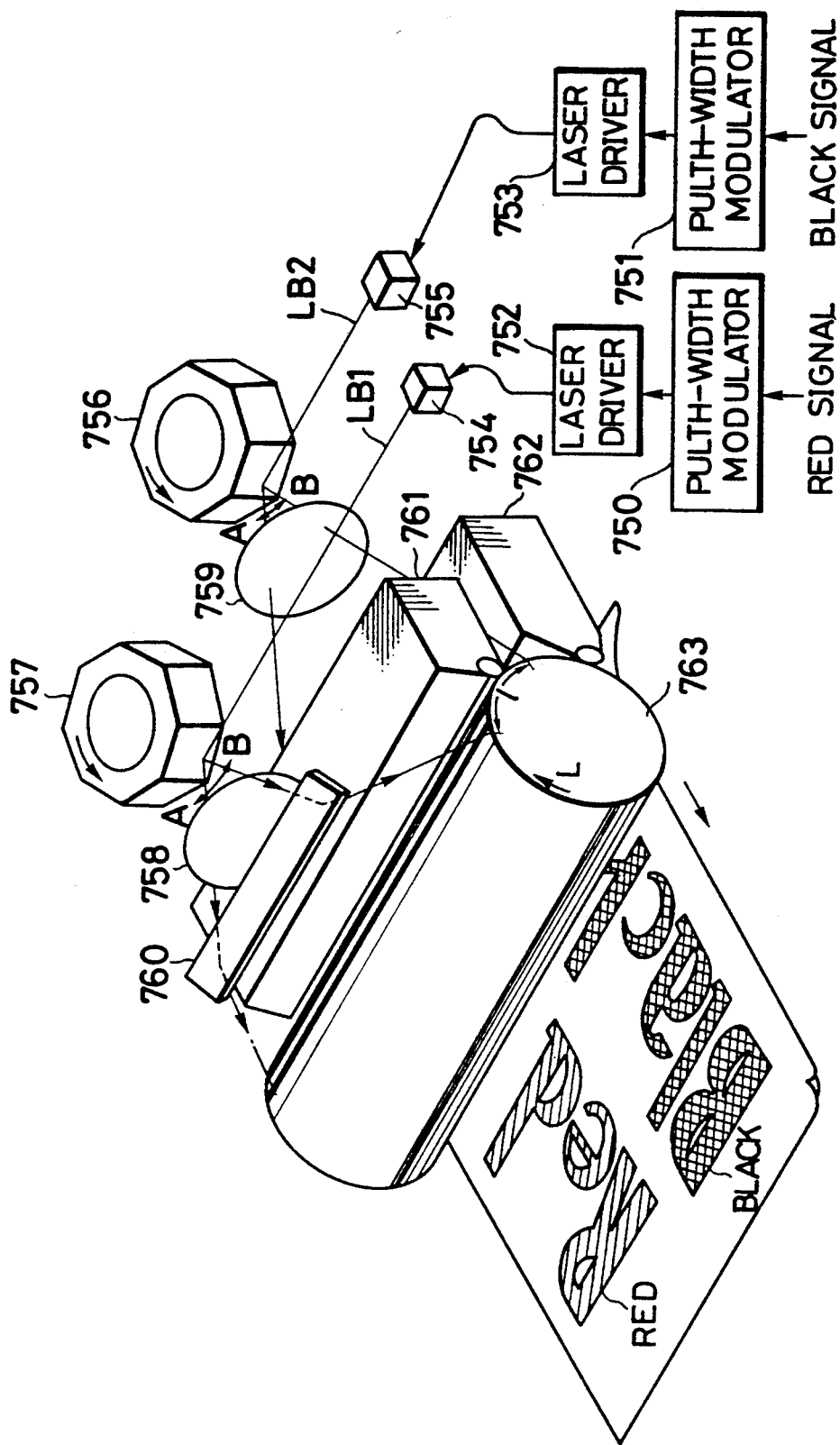
FIG. 45 is a diagrammatic view showing the construction of a printer for use with each of the embodiments.

A laser beam $LB_1$ for red development which has been modulated in correspondence with image data is reflected by the polygon mirror 757 which is rotating at a high speed, so that the laser beam $LB_1$ is caused to scan in the horizontal direction at a high speed over an angular range indicated by a double-headed arrow A-B in FIG. 45. The laser beam $LB_1$ passes through an optical path formed by the f/θ lens 758 and the mirror 760, and is focused on the surface of the photosensitive drum 763, thereby effecting dot exposure corresponding to the image data. One horizontal scan of the laser beam corresponds to one horizontal scan of the original image. In the case of development of black, the same arrangement excluding the mirror 764 is utilized.

During the above-described process, the photosensitive drum 763 is rotating at a constant speed in the direction indicated by arrow L in FIG. 45. Accordingly, while the above laser beam is scanning the photosensitive drum 763 in the main-scan direction, the photosensitive drum 763 rotates at a constant speed (V) in the sub-scan direction. Therefore, the photosensitive drum 763 is successively exposed to a planar image so that a latent image is formed. Red and block toner images are formed by a process including uniform charging effected by an electrostatic charger prior to the above-described exposure, this exposure, and toner development using a toner sleeve.

Figure 46:
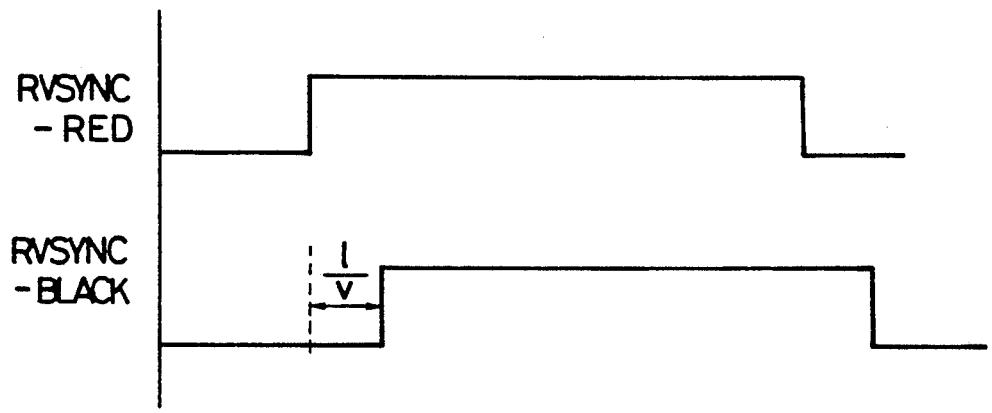
FIG. 46 is a graphic representation showing the relationship between the vertical synchronizing signal of a red signal and that of a black signal in each of the embodiments.

"l" shown on the photosensitive drum 763 represents the distance between a red latent image and a black latent image. FIG. 46 is a timing chart showing the time difference between the red and black latent images. As can be seen from FIG. 46, a vertical synchronizing signal VSYNC for a red signal rises when a period of duration 1/V has passed after a vertical synchronizing signal VSYNC for a black signal has risen. In order to realize such a time difference, a line buffer (not shown) is incorporated into a circuit for processing the black signal.

Figure 47B:
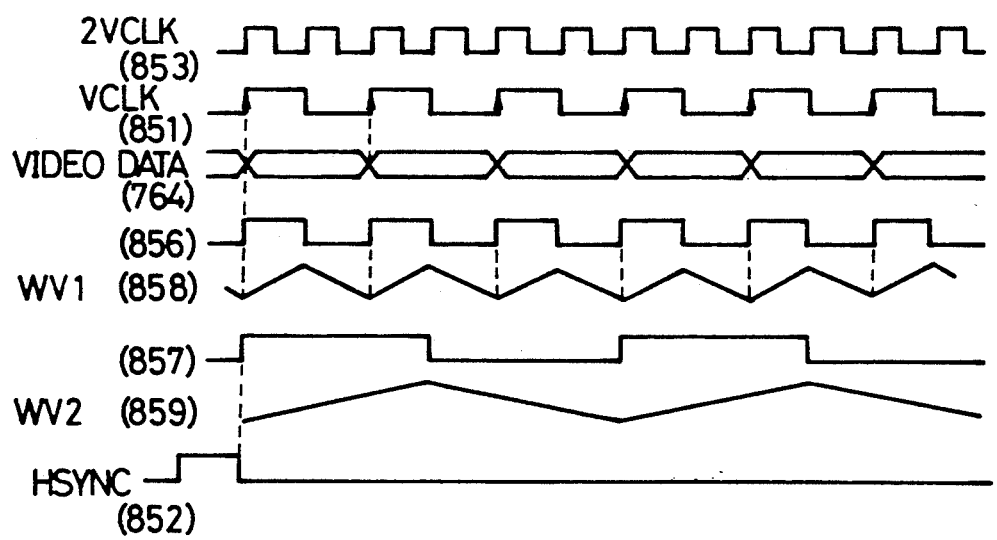
FIGS. 47B and 47C are timing charts showing signals which flow in various portions of the pulse-width modulating circuit.
Figure 47A:
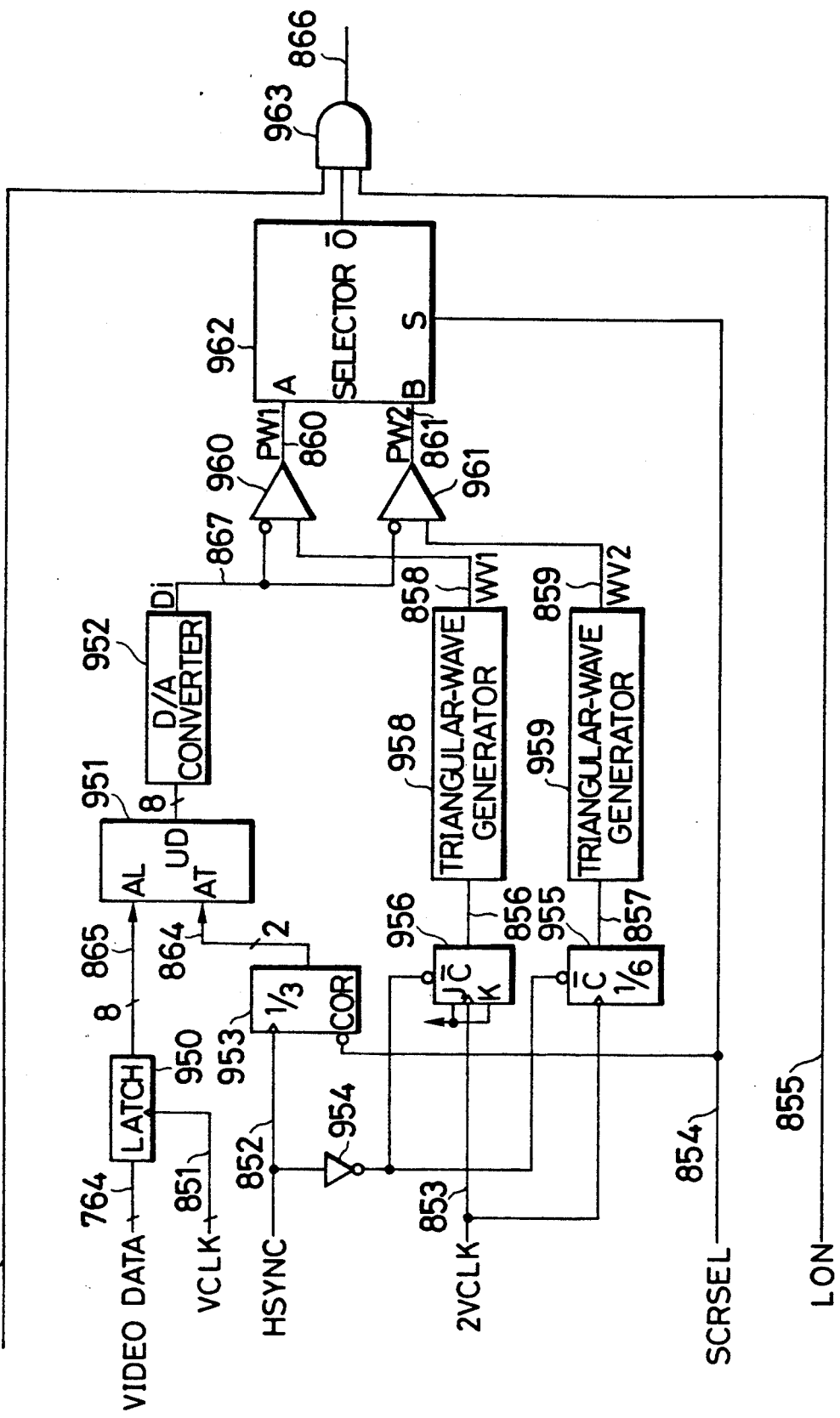
FIG. 47A is a block diagram showing an example of a pulse-width modulating circuit for use in each of the embodiments.
Figure 47C:
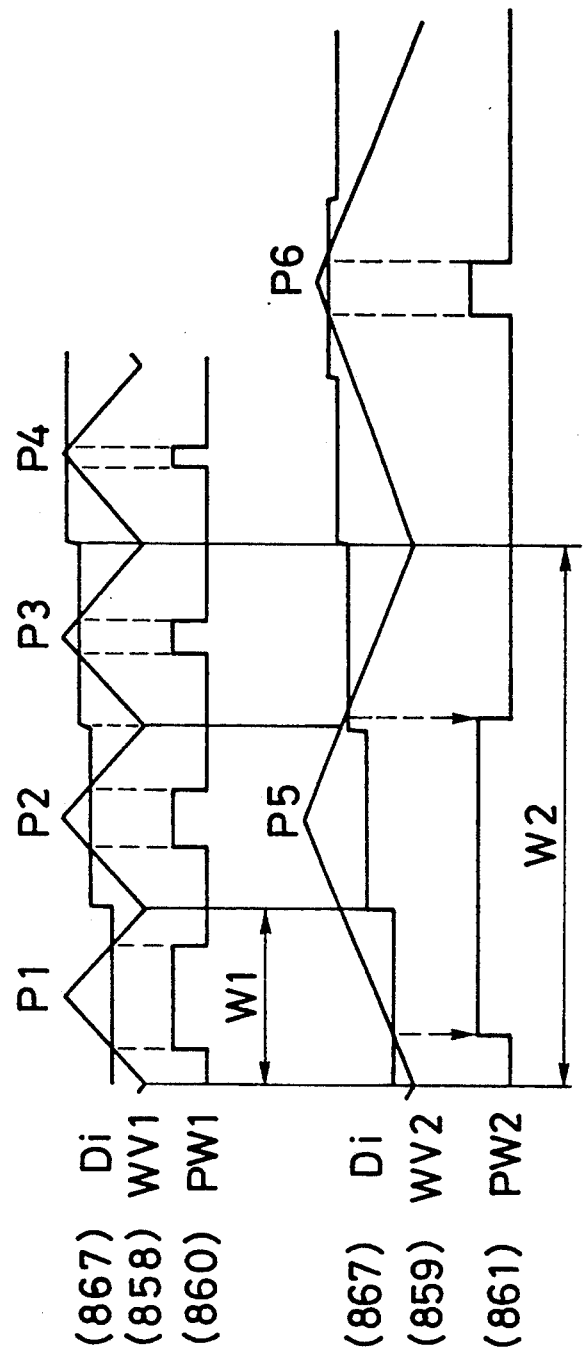

FIG. 47A shows in detail the pulse-width modulating circuit 750 (or 751) shown in FIG. 45. FIG. 47A is a block diagram showing the pulse-width modulating circuit 750 (or 751), and FIGS. 47B and 47C are timing charts which serve to illustrate various signals used in the pulse-width modulating circuit 750 (or 751).

Input video data (density information) 764 is latched by a latch circuit 950 in response to the rising edge of a vertical clock VCLK 851, whereby the input video data 764 is synchronized with the clock VCLK 851. Video data 865, which has been output from the latch circuit 950, is then subjected to tone compensation in an LUT (look-up table) 951. The output of the LUT 951 is subjected to D/A conversion in a D/A (analog-to-digital) converter 952 and converted into an analog video signal. The thus-generated analog signal is supplied to one input of each comparator 960 and 961, in which it is compared with a triangular wave which will be described later.

Signals 858 and 859 which are input to the other inputs of the respective comparators 960 and 961 are triangular waves which are synchronized with corresponding clocks and which are independently generated. More specifically, a synchronizing clock 2VCLK of frequency which is double the frequency of the clock VCLK 851 is divided by two in a J-K flip-flop 956 and thus a reference signal 856 for generation of the triangular wave is provided. A triangular-wave generating circuit 958 generates a triangular wave ($WV_1$) in accordance with the reference signal 856, and this triangular wave ($WV_1$) is supplied as the signal 858 to the other input of the comparator 960. In the meantime, the synchronizing clock 2VCLK is divided by six in a divide-by-six circuit 955 and thus a reference signal 857 is provided. A triangular-wave generating circuit 909 generates a triangular wave ($WV_2$) in accordance with the reference signal 857, and this triangular wave ($WV_2$) is supplied as the signal 859 to the other input of the comparator 961.

The triangular waves or signals 858 and 859 and the video data 764 are generated in synchronization with the clock VCLK, as shown in FIG. 47B. Further, the triangular waves 858 and 859 are initialized in the respective circuits 955 and 956 by using a signal obtained by inverting, through an inverter 954, a signal HSYNC 852 generated in synchronization with the clock VCLK. As the result of the above-described operation, a signal of pulse width such as that shown in FIG. 47C is provided at the output 860 ($PW_1$) of the comparator 960 and the output 861 ($PW_2$) of the comparator 961 in accordance with the value of the red/black bit output 718 obtained by the red/black discriminating circuit shown in FIG. 27.

More specifically, in the illustrated system, if the output 866 of the AND gate 963 of FIG. 47A is "1", the laser device is energized to print a dot on printing paper, while, if the output 866 is "0", the laser device is de-energized so that nothing is printed on the printing paper. Control over the energizing and de-energizing of the laser device is conducted by the application of a control signal LON 855. FIG. 47C shows the manner in which the level of an image signal D changes from a level corresponding to "black" to a level corresponding to "white", that is, from left to right as viewed in the figure.

Signals input to the pulse-width modulating circuit are "FF" for the case of "white" and "00" for the case of "black". Accordingly, the output of the D/A converter 952 varies as shown at Di (867) in FIG. 47C. In contrast, the respective triangular waves 858 and 859 change as shown at $WV_1$ (858) and $WV_2$ (859) in FIG. 47C. Accordingly, the respective outputs of the comparators 960 and 961 change, as shown at $PW_1$ (860) and $PW_2$ (861), such that their pulse widths become narrower as the level of the image signal D changes from "white" to "black". Further, as can be seen from FIG. 47C, if the signal $PW_1$ is selected, a dot is printed on the printing paper during each period $P_1$, $P_2$, $P_3$, and $P_4$, and the amount of variation of the pulse width has a dynamic range of $W_1$. If the signal $PW_2$ is selected, a dot is printed on the printing paper during each period $P_5$ and $P_6$, and the amount of variation of the pulse width has a dynamic range of $W_2$ which is three times the dynamic range $W_2$ obtained when $PW_1$ is selected.

In other words, when $PW_1$ is selected, the printing density is set to approximately 400 lines per centimeter, while, in the case of $PW_2$, the printing density is set to approximately 133 lines per centimeter. Moreover, if $PW_1$ is selected, the resolution becomes approximately three times as high as the resolution achieved when $PW_2$ is selected. On the other hand, if $PW_2$ is selected, the dynamic range of the pulse width becomes approximately three times as wide as that of the pulse achieved when $PW_1$ is selected, so that tone reproduction is improved to a remarkable extent. Accordingly, a signal SCRSEL is applied from an external circuit so as to select $PW_1$ if high resolution is needed and to select $PW_2$ if a high degree of tone reproduction is needed.

More specifically, if the signal SCRSEL 854 is "0", the selector 962 shown in FIG. 47A selects an A input and outputs $PW_1$ through an output terminal O. If the signal SCRSEL 854 is "1", the selector 962 selects an R input and outputs $PW_2$ through the output terminal O. The laser device is energized only for a period equivalent to the pulse width finally obtained, so that dots are printed. The LUT 951 consists of a ROM which stores the conversion tables required for tone compensation. When the video data 856 is input to the LUT 951, compensated video data is provided at the output of the LUT 951. For example, if the signal SCRSEL 854 is set to "0" in order to select $PW_1$, all the outputs from a ternary counter 953 go to "0" and a color compensation table for $PW_1$ is selected from the tables stored in the LUT 951.

The video signal which has been converted into a corresponding pulse width is applied to the laser driver 752 and 752, thereby modulating the laser beam. As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

outline extracting means for extracting an outline of an input image;

color designating means for manually designating a converting-color to be applied to the outline extracted by said outline extracting means; and color converting means for converting a color of an outline portion along the extracted outline of the input image to the converting-color designated by said color designating means.

2. An image processing apparatus according to claim 1, further comprising color discriminating means for discriminating a predetermined color on said input image;

said color converting means converts a color according to an output from said color discriminating means and an output from said outline extracting means.

3. An image processing apparatus according to claim 2, wherein said color converting means converts a color at a predetermined-color portion where said color discriminating means has detected said predetermined color.

4. An image processing apparatus according to claim 2, wherein said color converting means converts a color at an outline portion when said outline extracting means extracts an outline of said input image.

5. An image processing apparatus according to claim 2, wherein said color discriminating means detects said predetermined color having a predetermined tone.

6. An image processing apparatus according to claim 1, further comprising region designating means for designating a predetermined region in said input image;

and wherein said color converting means converts a color in the region designated by said region designating means.

7. An image processing apparatus according to claim 1, further comprising region designating means for designating a predetermined region in said input image;

and wherein said color converting means converts a color out of the region designated by said region designating means.

8. An image processing apparatus according to claim 1, wherein said color converting means includes region control means for controlling a converting region in said input image.

9. An image processing apparatus according to claim 8, wherein said region control means inhibits color conversion at an outline portion extracted by said outline extracting means.

10. An image processing apparatus according to claim 1, further comprising input means for inputting image data.

11. An image processing apparatus according to claim 10, wherein said input means inputs serial image data.

12. An image processing apparatus according to claim 11, further comprising serial-parallel converting means;

and wherein said serial-parallel converting means converts serial image data inputted from said input means to parallel image data.

13. An image processing apparatus according to claim 1, wherein said input image is composed of color component signals and said color converting means converts the color of the outline portion of the input image to the converting-color when said outline extracting means extracts an outline on a basis of color components signals.

14. An image processing apparatus according to claim 1, further comprising color discriminating means for discriminating a predetermined color on the input image, wherein said color converting means converts a color of a portion in which said outline extracting means has extracted the outline of the input image and said color discriminating means has discriminated the predetermined color on the input image.

15. An image processing apparatus according to claim 1, further comprising color discriminating means for discriminating a predetermined color on the input image, wherein said color converting means converts a color of a portion in which said outline extracting means has extracted the outline of the input image and said color discriminating means has not discriminated the predetermined color on the input image.

16. An image processing apparatus according to claim 1, further comprising color discriminating means for discriminating a predetermined color on the input image, wherein said color converting means converts a color of a portion in which said outline extracting means has not extracted the outline of the input image and said color discriminating means has discriminated the predetermined color in the input image.

17. An image processing apparatus according to claim 1, further comprising color discriminating means for discriminating a predetermined color on the input image, wherein said color converting means converts a color of a portion in which said outline extracting means has not extracted the outline of the input image and said color discriminating means has not discriminated the predetermined color on the input image.

18. An image processing apparatus comprising:

outline extracting means for extracting an outline of an input image;

color designating means for manually designating a converting-color to be applied to the outline extracted by said outline extracting means;

color converting means for converting the color of the outline according to the converting-color designated by said designating means; and color discriminating means for discriminating a predetermined color on the input image, wherein said color converting means converts a color according to an output from said color discriminating means and an output from said outline extracting means, and wherein said color converting means converts a color at a portion other than said predetermined-color portion, when said color discriminating means has detected said predetermined color.

19. An image processing apparatus comprising:

outline extracting means for extracting an outline of an input image;

color designating means for manually designating a converting-color to be applied to the outline extracted by said outline extracting means;

color converting means for converting the color of the outline according to the converting-color designated by said designating means; and color discriminating means for discriminating a predetermined color on the input image, wherein said color converting means converts a color according to an output from said color discriminating means and an output from said outline extracting means, and wherein said color converting means converts a color at a portion other than an outline portion when said outline extracting means extracts an outline of said input image.

20. An image processing apparatus comprising:
outline extracting means for extracting an outline of an input image;
color designating means for manually designating a converting-color to be applied to the outline extracted by said outline extracting means;
color converting means for converting the color of the outline according to the converting-color designated by said designating means; and
color discriminating means for discriminating a predetermined color on the input image,
wherein said color converting means converts a color according to an output from said color discriminating means and an output from said outline extracting means; and
block-region processing means for allowing said color converting means to convert a color at an objective pixel when at least one pixel of a block region having a plurality of pixels including the objective pixel must be color converted in the input image.

21. An image processing apparatus comprising:
outline extracting means for extracting an outline of an input image;
color designating means for manually designating a converting-color to be applied to the outline extracted by said outline extracting means; and
color converting means for converting the color of the outline according to the converting-color designated by said designating means, wherein said color converting means does not output image data at a portion other than said outline which has been color-converted.

22. An image processing apparatus comprising:
binarizing means for binarizing input image data;
area spreading means for spreading an area represented by said image data binarized by said binarizing means; and
coloring means for coloring the spread area made by said area spreading means with a predetermined color.

23. An image processing apparatus according to claim 22, wherein said input image data is composed of color component data and said binarizing means binarizes said input image data on the base of the sum of said color component data.

24. An image processing apparatus according to claim 22, wherein said binarizing means extracts a second predetermined color and binarizes the extracted second predetermined color.

25. An image processing apparatus according to claim 22, wherein said area spreading means spreads an area on a basis of the information of block area including a plurality of pixels.

26. An image processing apparatus according to claim 22, further comprising outline extracting means for extracting an outline portion from said input image data.

27. An image processing apparatus according to claim 26, wherein said coloring means colors outer and inner fixed areas of said outline portion in the predetermined color with the remaining outline portion extracted by said outline extracting means in a color input image.

28. An image processing apparatus according to claim 22, further comprising region designating means for designating a plurality of regions.

29. An image processing apparatus according to claim 28, wherein said coloring means colors said spread area with different colors respectively corresponding to a plurality of regions designated by said region designating means.

30. An image processing apparatus according to claim 22, further comprising changing means for changing a width of spreading by said area spreading means.

31. An image processing apparatus comprising:
outline extracting means for extracting an outline of an input image;
color designating means for manually designating a converting-color to be applied to the outline extracted by said outline extracting means;
color converting means for converting the color of the outline according to the converting-color designated by said designating means; and
color discriminating means for discriminating a predetermined color on the input image,
wherein said color converting means converts a color according to an output from said color discriminating means and an output from said outline extracting means,
wherein said color converting means converts a color at outline portion when said outline extracting means extracts an outline of said input image, and
wherein said color converting means outputs image data after changing a width of at least a part of said outline portion.

32. An image processing apparatus comprising:
input means for reading an original image and converting the image to image data;
outline extracting means for extracting an outline portion from the image data inputted by said input means;
color designating means for manually designating a converting-color to be applied to the outline portion extracted by said outline extracting means;
color converting means for color-converting the color of the extracted outline portion according to the converting-color designated by said color designating means; and
recording means for recording the image on a recording medium according to an output from said color converting means.

33. An image processing apparatus according to claim 32, wherein said input means reads an original image and generates color component signals.

34. An image processing apparatus according to claim 32, further comprising color discriminating means for discriminating a predesignated color on said input image;
and wherein said color converting means convert a color according to the output from said color discriminating means and the output from said outline extracting means.

35. An image processing apparatus according to claim 32, further comprising region designating means for designating a predetermined region in said original image;
wherein said color converting means converts a color in the region designated by said region designating means.

36. An image processing apparatus according to claim 32, further comprising γ-correction means for correcting a γ-characteristic of the outline color-converted by said color converting means.

37. An image processing apparatus according to claim 32, wherein said recording means comprises a color laser beam printer.

38. An image processing apparatus according to claim 32, wherein said recording means includes a pulse width modulating circuit.

39. An image processing apparatus comprising:
  binarizing means for binarizing input image data;
  area spreading means for spreading an area represented by said image data binarized by said binarizing means; and
  coloring means for coloring the spread area made by said area spreading means, except for a portion of the spread area which was binarization-processed, with a predesignated color.

40. An image processing method comprising the steps of:
  extracting an outline of an input image;
  manually designating a converting-color to be applied to the outline extracted in said outline extracting step; and
  converting a color of an outline portion along the extracted outline of the input image to the converting-color designated in said designating step.

41. An image processing method comprising the steps of:
  inputting image data representing an original image;
  extracting an outline portion from the image data input in said input step;
  manually designating a converting-color to be applied to the outline portion extracted in said outline extracting step;
  color-converting a color of an outline portion along the extracted outline of the original image to the converting-color designated in said color designating step; and
  recording an image on a recording medium according to the color-converted outline portion.

* * * * *

UNITED STATES PATENT AND TRADEMARK OFFICE
CERTIFICATE OF CORRECTION

PATENT NO. : 5,311,336
DATED      : May 10, 1994
INVENTOR(S) : MITSURU KURITA, ET AL.

It is certified that error appears in the above-identified patent and that said Letters Patent is hereby corrected as shown below:

ON TITLE PAGE

Item: [22] Filed: "Oct. 20, 1992" should read --June 8, 1989--.

Item: [56] References Cited, under FOREIGN PATENT DOCUMENTS:
"1302964  12/1989  Japan" should read
--1-302964  12/1989  Japan--.

IN THE DRAWINGS

Sheet 5 of 49, Fig. 5A:
   "SUCCEDING" should read --SUCCEEDING--.
Sheet 6 of 49, Fig. 5B:
   "SUCCEDING" should read --SUCCEEDING--.
Sheet 7 of 49, Fig. 6:
   "UPPFR" (three occurrences) should read --UPPER--
   and "MUTIPLIER" (six occurrences) should read
   --MULTIPLIER--.
Sheet 10 of 49, Fig. 10B:
   "SUCCEDING" should read --SUCCEEDING--.
Sheet 15 of 49, Fig. 14:
   "DIGTIZER" should read --DIGITIZER--;
   "THERFOF" should read --THEREOF--;
   "OHTER" should read --OTHER--; and
   "POTION" should read --PORTION--.
Sheet 16 of 49, Fig. 15:
   "MEMDRY" should read --MEMORY--.
Sheet 25 of 49, Fig. 25:
   "PREVIOS" should read --PREVIOUS-- and
   "SUCCEDING" should read --SUCCEEDING--.
Sheet 28 of 49, Fig. 28:
   "CUTLINE" should read --OUTLINE-- and
   "OUT" should read --OUTPUT--.

UNITED STATES PATENT AND TRADEMARK OFFICE
CERTIFICATE OF CORRECTION

PATENT NO. : 5,311,336
DATED : May 10, 1994
INVENTOR(S) : MITSURU KURITA, ET AL.

It is certified that error appears in the above-identified patent and that said Letters Patent is hereby corrected as shown below:

IN THE DRAWINGS

Sheet 31 of 49, Fig. 31:
      "CONVERTOR" should read --CONVERTER--.
   Sheet 36 of 49, Fig. 37:
      "CONVERTOR" should read --CONVERTER--.
   Sheet 46 of 49, Fig. 45:
      "PULTH-WIDTH" (both occurrences) should read
      --PULSE-WIDTH--.

COLUMN 3

Line 23, "showing" should be deleted.
   Line 26, "showing" should be deleted.
   Line 61, "diagram" should read --diagrams-- and
      "serves" should read --serve--.

COLUMN 4

Line 5, "in" should be deleted and "with" should read --to--.

COLUMN 14

Line 16, "show" should read --shown--.

COLUMN 15

Line 30, "(R+G+B)/3)." should read --(R+G+B)/3.--.

COLUMN 23

Line 59, "nor" should read --not--.

UNITED STATES PATENT AND TRADEMARK OFFICE
CERTIFICATE OF CORRECTION

PATENT NO. : 5,311,336
DATED : May 10, 1994
INVENTOR(S) : MITSURU KURITA, ET AL.

It is certified that error appears in the above-identified patent and that said Letters Patent is hereby corrected as shown below:

COLUMN 27

Line 41, "VCLk" should read --VCLK--.
    Line 67, "J-k" should read --J-K--.

COLUMN 31

Line 14, "said" should read --wherein said--.
    Line 68, "components" should read --component--.

COLUMN 33

Line 51, "base" should read --basis--.

COLUMN 34

Line 30, "outline" should read --an outline--.
    Line 58, "convert" should read --converts--.

Signed and Sealed this

Twenty-second Day of November, 1994

Attest:

BRUCE LEHMAN

*Attesting Officer*         *Commissioner of Patents and Trademarks*